United States Patent
Kobayashi et al.

(10) Patent No.: US 7,567,933 B1
(45) Date of Patent: Jul. 28, 2009

(54) SYSTEM AND METHOD FOR QUANTITATIVE COMPETITION AND RECORDING MEDIUM HAVING RECORDED THEREON PROGRAM FOR IMPLEMENTING THEM

(75) Inventors: Kunio Kobayashi, Yokohama (JP); Hikaru Morita, Yokohama (JP); Koutarou Suzuki, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1617 days.

(21) Appl. No.: 09/619,699

(22) Filed: Jul. 19, 2000

(30) Foreign Application Priority Data

| Jul. 19, 1999 | (JP) | 11-205004 |
| Sep. 1, 1999 | (JP) | 11-247060 |
| Jan. 25, 2000 | (JP) | 2000-016020 |
| Feb. 24, 2000 | (JP) | 2000-047323 |

(51) Int. Cl.
*G06Q 40/00* (2006.01)
(52) U.S. Cl. .......................... 705/37; 705/35
(58) Field of Classification Search ............. 705/26–37; 380/39
See application file for complete search history.

(56) References Cited

U.S. PATENT DOCUMENTS 6,055,528 A * 4/2000 Evans ............................. 707/3

FOREIGN PATENT DOCUMENTS

| EP | 1071025 A2 * | 1/2001 |
| JP | 02-118876 | 5/1990 |
| JP | 05-063696 | 3/1993 |

OTHER PUBLICATIONS

Rivest et al., "Pay Word and MicroMint: Two Simple Micropayment Schemes," Apr. 10, 1996, pp. 69-87.
K. Kobayashi et al., "Efficient sealed-bit auction with quantitative competition using one-way functions", Technical Report of IEICE, Jul. 23, 1999, vol. 99 No. 209, pp. 31-37.
K. Sako: "Universally Verifiable Auction Protocol which Hides Losing Bids", The Symposium on Cryptography and Information Security, SCIS '99, pp. 35-39.
H. Morita et al.: "Bit-Commitment Comparison with Multiple Hash Function", The 2000 Symposium on Crytography and Information Security, Okinawa, Japan, Jan. 26-28, 2000, pp. 1-6 (with cover page).
Sakurai et al., "A Bulletin-Board Based Digital Auction Scheme with Bidding Down Strategy", Dept. of Computer Science, Kyushu University, Hakozaki, Fukuoka Japan, XP-001078991, pp. 180-187.
Michiharu Kudo, "Secure Electronic Sealed-Bid Auction Protocol with Public Key Cryptography", IEICE Trans. Fundamentals. vol. E81-A, No. Jan. 1, 1998, XP-001022069, pp. 20-27.
European Search Report, EP00114946, Sep. 17, 2002 pp. 1-2.

* cited by examiner

*Primary Examiner*—Richard C Weisberger
(74) *Attorney, Agent, or Firm*—Connolly Bove Lodge & Hutz LLP

(57) ABSTRACT

A bid-opening device 20 receives from each bidding device $10_m$ a bidding price index $\gamma_m = g(h^k(IV_m))$ (where $IV_m$ is an initial value, $h^k$ indicates k-times processing with a one-way function h and g is a one-way function) and its identifier $ID_m$. The received information is stored on a common bulletin board 25. $D_m = h^k(IV_m)$ (where $D_m = g(D_m)$) is generated with k set as the upper limit value K of the bidding price. The bulletin board 25 is checked for $\gamma_m$ which matches this $D_m$. If no match is found, m is incremented by one, and the check for $\gamma_m - D_m$ matching is made for each of m bidding devices. Upon completion of the matching for all the bidding devices, k is decremented by one, and a check is made for $\gamma_m$ which matches $D_m = g(h^k(IV_m))$, and the index k for which they match is determined as the highest price bid. The bid-opening device 20 outputs that k and the identifier $ID_m$ of $\gamma_m$.

26 Claims, 32 Drawing Sheets

SYSTEM AND METHOD FOR QUANTITATIVE COMPETITION AND RECORDING MEDIUM HAVING RECORDED THEREON PROGRAM FOR IMPLEMENTING THEM

BACKGROUND OF THE INVENTION

The present invention relates to a quantitative competition system and method which compare aimed or intended values of participants and publish the highest or lowest value but hide the other values, and a recording medium on which there is recorded a program for implementing the method. More particularly, the invention pertains to a system and method for quantitative comparison of secret values, for example, in electronic lottery, electronic voting, or electronic sealed-bid auction under circumstances where many participants are allowed to access the server online across the Internet.

FIG. 1 is depicts in block form the configuration of a conventional electronic competitive bidding or sealed-bid auction system. A notice of auction is input to bidding devices $10_1$ to $10_M$, which send their identifiers $ID_1$ to $ID_M$ and bidding prices $PR_1$ to $PR_M$ to a bid-opening device 20. In this transfer of each data, if it is desirable to keep the data secret, the bidding price is sent in compressed form, and if it is necessary to identify the data, it is sent together with a digital signature of the bidder. The bid-opening device 20 detects the highest (or lowest) one of the bid values received from the bidding devices $10_1$ to $10_M$, and outputs the winning bid and the identifier corresponding thereto. This scheme is disclosed, for example, in Japanese Patent Application Laid-Open Gazette No. 118876/90 entitled "Electronic Bidding System." On the other hand, schemes which publish only the winning bid but hide other information involved are disclosed, for example, in Kazuo SAKO, "Auction Protocol Which Hides Bids of Losers," The Symposium on Cryptography and Information Security, SCIS'99, and in Shingo MIYAZAKI and Kouichi SAKURAI, "A Bulletin-Board Base Digital Auction Scheme with Bidding Down Strategy," The Symposium on Cryptography and Information Security SCIS'99.

The sealed-bid auction scheme to which the present invention is applied satisfies the requirements mentioned below.

Only bidding prices are used to determine the winning bid; that is, the successful bidding device is not determined using other information.

The bid-opening device and a provisional identifier registration device neither cheat nor malfunction.

SUMMARY OF THE INVENTION

It is therefore an object of the present invention to provide a quantitative competition system and method which ensure the fairness of a sealed-bid auction, the validity of a successful bid value, the undeniability of bidders, the anonymity of the bidders and the freedom from double bidding.

The fairness of an auction means that it is possible to prevent bidders from obtaining information on other bidding devices prior to bidding in an attempt to make bids with unfair advantage.

The validity of a successful bid value means that it is possible to prevent an unfair determination of the winning bid.

The undeniability of bidders means that it is possible to prevent them from denying their bid values at the bid-opening time.

The anonymity of bidders means that it is possible to prevent leakage of identification information of every bidding device.

According to the present invention, each bidding device transforms its bidding price to bidding price information through utilization of a one-way function, and the bid-opening device uses the bidding price information to determine the successful bid without revealing the prices bid by unsuccessful bidders.

DETAILED DESCRIPTION OF THE PREFERRED EMBODIMENTS

First Embodiment

Figure 1:
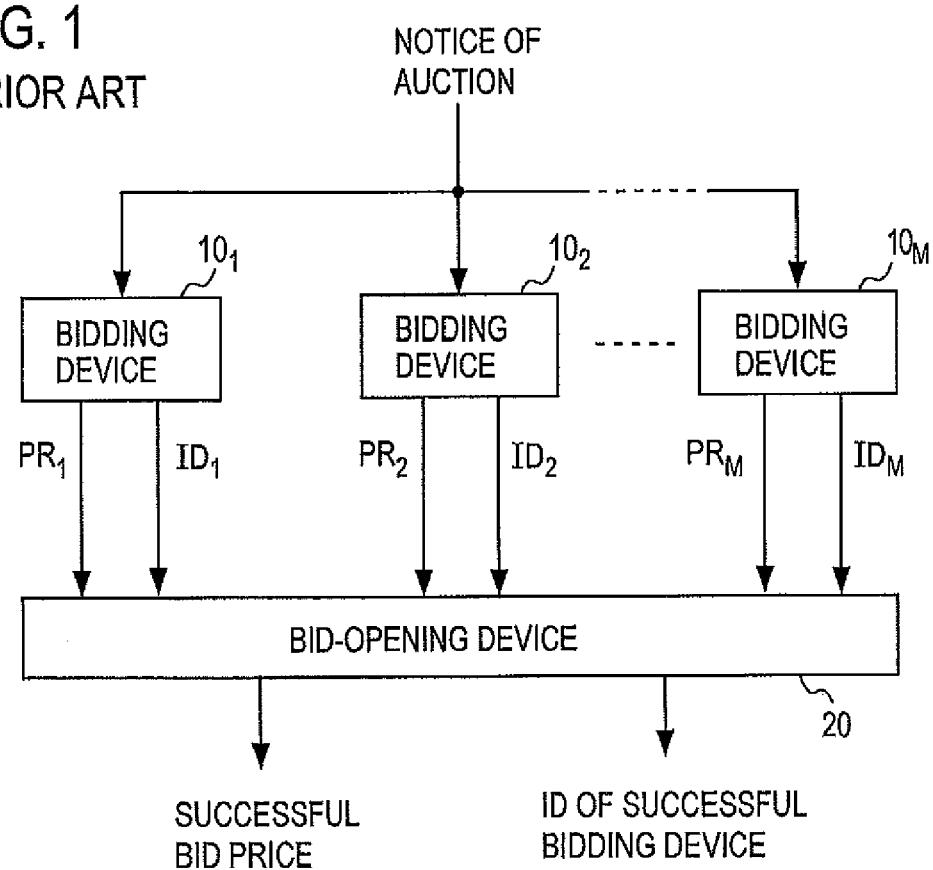
FIG. 1 is a block diagram showing the general configuration of an electronic competitive bidding system.
Figure 2:
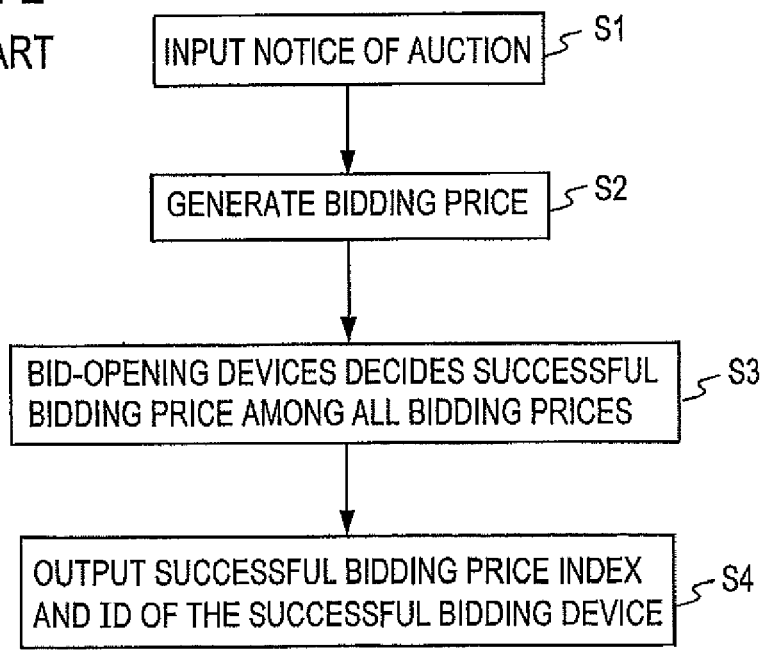
FIG. 2 is a flowchart showing the general procedure of an electronic sealed-bid auction.

The electronic competitive sealed-bid auction system according to this embodiment comprises, as is the case with FIG. 1, M bidding devices $10_1$ to $10_M$ and a bid-opening device 21, which are accessible to each other. This system operates as depicted in the flowchart of FIG. 2.

Step S1: Input a notice of auction to each of the bidding devices $10_1$ to $10_M$. The notice of auction describes bidding conditions such as the name of an object for auction, the highest and/or lowest price bid, the term for bidding and qualifications for bidding, and a method of access to the bid-opening device. The bidding conditions differ with objects for auction.

Step S2: In response to the notice of auction which describes the details of the auction, each bidding device $10_m$ (where m=1, 2, ..., M) generates a bidding price, and sends to the bid-opening device 20 the bidding price $PR_m$ and an identifier $ID_m$ by which the bidding device $10_m$ can be identified.

Step S3: Having received from the respective bidding device $10_1$ to $10_M$ their bidding prices $PR_1$ to $PR_M$ and identifiers $ID_1$ to $ID_M$, the bid-opening device 20 computes the highest (or lowest) one of the bidding prices and determines it to be the winning bid.

Step S4: The bid-opening device 20 outputs the winning bid and the identifier of the bidding device having submitted it.

The above procedure is the same as in the prior art. Since the communication channel between each bidding device $10_m$ and the bid-opening device 20 is not an anonymous channel, in particular, such a procedure as shown in FIG. 2 allows each bidding device $10_m$ to learn the bidding prices of the other bidding devices by wiretapping. To avoid this, according to the present invention, each bidding device 10m uses one-way functions to transform the bidding price to bidding price information, which is sent to the bid-opening device 20.

Figure 3:
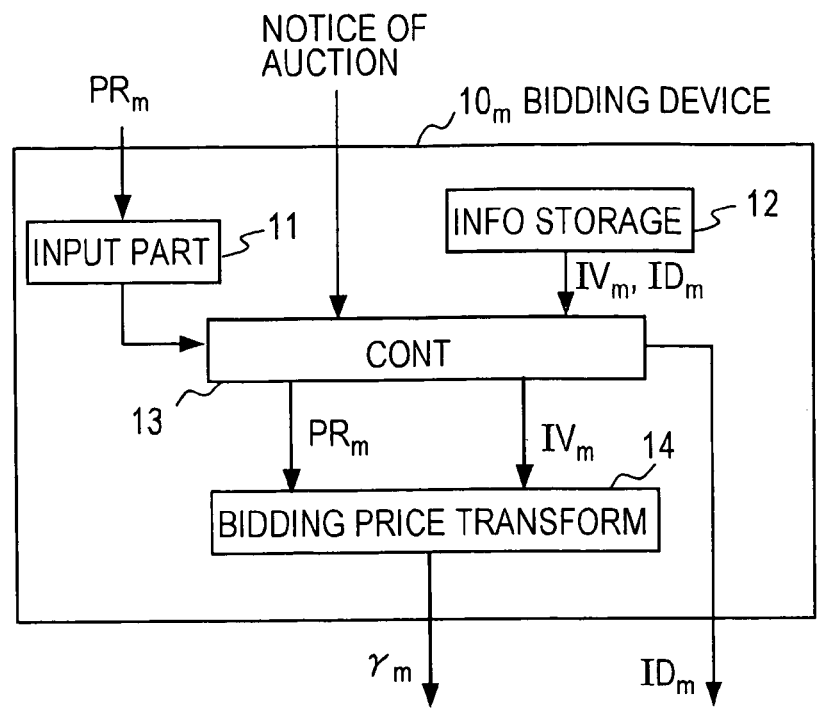
FIG. 3 is a block diagram depicting a bidding device which uses one-way functions to generate a bid index.

Referring to FIG. 3, the bidding device 10m comprises an input part 11, an information storage part 12, a control part 13 and a bidding price transformer 14. The control part 13 follows a control procedure stored in the information storage part 12 to control operations of the respective parts. The notice of auction, which describes the bidding conditions, is provided in advance via a channel to the bidding device $10_m$ from the bid-opening device 20 or some other device. In the information storage part 12 there are also stored the identifier $ID_m$ of this bidding device 10m and an initial value $IV_m$ which is used for bidding. At the time of bidding, the bidding price $PR_m$ provided to the input part 11 is fed via the control part 13 into the bidding price transformer 14. The bidding price transformer 14 uses one-way functions to transform the bidding price $PR_1$ to bidding price information $\gamma_m$ in integral form. The bidding price information $\gamma_m$ and the identifier $ID_m$ are sent from a transceiver (not shown) to the bid-opening device 20 via a communication channel. Based on the bidding price information from every bidding device $10_m$, the bid-opening device 20 decides the winning bid.

In this embodiment, the bidding price transformer 14 is supplied with the initial value $IV_m$ read out of the information storage part 12 by the control part 13 and the bidding price $PR_m$, and processes the initial value $IV_m$ by a one-way function by the number of times corresponding to the bidding price $PR_m$ as described below. A one-way function is such a function that, given a variable x, $y(=h(x))$ can easily be computed from x, but when given y, very high computational complexity is needed to compute x such that $y=h(x)$. An output value, obtained by processing the initial value $IV_m$ with the one-way function h by k times like $h(\ldots h(h(IV_m)))\ldots)$, will hereinafter be represented by $h^k(IV_m)$.

Figure 4:
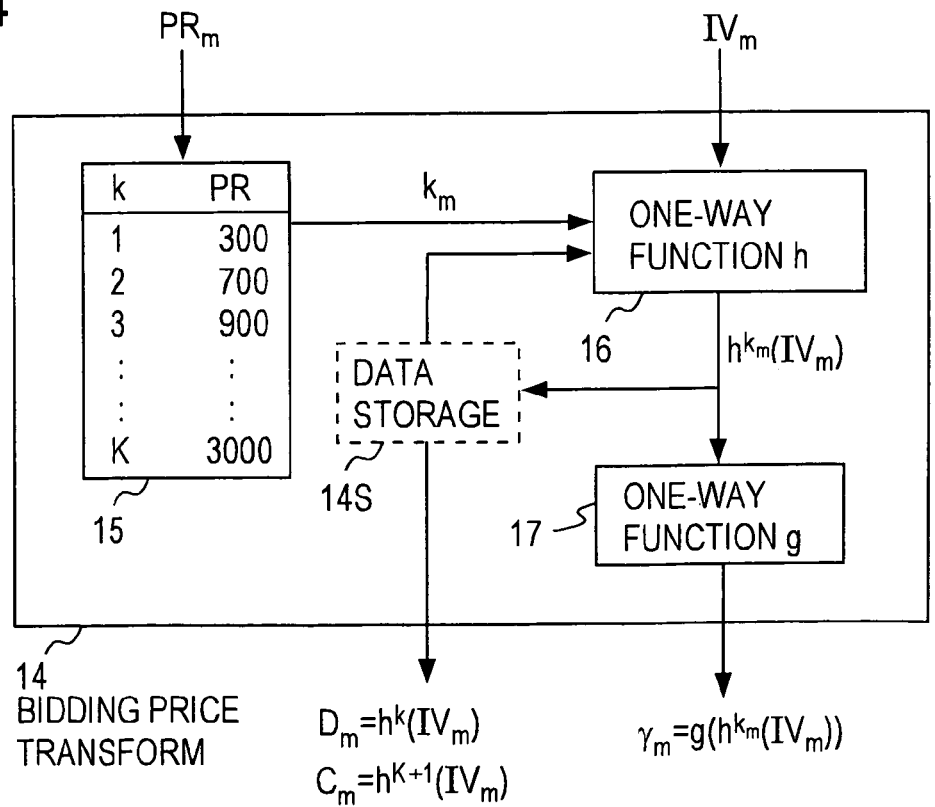
FIG. 4 is a block diagram depicting a concrete example of a bidding price transformer using one-way function processors.
Figure 5:
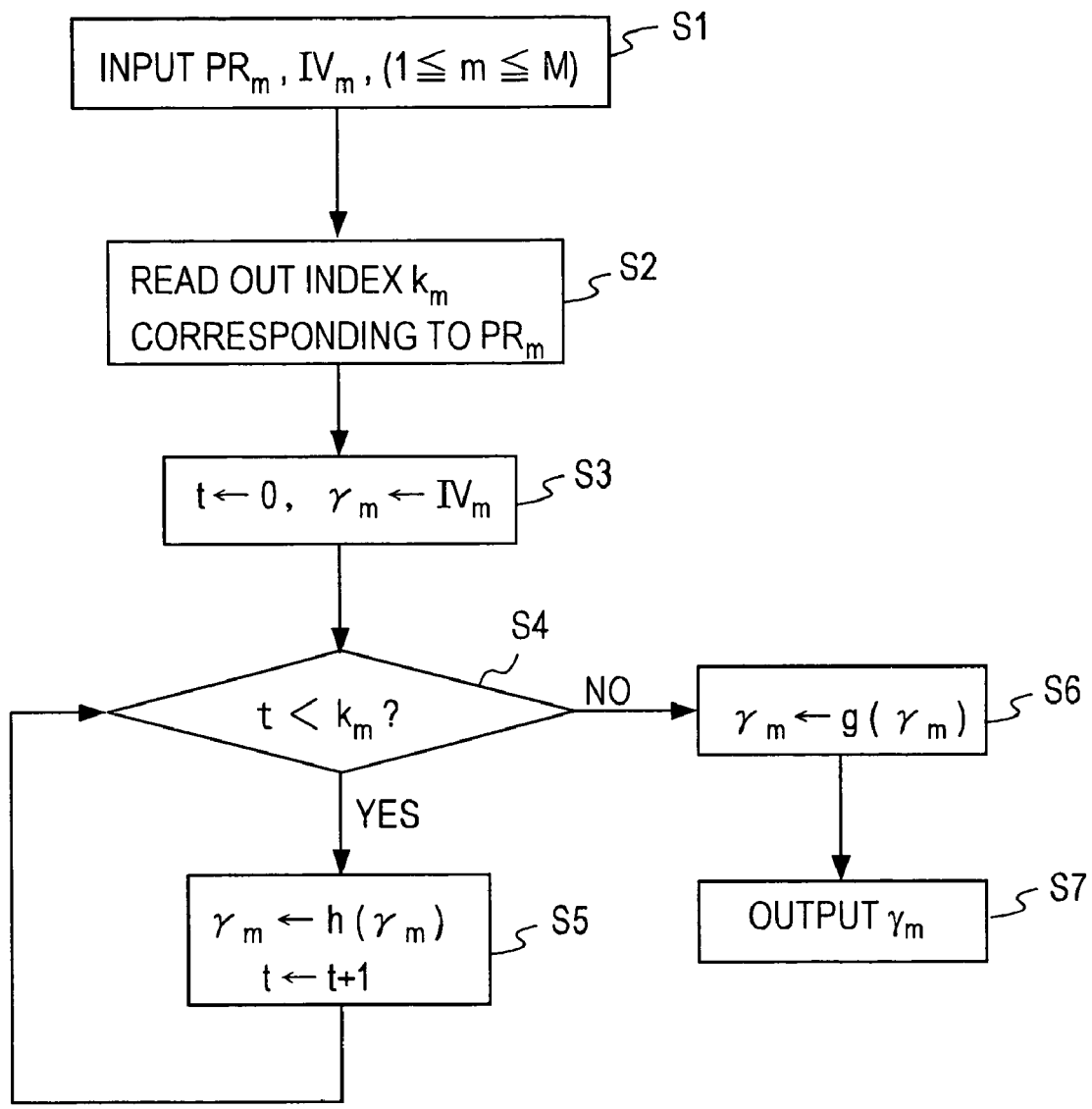
FIG. 5 is a flowchart showing the procedure for generating the bid index through the use of one-way functions.

A concrete example of the bidding price transformer 14 is depicted in FIG. 4 and its procedure in FIG. 5. The bidding price transformer 14 comprises a data storage part 14S, conversion table memory 15, a one-way function h processor 16 and a one-way function g processor 17. Incidentally, the examples of the bidding device $10_m$ depicted in FIGS. 3 and 4 will also be referred to in describing second and third embodiments of the invention later on, in which case the broken-lined data storage part 14S is provided to store the result $D_m$ of each computation by the one-way function h and the final result $C_m$ of computation. A conversion table, which is stored in the conversion table memory 15, is contained as one bidding condition in the notice of auction, for instance. Each bidding device 10m reads out the conversion table from a bulletin board 25 of the bid-opening device 20 which will be described later on with reference to FIG. 6. The conversion table is a table on which there are shown appropriately-separated K bidding prices from the lowest to the highest bidding price and a series of corresponding indexes k=1, 2, ..., K. Each bidding device $10_m$ selects a desired bidding price from the conversion table and uses the corresponding index k as a bidding price index $k_m$. In the FIG. 4 example the bidding prices corresponding to the indexes k=1, 2, ..., K are arranged to monotonously increase, but by arranging them to monotonously decrease, the lowest bidding price can be made a winning bid.

The one-function h processor is supplied with the initial value $IV_m$ and the price index $k_m$ corresponding to the bidding price $PR_m$ read out of the conversion table memory 15, and repeatedly processes the initial value $IV_m$ with the one-way function h by the number of times corresponding to the price index k. As a result, $h^{km}(IV_m)$ is obtained. The one-way function g processor 17 further processes the output value $h^{km}$ ($IV_m$) with a one-way function g to compute $\gamma_m = g(h^{km}(IV_m))$, and output it as bidding price information.

Step S1: Input the bidding price $PR_m$ and the initial value $IV_m$.

Step S2: Read out of the conversion table memory 15 the price index $k_m$ corresponding to the bidding price $PR_m$.

Step S3: In the one-way function h processor 16, set the initial value of a variable t at 0 and the initial value $IV_m$ as $\gamma_m$, and repeat steps S4 and S5.

Step S4: Determine if t is smaller than $k_m$.

Step S5: If $t < k_m$, update $\gamma_m$ with the value of $h(\gamma_m)$ at that time, then increment t by one, and return to step S4.

Step S6: When t becomes no longer smaller than $k_m$, $\gamma = h^{km}(IV_m)$, which is processed by the one-way function g processor 17 such that $\gamma_m \leftarrow g(\gamma_m)$.

Step S7: Output, as the bidding price information, $\gamma_m$ obtained in step S6.

BID-Opening Device (Successful Bid: Highest Bidding Price Bid)

Figure 6:
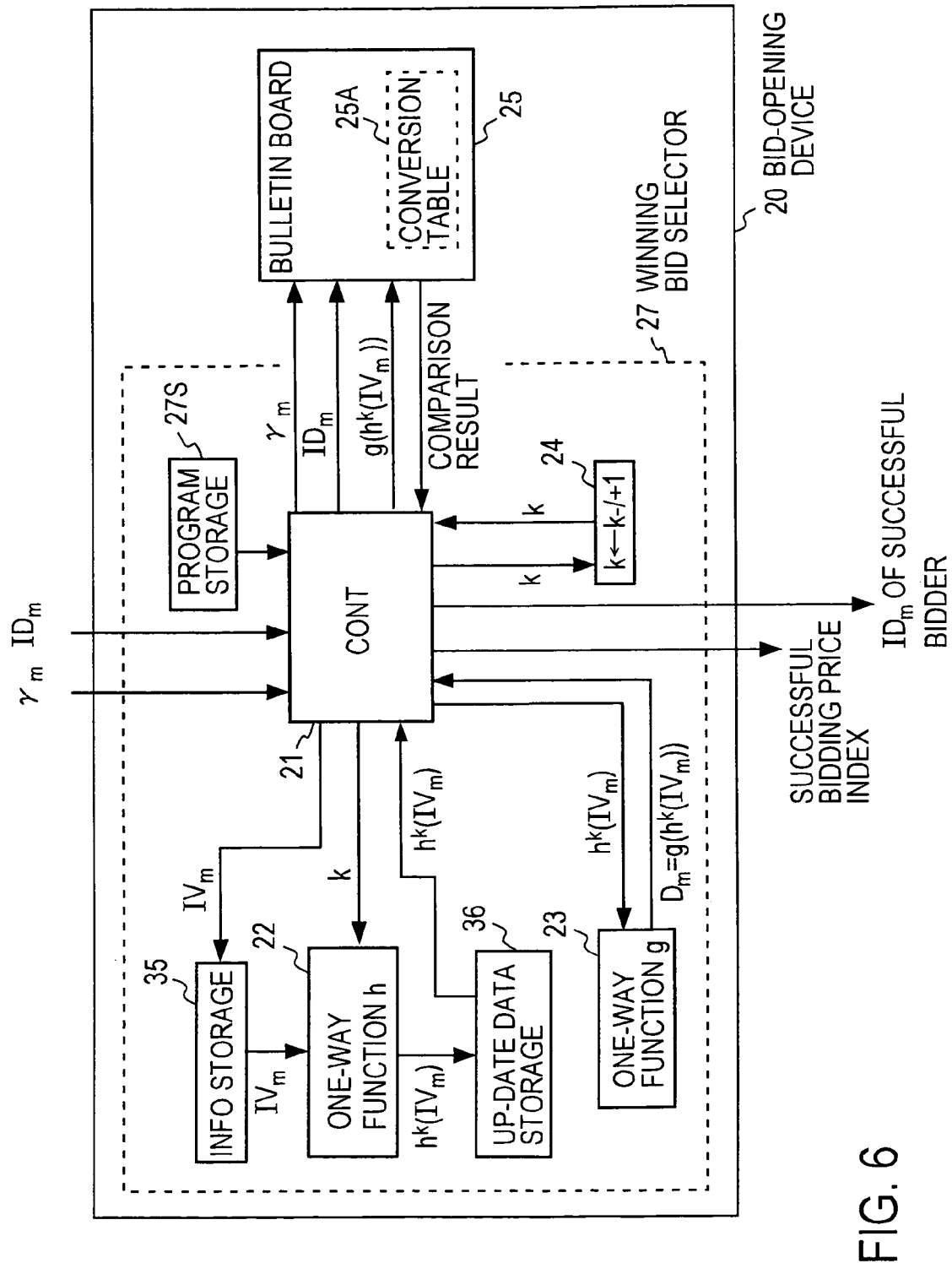
FIG. 6 is a block diagram illustrating the functional configuration of a bid-opening device 20 in a first embodiment of the present invention which is designed to determine the highest price bid as the winning bid.

FIG. 6 is a block diagram of the bid-opening device 20, which comprises a control unit 21, and a one-way function h processor 22, a one-way function g processor 23, an adder/subtractor 24, a bulletin board 25, a program storage part 27S, an information storage part 35 and an update data storage part 36 which are all connected to the control unit 21. In the program storage part 27S there is stored a bid-opening procedure as a program, and the control unit 21 follows the program to control operations of the respective parts. The one-way function h processor 22 and the one-way function g processor 23 are series-connected. The parts except the bulletin board 25 constitute a winning bid selector 27. The number of bidding devices are M, and the initial value $IV_m$ unique to each bidding device $10_m$ (where m=1, 2, ..., M) is prestored by some means in the information storage part 35. In the bulletin board 25 there are also recorded other bidding conditions including a conversion table 25A; furthermore, verification information and the results of auction to be published are written in the bulletin board 25. The pieces of information are accessible from any external devices as well as from the bidding devices. In this case, however, assume that only the bid-opening device 20 is allowed to write in the bulletin board 25 (This applies to other embodiments).

Figure 7:
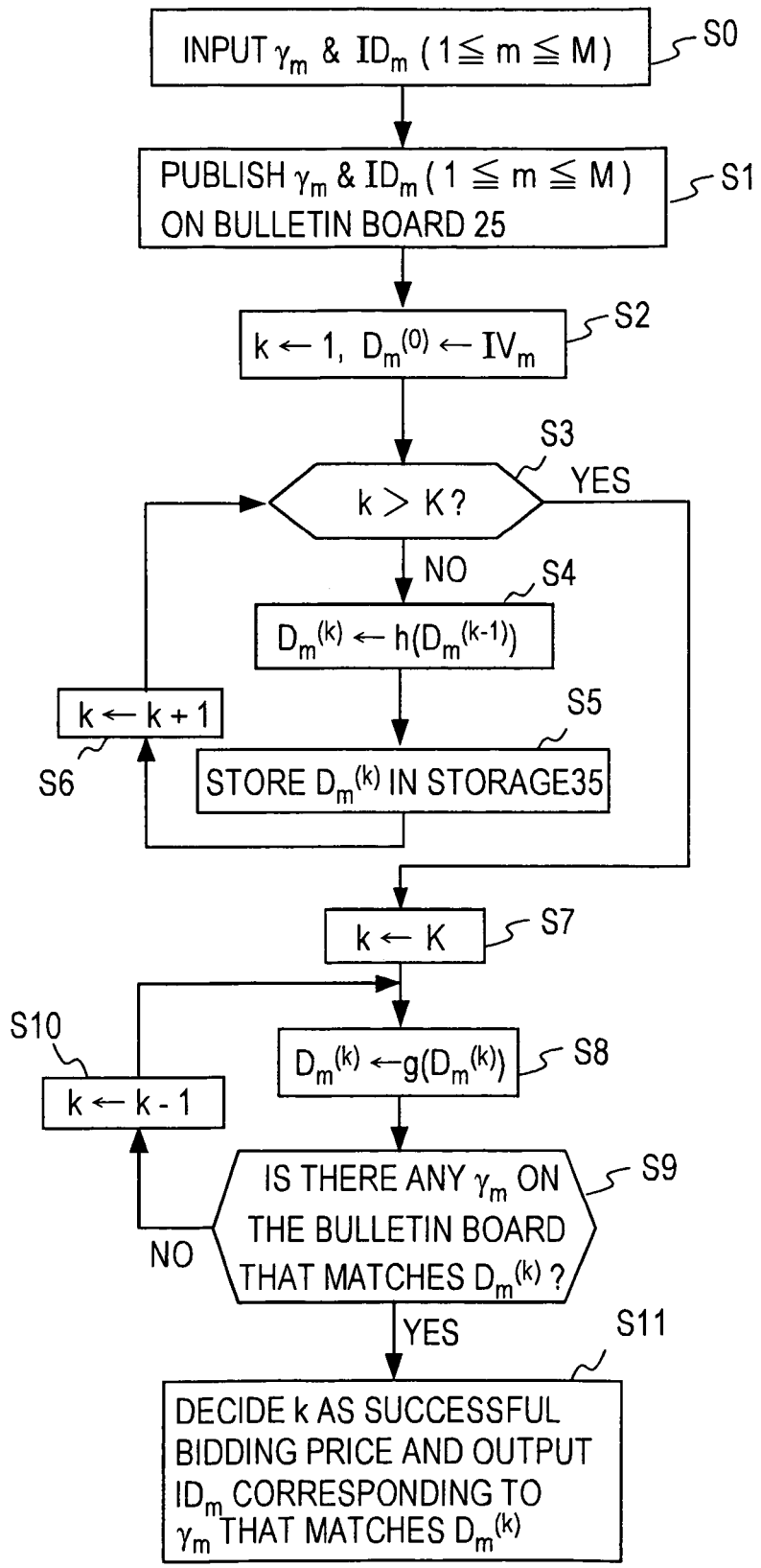
FIG. 7 is a flowchart showing the operation of the bid-opening device 20 depicted in FIG. 6.

In FIG. 7 there is depicted the procedure of operation of the bid-opening device 20. In this example the bidding price corresponding to the largest price index $k_m$ is made a successful bid as follows. The index value is decremented one by one from the largest index K corresponding to the upper limit of the bidding price specified in the conversion table; a check is made for the presence of the bidding price information $\gamma_m$ (where m=1, 2, ..., M) corresponding to each index k is present; and when the bidding price information $\gamma_m$ corresponding to the index k is detected for the first time, the detected bidding price information $\gamma_m$ is determined to be the winning bid, and m (the bidding device number) at that time is computed, with which the bid-opening procedure ends.

Step S0: The bidding device $10_m$ inputs its bidding price information $\gamma_m$ and identifier $ID_m$ (where m=1, 2, ..., M) to the bid-opening device 20.

Step S1: The control unit 21 records the bidding price information $\gamma_m$ and the identifier $ID_m$ in the bulletin board 25 accessible from arbitrary external devices (the bidding devices $10_1$ to $10_M$ and other devices which are not bidders).

Step S2: To precalculate $D_m^{(1)}, D_m^{(2)}, \ldots, D_m^{(K)}$ such that $D_m^{(k)} = h(D_m^{(k-1)})$ in the subsequent steps S3 to S6, the control unit 21 sets the bidding price index $k \leftarrow 1$, then reads out $ID_m$ from the information storage part 35, and substitutes it for $D_m^{(0)}$.

Step S3: The control unit 21 determines whether k>K.

Step S4: If not k>K, process $D_m^{(k-1)}$ by the one-way function h processor 22 to obtain $D_m^{(k)}$.

Step S5: Store $D_m^{(k)}$ in the update data storage part 36.

Step S6: Increment k by the adder/subtractor 24 such that $k \leftarrow k+1$.

Step S7: If k>K in step S3, it means that $D_m^{(1)} = h(D_m^{(0)}) = h(IV_m), D_m^{(2)} = h(D_m^{(1)}) = h^2(IV_m) \ldots, D_m^{(K)} = h^K(IV_m)$ have all been obtained, then set $k \leftarrow K$.

Step S8: Read out $D_m^{(K)} = h^K(IV_m)$ from the update data storage part 36 and process it by the one-way function g processor 23 to obtain $D_m^{(k)} \leftarrow g(D_m^{(k)})$.

Step S9: For m=1, 2, ..., M, the control unit 21 makes a check to see if there exists on the bulletin board 25 the bidding price information $\gamma_m$ of the same value as $D_m^{(k)}$.

Step S10: If there does not exist on the bulletin board 25 the information $\gamma_m$ of the same value as $D_m^{(k)}$, the control unit 21 inputs k to the adder/subtractor 24 to decrement k by one (i.e., $k \leftarrow k-1$), then returns to step S8, and in steps S8 and S9 it makes a check to see if there exists on the bulletin board 25 the bidding price information $\gamma_m$ of the same value as $D_m^{(k)} = g(h^k(IV_m))$ for m=1, 2, ..., M.

Step S11: If the information $\gamma_m$ of the same value as $D_m^{(k)}$ is found on the bulletin board 25 in step S9, then the control unit 21 regards it as the successful price bid and outputs the index k at this time and the bidding device identifier $ID_m$ corresponding to the information $\gamma_m$, with which the procedure ends.

As described above, a check is made first for a bidding device $10_m$ having input the bidding price information $\gamma_m$ equal to $D_m^{(k)} (= g(h^k(IV_m)))$ when the price index k is at the upper limit value K; if no such a bidding device is found, then a check is made for a bidding device $10_m$ having input the bidding price information $\gamma_m$ equal to $D_m^{(k)}$ when the index k is decremented by one, i.e. $k \leftarrow k-1$; and if no such a bidding device is found, then a check is made for a bidding device $10_m$ having input the bidding price information $\gamma_m$ equal to $D_m^{(k)}$ when the index is further decremented by one, i.e. $k \leftarrow k-1$. By making a check, for each decremented value of k, for the bidding device $10_m$ having input the bidding price information $\gamma_m$ equal to $D_m^{(k)} (= g(h^k(IV_m)))$, it is possible to find out the price information $\gamma_m$ corresponding to the largest index k, that is, the highest bidding price $PR_m$.

Furthermore, each bidding device $10m$ sends $h^{km+1}(IV_m)$ to the bid-opening device 20 in advance, and the bid-opening device 20 publishes it on the bulletin board 25 and, after determining the successful bidding price, publishes on the bulletin board 25 the highest bidding price index k and the identifier $ID_m$ of the successful bidding device and the verification information $h^k(IV_m)$; in this instance, since k ought to equal $k_m$, it is possible for an arbitrary device, except the bid-opening device 20, to verify the validity or fairness of the bid-opening process by processing he published verification information $h^k(IV_m)$ with the one-way function h to obtain $h^{k+1}(IV_m)$ and making sure that it matches $h^{km+1}(IV_m)$ published prior to the determination of the winning bid. Alternatively, the verification of the bid-opening procedure can be made by publishing the verification information $h^k(IV_m)$ of each bidding device on the bulletin board 25 in advance and making a check to see if the value, obtained by processing $h^{km}(IV_m)$ published on the bulletin board 25 with the one-way function h by $(K-k_m)$ times, matches $h^k(IV_m)$.

In the case where the lowest price bid is the winning bid, the bidding prices corresponding to the price indexes k on the conversion table are arranged so that they monotonously increase from the lowest value, as referred to previously.

In the embodiment described above, all the bidding device $10_1$ to $10_M$ send $h^{km+1}(IV_m)$ to the bid-opening device 20 in advance for verification of the results of bid-opening, and the bid-opening device 20 writes it on the bulletin board. It is easy to compute $h^{k+1}(z)$ from $h^k(z)$ in the computation $h^{k+1}(z)=h(h^k(z))$ using the one-way function, but the computation of $h^k(z)$ from $h^{k+1}(z)$ involves too enormous computational complexity to deal with practically. Accordingly, even if the bidding device publishes in advance $h^{kV}(IV_m)$ computed using an index kV larger than the bidding price index $k_m$, there is no possibility of other devices learning the index $k_m$ unless the bid-opening is performed in terms of the index $k_m$.

The value $k_v$ of the verification information $h^{kv}(IV_m)$ may be a value $k_v=k_m+A$ which is obtained by adding the bidding price index $k_m$ with a predetermined integer A equal to or greater than 1, or a value $k_v=K+A$ which is obtained by adding the maximum index K with the integer A. In the former case, $h^{km}(IV_m)$ is processed A times with the one-way function h and the resulting value is checked for matching the published information $h^{kv}(IV_m)$. In the latter case, $h^{km}(IV_m)$ is processed K+A−$k_m$ times with the one-way function h and the resulting value is checked for matching the published information $h^{kv}(IV_m)$.

In the embodiment described above, the bidding devices $10_1$ to $10_M$ each convert the bidding price PR to the index k by the conversion table and the initial value $IV_m$ is processed with the one-way function by the number of times corresponding to the index k, but the use of the conversion table is not essential to the present invention. For example, the index k itself may be the bidding price, in which case neither of the bidding devices the bid-opening device requires the conversion table and any one of a series of value k which monotonously increase one by one within a predetermined range defined by the upper and lower limits given as one of the conditions for auction is chosen as the bidding price PR.

Second Embodiment

In the first embodiment the bid-opening device 20 must be informed of the initial value $IV_m$ of each bidding device $10_m$. In this embodiment, however, the bid-opening device 20 requires the bidding device $10_m$ to send $D_m=h^k(IV_m)$ corresponding to the price index k, and hence it does not need the initial value $IV_m$. Since the price index k varies one by one such that k=1, 2, . . . , K, this embodiment utilizes the fact that $h^{k+1}(IV_m)=h(h^k(IV_m))$ holds; the bid-opening device 20 verifies the response $h^k(IV_m)$ from the bidding device in reply to an inquiry k, then computes $g(h^k(IV_m))$, and checks it for matching the bidding price information $\gamma_m$ (where m=1, 2, . . . , M).

A description will be given of the case where the highest bid is the successful bid.

Figure 8:
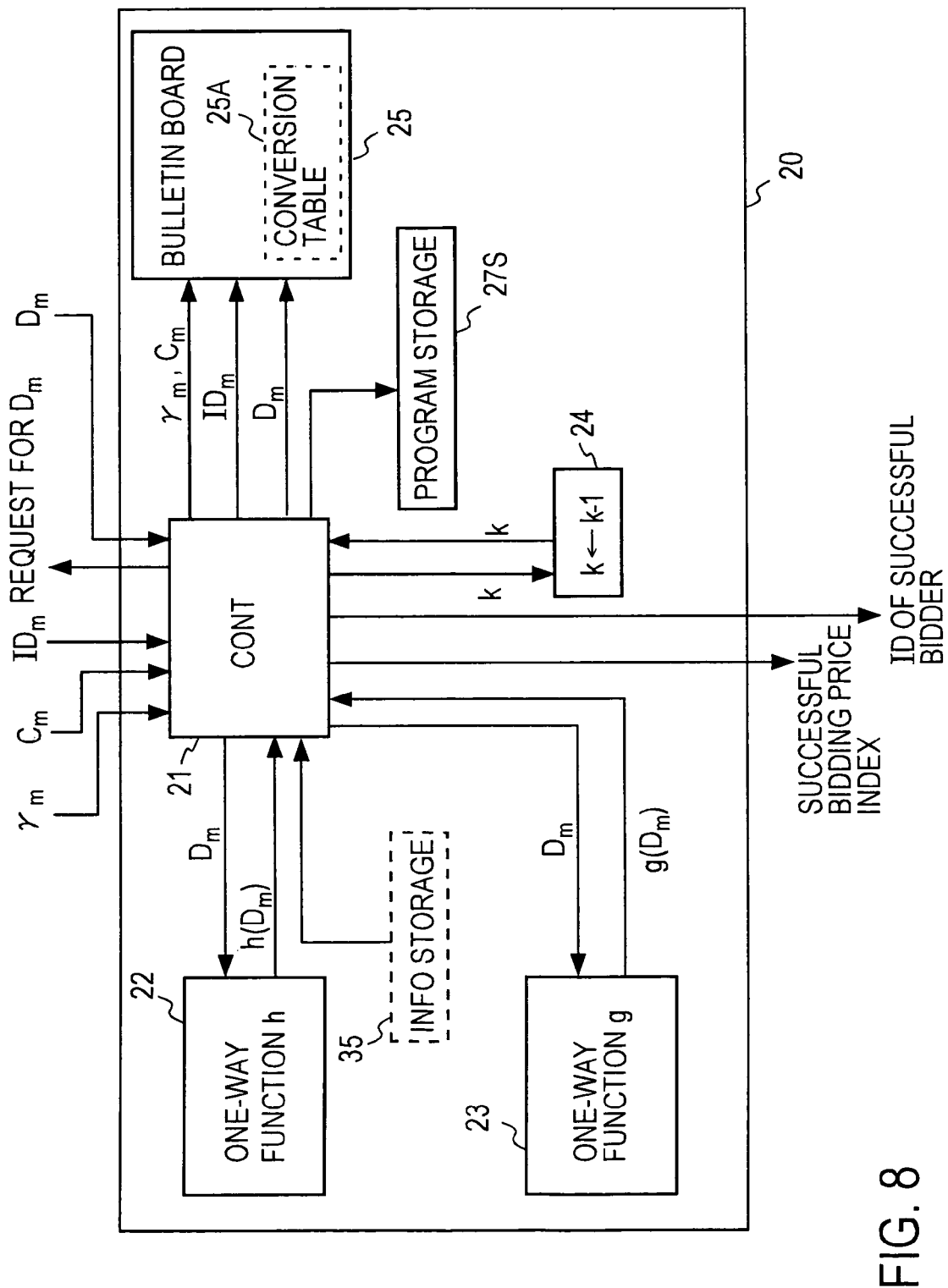
FIG. 8 is a block diagram illustrating the functional configuration of a bid-opening device in a second embodiment of the present invention.

The bidding device $10_m$ has a configuration in which the data storage part 14S indicated by the broken line in FIG. 4 is added to the bidding price transformer 14. The bidding device $10_m$ precomputes $D_m=h^k(IV_m)$ by the one-way function h processor 16 for each value k=1, 2, . . . , K+1, and stores it in the data storage part 14S. When inquired about k from the bid-opening device 20, the bidding device $10_m$ reads out of the data storage part 14S the data $h^k(IV_m)$ corresponding to k and sends it as the response $D_m=h^k(IV_m)$ to the bid-opening device 20. Furthermore, the bidding device $10_m$ sends to the bid-opening device 20 the data $h^{K+1}(IV_m)$ as the verification information $C_m$, together with the bidding price information $\gamma_m$. As depicted in FIG. 8, the bid-opening device 20 comprises a control unit 21, a one-way function h processor 22, a one-way function g processor 23, a subtractor 24, a program storage part 27S and a bulletin board 25 accessible from other devices. On the bulletin board 25 there are published a conversion table 25A along with conditions for auction.

Figure 9:
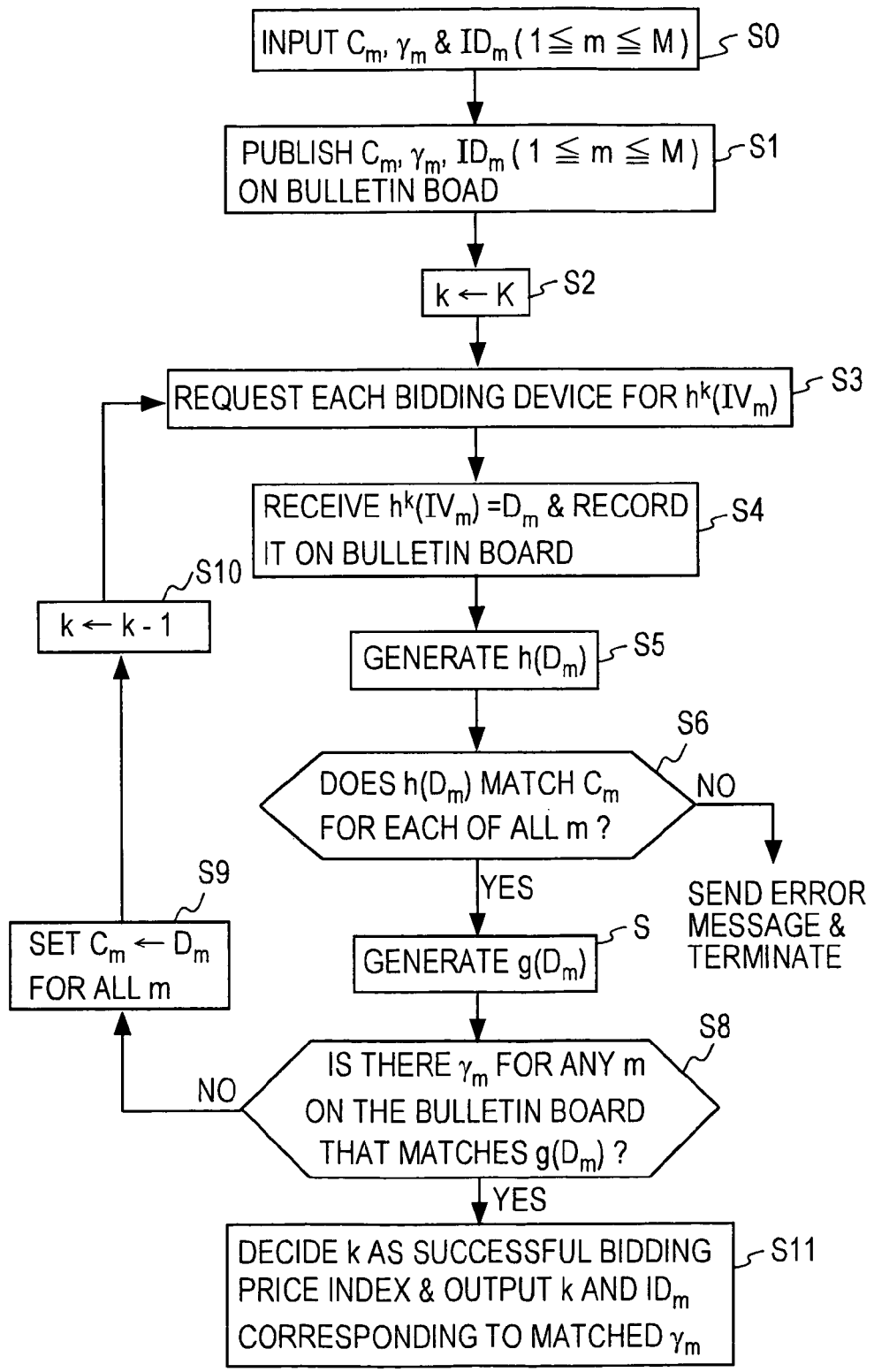
FIG. 9 is a flowchart showing the operation of the bid-opening device depicted in FIG. 8.

The bid-opening device 20 operates as depicted in FIG. 9.

The bidding devices $10_m$ each send $h^{K+1}(IV_m)$ as the verification information $C_m$ in advance to the bid-opening device 20 together with the bidding price information $\gamma_m$ and the identifier $ID_m$. The bid-opening device 20 publishes these pieces of data on the bulletin board 25. Let it be assumed here that M bids are submitted, and hence m=1, 2, . . . , M.

Step S1: Write and hence publish on the bulletin board 25 the plural pieces of data sent to the bid-opening device 20, that is, the bidding price information $\gamma_m(=g(h^{km}(IV_m)))$, the verification information $C_m$ and the identifier $ID_m$.

Step S2: Set the initial value of the index k at the upper limit value K by control unit 21.

Step S3: Request each bidding device $10_m$ to present $D_m=h^k(IV_m)$. The bidding device $10_m$ reads out of the data storage part 14S the data $h^k(IV_m)$, and sends it to the bid-opening device 20 as $D_m$.

Step S4: Record and hence publish on the bulletin board 25 the data $D_m$ sent from every bidding device $10_m$.

Step S5: Generates $h(D_m)$ for each $D_m$ by the one-way function h processor 22.

Step S6: Make a check to see if all the pieces of data $h(D_m)$ match all the pieces of verification information $C_m$ on the bulletin board 25; if no mismatch is found, then determine that they are all correct or valid, and continue the subsequent steps. If a mismatch is found, then sends an error message to every bidding device $10_m$ and finish the bid-opening operation.

Step S7: When no mismatch is found in step S6, generate data $g(D_m)$ by the one-way function g processor 23.

Step S8: Make a check to see if each data $g(D_m)$ matches the bidding price information $\gamma_m$; if no match is found, update $C_m$ on the bulletin board 25 with $D_m$ ($C_m \leftarrow D_m$).

Step S10: Set k←k−1 by the subtractor 24 and return to step S3.

Step S11: If even one of the pieces of information $\gamma_m$ is found to match with $g(D_m)$ in step S8, decide k at that time as the price index corresponding to the winning bid, and output the index k and the identifier $ID_m$ of the bidding device $10_m$ having offered the successful bid.

In this instance, the values of losing bids other than the winning one are kept secret from even the bid-opening device 20.

In this embodiment, too, the lowest price bid can be chosen as the winning bid simply by arranging the bidding prices in such a manner as to monotonously decrease relative to a monotonously increasing index k on the conversion table, or by arranging the bidding prices in such a manner as to monotonously increase relative to a monotonously decreasing index k.

Third Embodiment

In the second embodiment described above, as depicted in FIG. 9, the bid-opening device 20 requires all the bidding devices to present $h^k(IV_m)$ and receive it for each value of the price index k until the first detection of a match between $g(D_m)$ and $\gamma_m$ in step S3. Accordingly, the sealed-bit auction scheme according to the second embodiment has the defect of a large communication cost. This embodiment requires the bid-opening device 20 to be informed of nothing but the initial value $IV_m$, publishes only the winning bid, that is, hides the losing bids, and reduces the communication cost.

Figure 10:
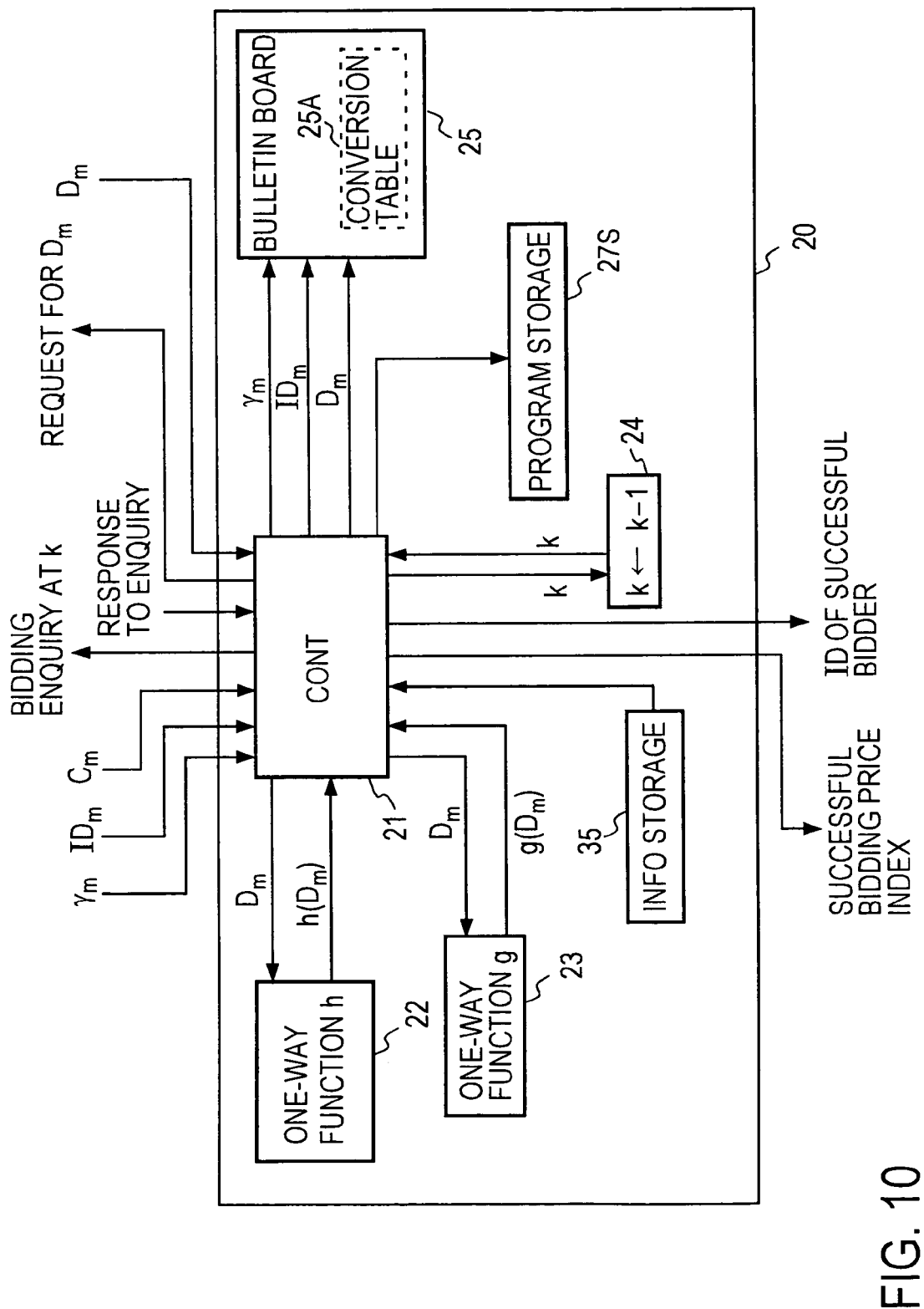
FIG. 10 is a block diagram illustrating the functional configuration of a bid-opening device in a third embodiment of the present invention which is designed to determine the highest price bid as the winning bid.
Figure 11:
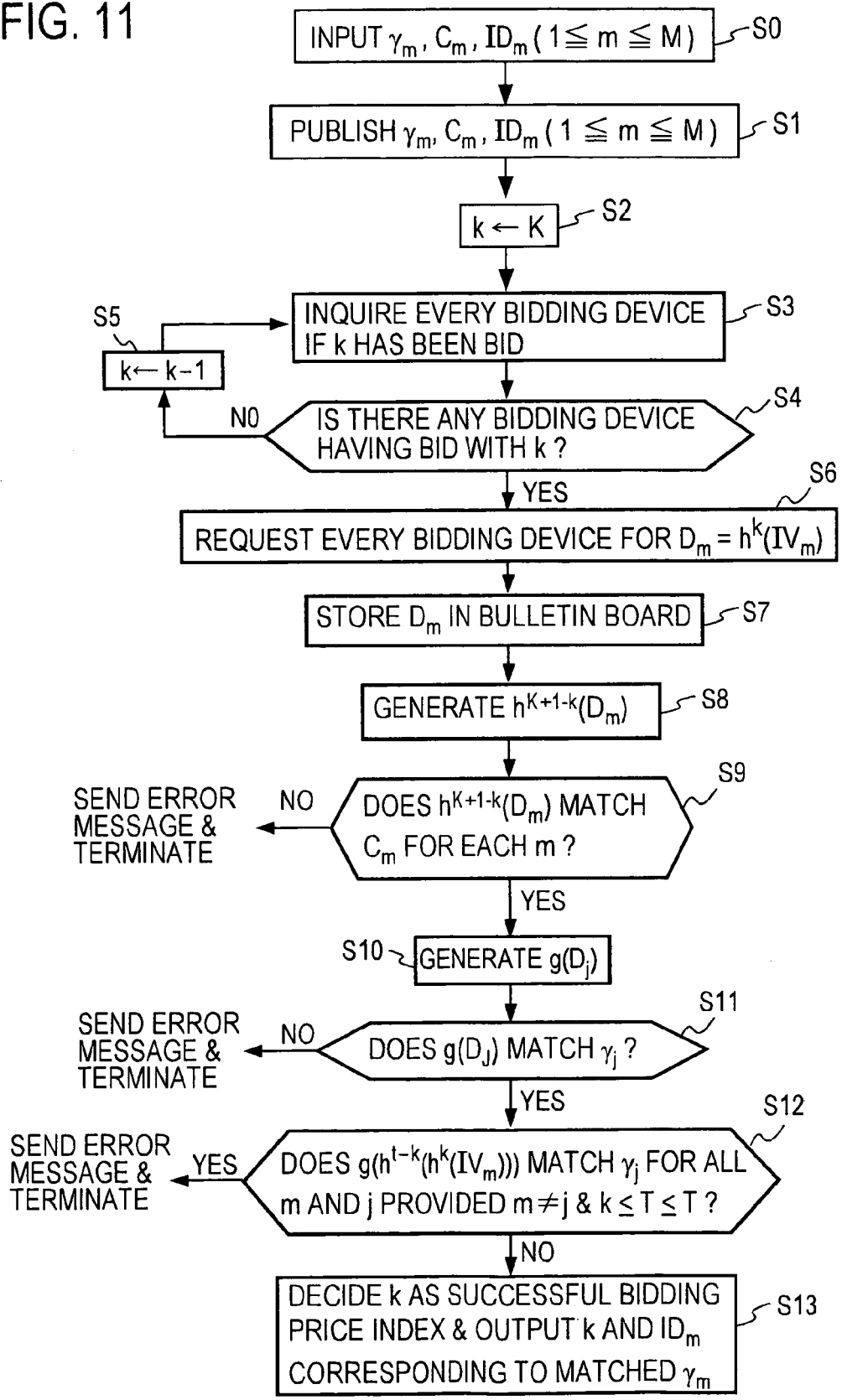
FIG. 11 is a flowchart showing the bid-opening procedure of the bid-opening device depicted in FIG. 10.

The bidding device $10_m$ is identical in construction as in the second embodiment, and in the constructions of FIGS. 3 and 4 the data storage part 14S is provided in which there are prestored $D_m^{(1)}, \ldots, D_m^{(K)}$ and $C_m = D_m^{(k+1)}$. The bid-opening device 20, shown in FIG. 10, is basically identical in construction with the bid-opening device of FIG. 8, and no description will be repeated, but as will be described below with reference to FIG. 11, the operation of the bid-opening device in this embodiment differs from the operation depicted in FIG. 9.

Step S0: The bidding devices $10_1$ to $10_M$ each send in advance the verification information $C_m (=h^{K+1}(IV_m))$ to the bid-opening device 20 together with the bidding price information $\gamma_m (=g(h^{km}(IV_m))$ and the identifiers $ID_m$.

Step S1: The bid-opening device 20 first publishes the plural pieces of bidding price information $\gamma_m$ and verification information $C_m$ and the identifiers $ID_m$ on the bulletin board 25.

Step S2: Set the count value k of a counter 24 at the upper limit value K.

Step S3: Inquire of all the bidding devices 10m (where n=1, 2, ..., M) about whether they have bid the price k.

Step S4: Decide whether there is bidding device having bid with the price index k.

Step S5: If no bidding device have bid the price, decrement k by the subtractor 24 to k←k−1 and return to step S3.

Step S6: When it is found that any one of the bidding devices $10_m$ has bid with the price index k, request all the bidding devices 10m to present $h^k(IV_m)$. Each bidding device $10_m$ reads out of the data storage part 14S the data $D_m = h^k(IV_m)$ precalculated corresponding to k as depicted in FIG. 4, and sends the read-out data $D_m$ to the bid-opening device 20.

Step S7: Publishes all the responses $D_m$ from the bidding devices $10_m$ on the bulletin board 25.

Step S8: For all the responses $D_m$, generate $h^{K-k+1}(D_m)$ by the one-way function h processor 22.

Step S9: Check whether each data $h^{K-k+1}(D_m)$ matches the corresponding verification information $C_m$ on the bulletin board 25. If no mismatch is found, decide that the responses Dm are all correct, and proceed to the subsequent steps. If a mismatch is found, send an error message to each bidding device $10_m$ and finish this bid-opening session for the price index k.

Step S10: When no mismatch is found in step S9, generate $g(D_j)$ by the one-way function g processor 23 for the response $D_j$ (where 1≦j≦M) from the bidding device $10_j$ which has identified itself as having bid with the price k.

Step S11: Check whether $g(D_j)$ matches the bidding price information $\gamma_j$ of the bidding device 10j on the bulletin board 25. If they match, decide that the bidding device $10_j$ has bid the price k. If they do not match, send an error message to all the bidding devices and discontinue the session.

As described above, in this embodiment, when no bidding device identifies itself as having bid the price k in reply to the inquiry in step S3, the bidding devices $10_m$ are not required to send $D_m (=h^k(IV_m))$ to the bid-opening device 20, and hence the communication cost is small as compared with that in the second embodiment accordingly.

As described below, a check is made, if necessary, to see if another bidding device 10m (different from the device 10j) has bid a value higher than k.

Step S12: For t such that k≦t≦K and all m's except j (1≦m≦M, m≠j), it is checked whether $g(h^{t-k}(h^k(IV_m)))$ matches the bidding price information $\gamma_m$ on the bulletin board 25 for t=k, k+1, ..., K, and if a match is found, then send an error message to each bidding device concerned and discontinue the bid-opening session.

Step S13: If no match is found, then output the winning bidding price k and the identifier $ID_j$ of the bidding device having offered the winning bid.

With this check or verification, if a bidding device makes a false response to the inquiry about whether it has bid, for example, with k, this dishonest bidding device is detected; that is, this embodiment satisfies the "undeniability" requirement. When this checking does not takes place, the bid-opening device 20 outputs k and $ID_j$ when deciding in step S11 that the bidding device $10_j$ has bid with k.

In this way, this embodiment keeps losing bids, except the winning one, secret from even the bid-opening device 20 and reduces the communication cost.

While in the above the highest price bid is the winning bid, the lowest price bid can be chosen as the successful bid simply by arranging monotonously decreasing (or increasing) values of the bidding price PR on the conversion table in a one-to-one correspondence with monotonously increasing (or decreasing) values of the price index k.

Fourth Embodiment

This embodiment is intended to permit simplification of the processing in the bid-opening device 20 and reduction of the communication cost.

Figure 12:
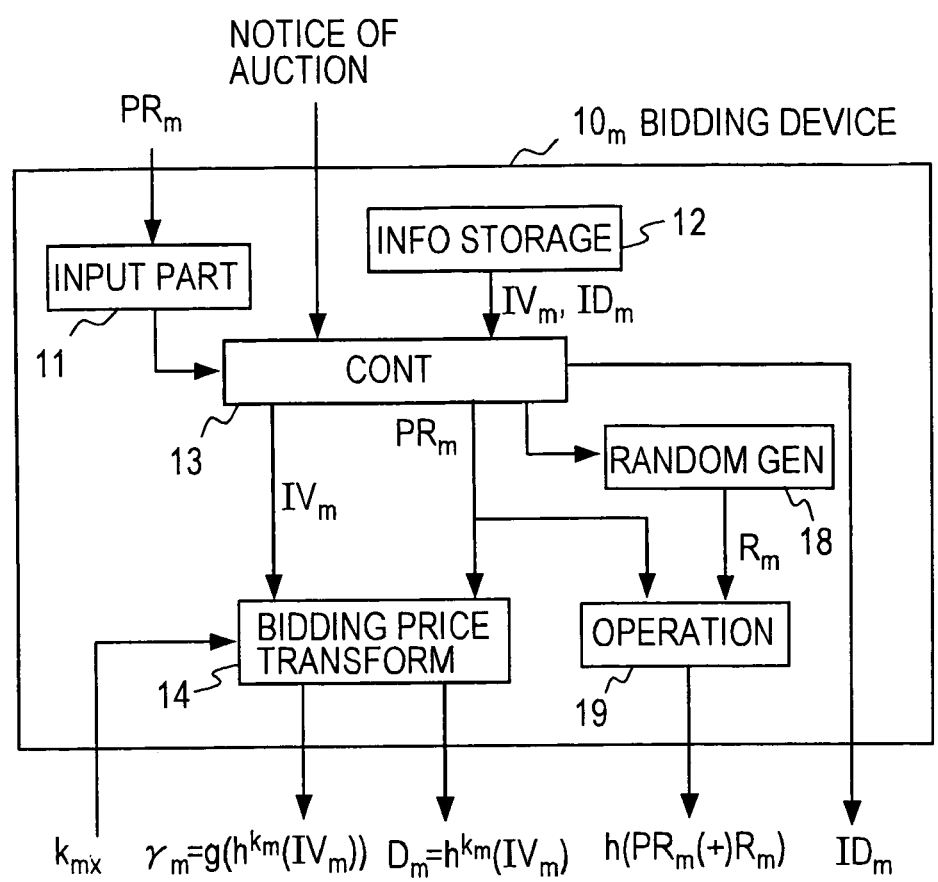
FIG. 12 is a block diagram illustrating the functional configuration of a bidding device in a fourth embodiment of the present invention.

As depicted in FIG. 12, each bidding device $10_m$ has a construction in which a random generator 18 and an operation part 19 are added to the bidding device shown in FIGS. 3 and 4. The random generator 18 generates a random number $R_m$ known only to the bidding device $10_m$. The operation part 19 uses the random number $R_m$ and the bidding price $PR_m$ to perform a predetermined operation such as a bit concatenation, exclusive ORing, addition, or multiplication (which operation will hereinafter be denoted by (+)), then processes the operation result with the one-way function h, and sends the processed output $h(PR_m(+)R_m)$ to the bid-opening device 20, together with the bidding price information $\gamma_m = g(h^{km}(IV_m))$ and the identifier $ID_m$.

Figure 13:
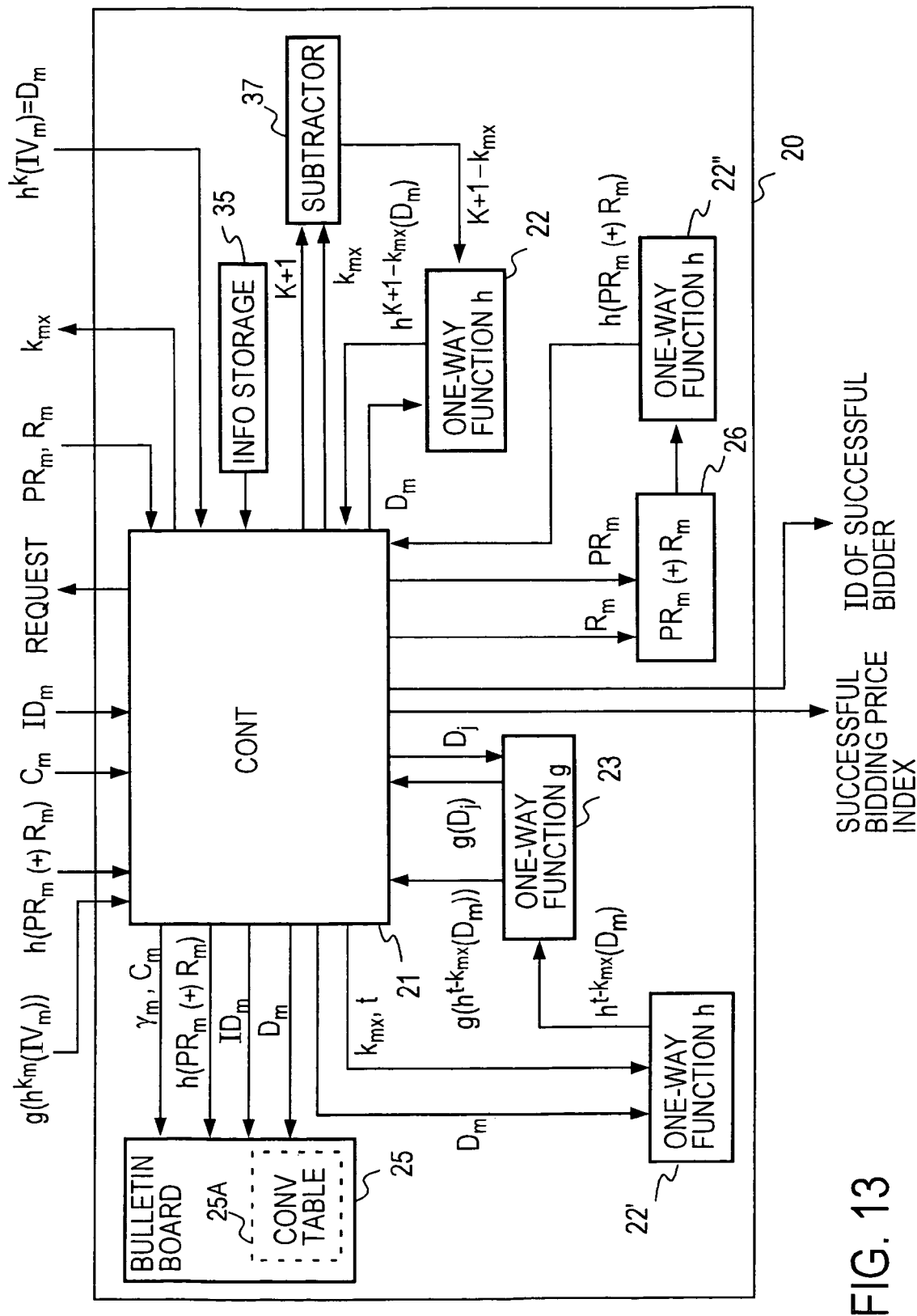
FIG. 13 is a block diagram illustrating the functional configuration of a bid-opening device in the fourth embodiment.
Figure 14:
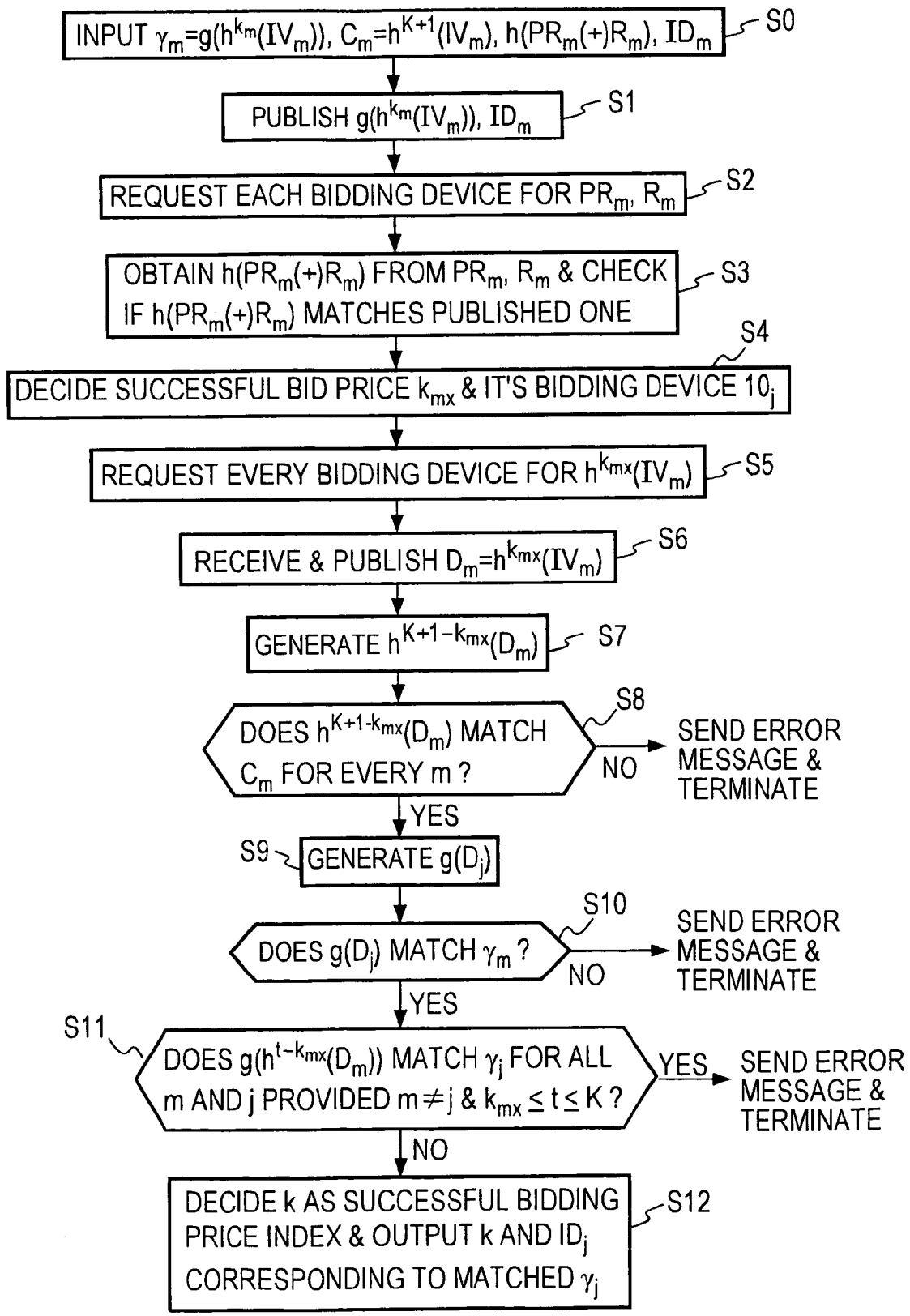
FIG. 14 is a flowchart showing the bid-opening procedure of the bid-opening device depicted in FIG. 13.

FIG. 13 illustrates in block form the functional configuration of the bid-opening device 20 in this embodiment, and FIG. 14 is a flowchart for explaining its operation. The bid-opening device 20 has a construction in which one-way function h processors 22' and 22'' and an operation part 26 are added to the device of FIG. 10 and a subtractor 37 is replaced for the counter 24. For simplicity sake, the program storage part 27S is not shown. At the time of bidding every bidding device $10_m$ (where m=1, 2, ..., M) sends $h^{K+1}(IV_m)$ to the bid-opening device 20, along with the bidding price information $\gamma_m (=g(h^{km}(IV_m)))$, the identifier $ID_m$ and the random number information $h(PR_m(+)R_m)$.

Step S1: Receive $\gamma_m$, $C_m(=h^{K+1}(IV_m))$, $h(PR_m(+)R_m)$ and $ID_m$ from each bidding device 20 and write and hence publish them on the bulletin board 25.

Step S2: Request all the bidding devices $10_m$ to present their bidding prices $PR_1$ and random numbers $R_m$.

Step S3: Upon receiving $PR_m$ and $R_m$ from each bidding device 10m, compute $(PR_m(+)R_m)$ in the operation part 26, then compute $h(PR_m(+)R_m)$ by the one-way function h processor 22'', and make a check to determine whether the value matches $h(PR_m(+)R_m)$ published on the bulletin board 25.

Step S4: At this point the bid-opening device 20 learns all the bidding prices. The bid-opening device 20 obtains from the conversion table 25A a price index $k_{mx}$ corresponding to the highest value among the bidding prices $PR_m$. The bidding device (the successful bidding device) which has bid $k_{mx}$ will hereinafter be identified by $10_j$. At this point each bidding device cannot learn the bidding prices of the other bidding devices.

Step S5: Send $k_{mx}$ to all the bidding devices $10_m$ and request them to present $D_m=h^{kmx}(IV_m)$.

Step S6: Each bidding device $10m$ reads out $D_m=h^{kmx}(IV_m)$ corresponding to $k_{mx}$ from the data storage part 14S described previously with respect to FIG. 4, and sends the read-out Dm to the bid-opening device 20, which writes on the bulletin board 25 all the pieces of data $D_m$ sent from the bidding devices $10_m$.

Step S7: For each $D_m$, calculates $K+1-k_{mx}$ by a subtractor 37 and generate $h^K+1-k_{mx}(D_m)$ by the one-way function h processor 22 from $K+1-k_{mx}$ and $D_m$.

Step S8: Verify whether $h^{K+1-k\ mx}(D_m)$ matches the corresponding verification information $C_m$ on the bulletin board 25. If no mismatch is found, decides that all the responses Dm are correct, and proceed to the subsequent steps. If a mismatch is found, sends an error message to each bidding device and discontinue further operation.

Step S9: If no mismatch is found in step S8, generate $g(D_j)$ by the one-way function g processor 23 for $D_j$ presented by the successful bidding device $10_j$.

Step S10: Verify whether $g(D_j)$ matches the bidding price information $\gamma_j$ in the bidding data of the bidding device $20_j$ on the bulletin board 25. If they match, decide that the bidding device $10_j$ has bid with the price index $k_{mx}$. If they do not match, send an error message to each bidding device and discontinue the current bid-opening session.

As described below, a check is made, if necessary, to see if another bidding device $10m$ (different from the device $10j$) has bid a value higher than $k_{mx}$.

Step S11: For $t=k_{mx}+1, k_{mx}+2, \ldots, K$, compute $h^{t-kmx}(D_m)$ by the one-way function processor 22' and process the computed result by the one-way function g processor 23 to obtain $g(h^{t-kmx}(D_m))$, and verify whether this $g(h^{t-kmx}(D_m))$ matches the bidding price information $\gamma_m$ on the bulletin board 25 for all m's except j ($1 \leq m \leq M$, $m \neq j$).

Step S12: If a match is found, then send an error message to each bidding device concerned and discontinue the current bid-opening session. If no match found, then output the winning bidding price index $k_{mx}$ and the identifier $ID_j$ of the bidding device $10_j$ having offered the winning bid.

For example, in the case where the bidding device $10m$ bids with the random number information $h(PR_m(+)R_m)$ and the bidding price information $\gamma_m=g(h^{km}(IV_m)$ (where $PR_m'>PR_m$) and presents a price $PR_1'$ higher than the bidding price $PR_m$ and the random number $R_m$ in reply to the request for the presentation of $PR_m$ and $R_m$ in step S2 and the price $PR_m'$ becomes the highest bid value, if the bidding device presents $D_m=h^{kmx}(IV_m)$ in reply to the request for the presentation of $h^{kmx}(IV_m)$ in step S5, it will pass the verifications in steps S7 and S8, incurring the possibility that the price $PR_m$ lower than $PR_1'$ becomes the winning bid. However, this can be prevented because a mismatch is found between $g(D_m)=g(h^{kmx}(IV_m))$ and $\gamma_m=g(h^{km}(IV_m)$ in steps S10 and S11.

With the bid-opening device 20, it is possible to specify the winning bid and the corresponding successful bidding device from $PR_m$, $R_m$ and $ID_m$ with ease, reduce the communication cost and verify that the winning bidding price and the winning device determined from $PR_m$, $R_m$ and $ID_m$ are true.

Fifth Embodiment

Figure 15:
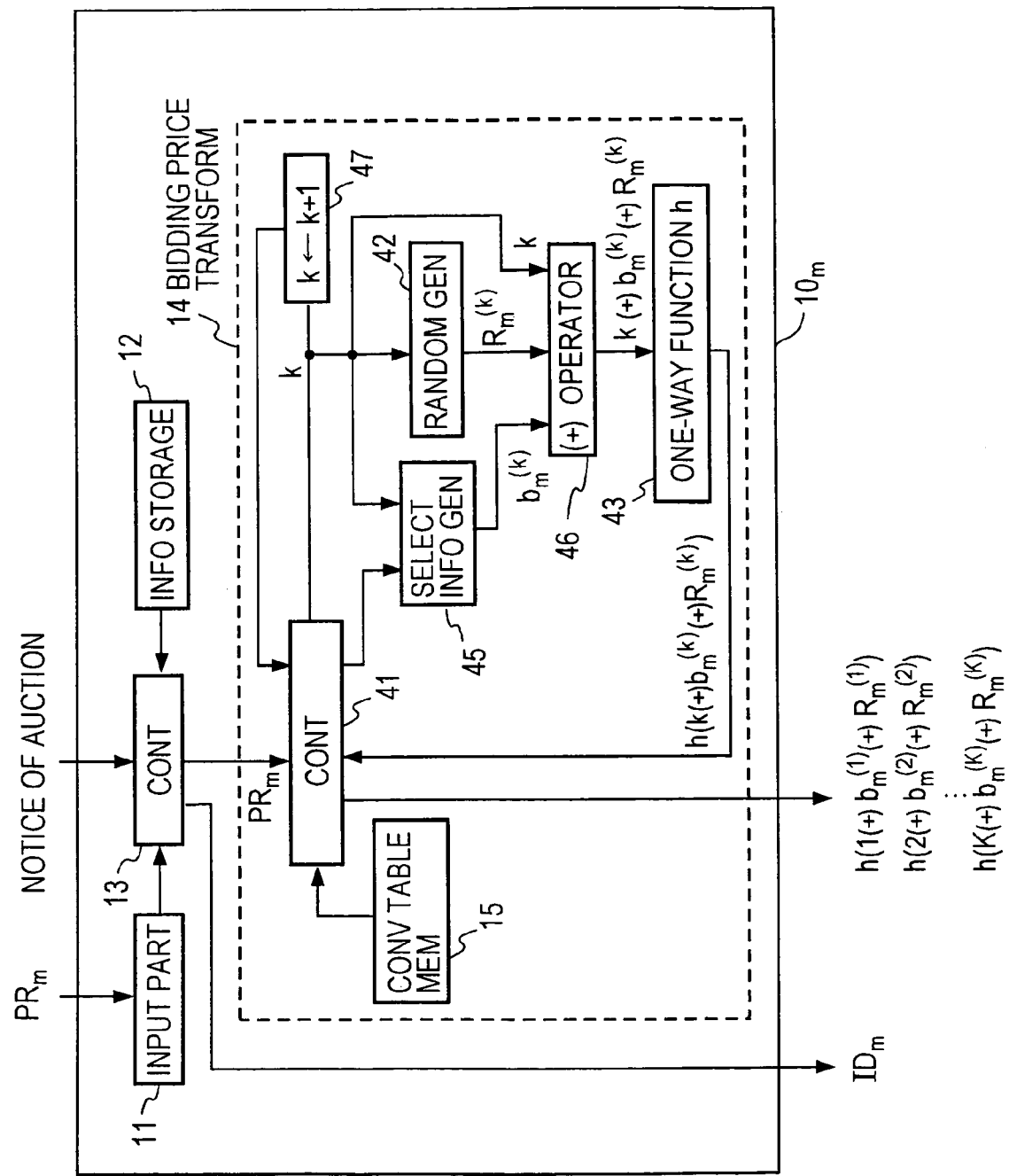
FIG. 15 is a block diagram illustrating the functional configuration of a bidding device in a fifth embodiment of the present invention.

In this embodiment each bidding device sends to the bid-opening device bidding price information containing select information which indicates whether to bid for each of K kinds of biddable prices. As depicted in FIG. 15, the bidding price transformer 14 of the bidding device $10_m$ comprises a control part 41, a random generator 42, a one-way function h processor 43, a select information generator 45, a (+) operation part 46 and an adder 47.

Let $PR_m$ represent that one of the K kinds of price indexes $1, 2, \ldots, K$ which the bidding device $10_m$ is to actually to bid. The select information denoted by $b_m^{(k)}$ is defined as follows: $b_m^{(k)}=0$ when the bidding device $10^m$ does not bid for the price index k such that $1 \leq k \leq K$, and $b_m^{(k)}=1$ when the bidding device $10_m$ bids for the price index k. Accordingly, only one piece of information $b_m^{(k)}$ exists for k such that $1 \leq k \leq K$. As mentioned above, the two values of the information $b_m^{(k)}$ may be any values as long as they differ from each other. The information $b_m^{(k)}$ is known only to the bidding device $10_m$, which uses it as a random number for each value of the price index k. The bidding device $10_m$ outputs $\{ID_m, h(1(+)b_m^{(1)}(+)R_m^{(1)}), h(2(+)b_m^{(2)}(+)R_m^{(2)}), \ldots, h(K(+)b_m^{(K)}(+)R_m^{(K)})\}$ as bidding price information.

Figure 16:
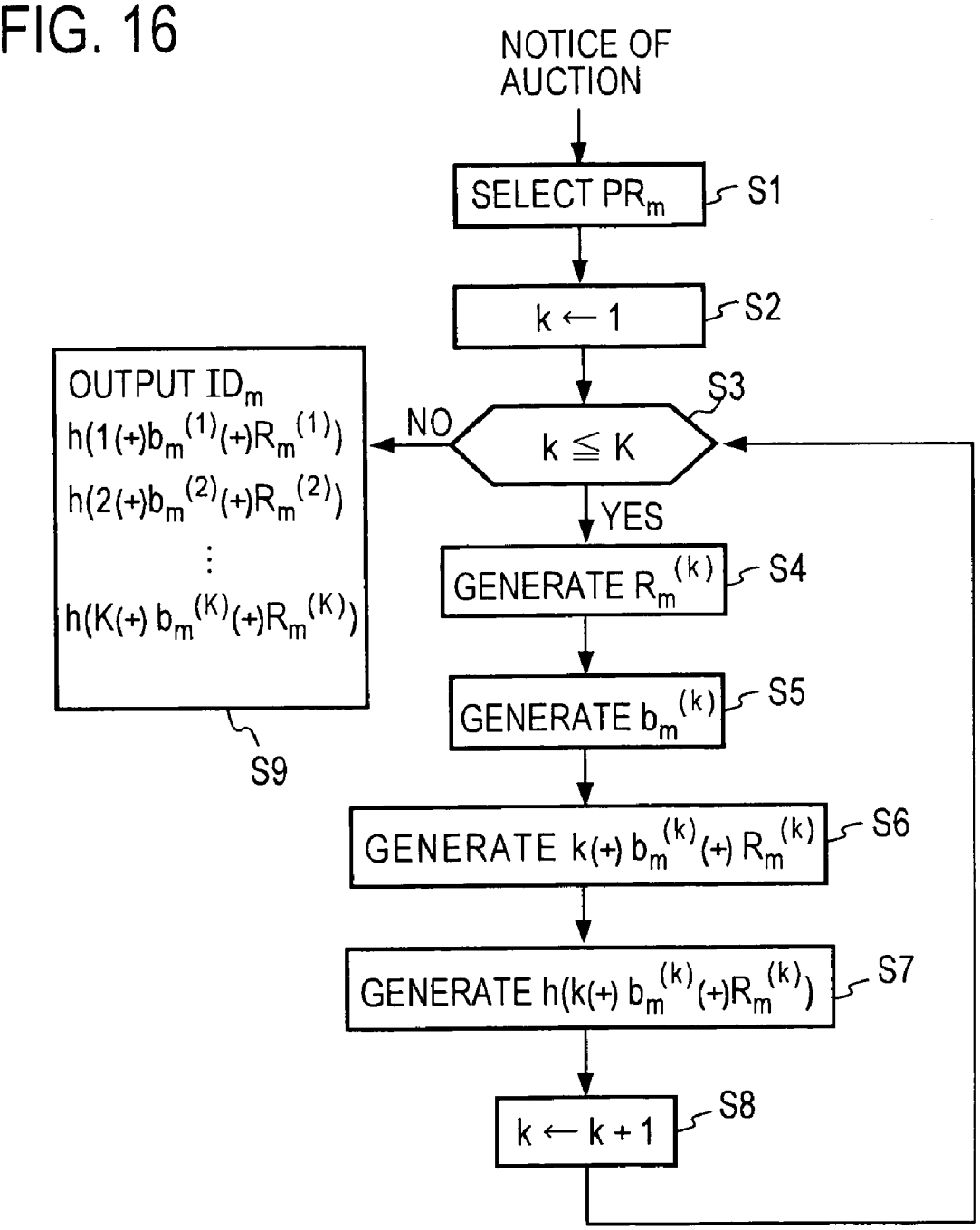
FIG. 16 is a flowchart showing the bidding procedure of the bidding device depicted in FIG. 15.

A description will be given, with reference to FIG. 16, of the procedure by which K pieces of bidding price information are prepared.

Step S1: The bidding price $PR_m$ is determined and input.

Step S2: Set the initial value of the price index k to 1.

Step S3: Make a check to see if $k \leq K$.

Step S4: If $k \leq K$, generate the random number $R_m^{(k)}$ by the random generator 42.

Step S5: Generate the rice select information $b_m^{(k)}$ by the select information generator 45 in accordance with the bidding price $PR_m$.

Step S6: The (+) operation part 46 inputs thereinto these pieces of information $R_m^{(k)}$ and $b_m^{(k)}$, and compute $k(+)b_m^{(k)}(+)R_m^{(k)}$. (+) indicates a predetermined appropriate operation, which may be a concatenation, addition, subtraction, multiplication, or the like.

Step S7: Process the result of this operation by the one-way function h processor 43 to generate $h(k(+)b_m^{(k)}(+)R_m^{(k)})$.

Step S8: Increment k by one by the adder 47, followed by a return to step S3.

Step S9: When k exceeds K and the processing for all values of k ends, the bidding device $10_m$ sends the identifier $ID_m$ and the bidding price information $\{h(1(+)b_m^{(1)}(+)R_m^{(1)}), \ldots, h(K(+)b_m^{(K)}(+)R_m^{(K)})\}$ to the bid-opening device 20.

By generating the bidding price information for each price through utilization of the one-way function and sending all the pieces of bidding price information to the bid-opening device 20 as described above, the aimed bidding price can be kept secret.

Figure 17:
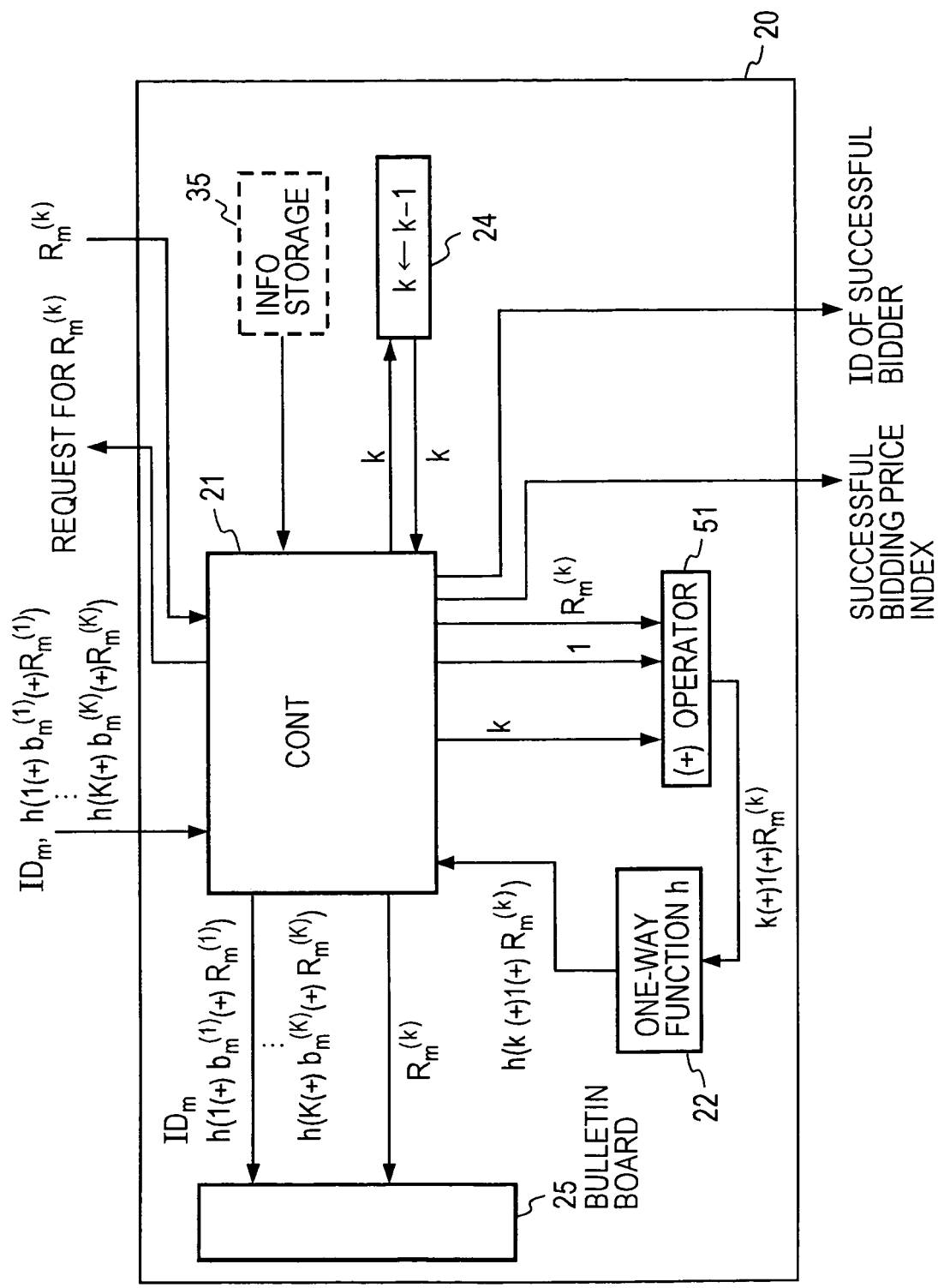
FIG. 17 is a block diagram illustrating the functional configuration of a bid-opening device in a fifth embodiment of the present invention.

FIG. 17 illustrates in block form the bid-opening device 20 which performs the bid-opening process based on such bidding price information sent thereto. The bid-opening device 20 comprises a control part 21, a one-way function h processor 22, a subtractor 24, an information storage part 35, a bulletin board 25 and a (+) operation part 51. As is the case with FIG. 8, the program storage part 27S is also provided but is not shown for the sake of brevity.

Figure 18:
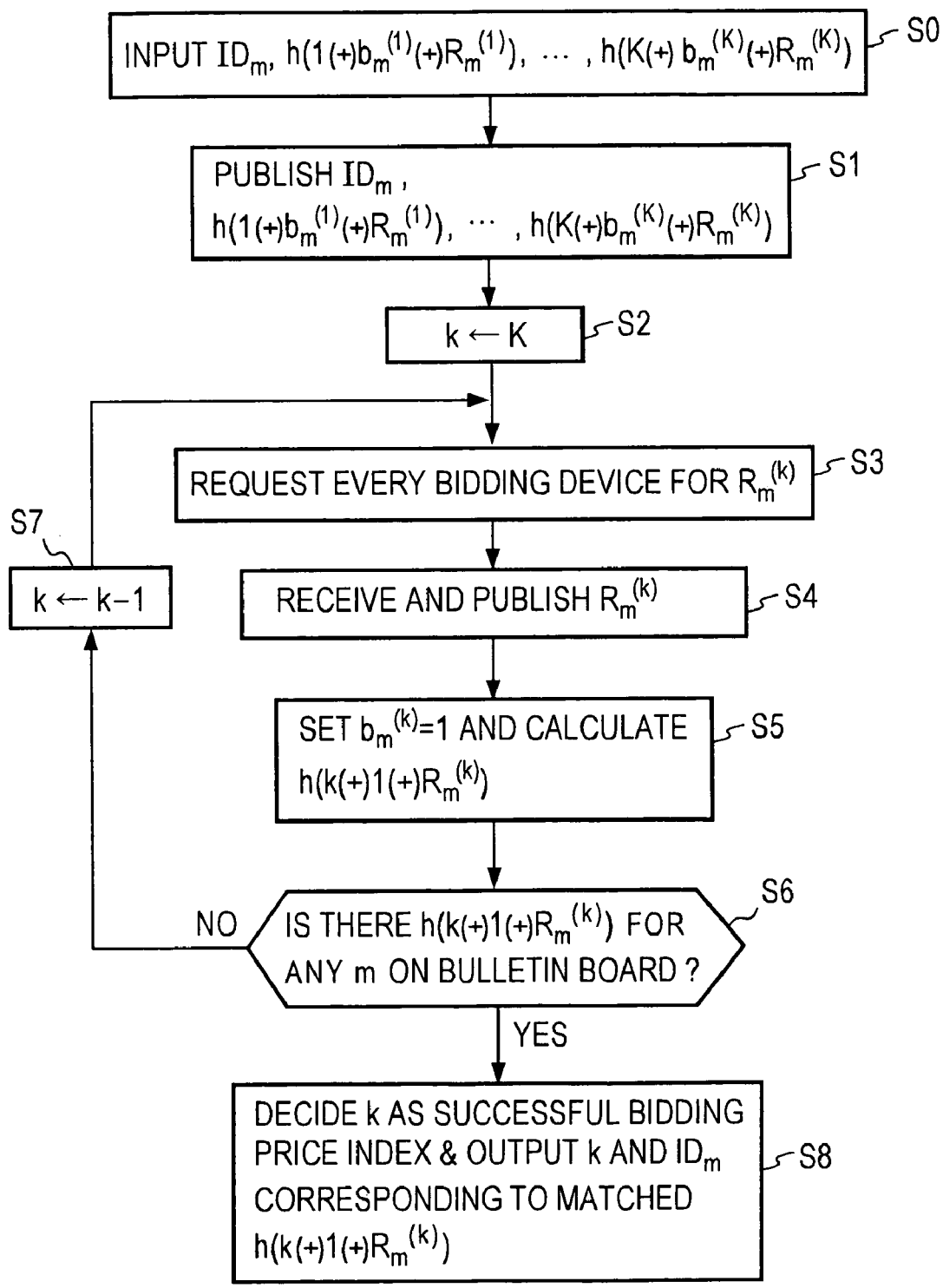
FIG. 18 is a flowchart showing the bid-opening procedure of the bid-opening device depicted in FIG. 17.

FIG. 18 is a flowchart for explaining the operation of this bid-opening device 20.

Step S0: Receive the bidding price information $\{ID_m, h(1(+)b_m^{(1)}(+)R_m^{(1)}), h(2(+)b_m^{(2)}(+)R_m^{(2)}), \ldots, h(K(+)b_m^{(K)}(+)R_m^{(K)})\}$ from the bidding device $10_m$ (where $m=1, 2, \ldots, M$).

Step S1: Write and hence publish the bidding price information on the bulletin board 25.

Step S2: Set the price index k to its highest value K.

Step S3: Request each bidding device $10_m$ to present the random number $R_m^{(k)}$.

Step S4: The bidding devices $10_m$ each send the random number $R_m^{(k)}$ to the bid-opening device 20, which writes all the random numbers $R_m^{(k)}$ on the bulletin board 25.

Step S5: Set $b_m^{(k)}=1$, then input $b_m^{(k)}$ and $R_m^{(k)}$ to the (+) operation part 51 to perform an operation $k(+)1(+)R_m^{(k)}$, and process the result of operation by the one-way function h processor 22 to obtain $h(k(+)1(+)R_m^{(k)})$.

Step S6: For each m, make a check to see if a match is found between the calculated $h(k(+)1(+)R_m^{(k)})$ and $h(k(+)1(+)R_m^{(k)})$ on the bulletin board 25.

Step S7: If no match is found, decrement k such that $k \leftarrow k-1$, and return to step S3.

Step S8: If a match is found, determine the k as the successful price index k, then output the price index k and the identifier $ID_m$ of the bidding device $10_m$ concerned, and discontinue the current bid-opening session.

As described above, according to this embodiment, the bidding price information corresponding to each price index is generated using the one-way function and all the pieces of bidding price information are sequentially opened in decreasing order from the highest value. This enables non-winning bids to be kept secret.

In the case of choosing the lowest price bid as the successful bid in this embodiment, the bidding device $10_m$ similarly sends the bidding price information $\{ID_m, h(1(+)b_m^{(1)}(+)R_m^{(1)}), h(2(+)b_m^{(2)}(+)R_m^{(2)}), \ldots, h(K(+)b_m^{(K)}(+)R_m^{(K)})\}$ to the bid-opening device 20. The bid-opening device 20 carries out about the same processing as depicted in FIG. 18, but in step S2 the lowest value 1 of the K kinds of biddable price indexes is set to k and in step S6 the index k is incremented by one such that $k \leftarrow k+1$.

In the case of choosing the highest price bid as the winning bid in this embodiment, since random numbers $R_m^{(t)}$ received from all the bidding devices for t (where $k \leq t \leq K$) are recorded on the bulletin board 25 in step S4, it is possible to detect that $b_m^{(k)}=0$ for the index larger than the winning price index k, by calculating $h(t(+)b_m^{(t)}(+)R_m^{(t)})$ and comparing it with $h(k(+)b_m^{(k)}(+)R_m^{(k)})$ published on the bulletin board 25. Accordingly, any one can determine if the winning price index k is correct.

Figure 19:
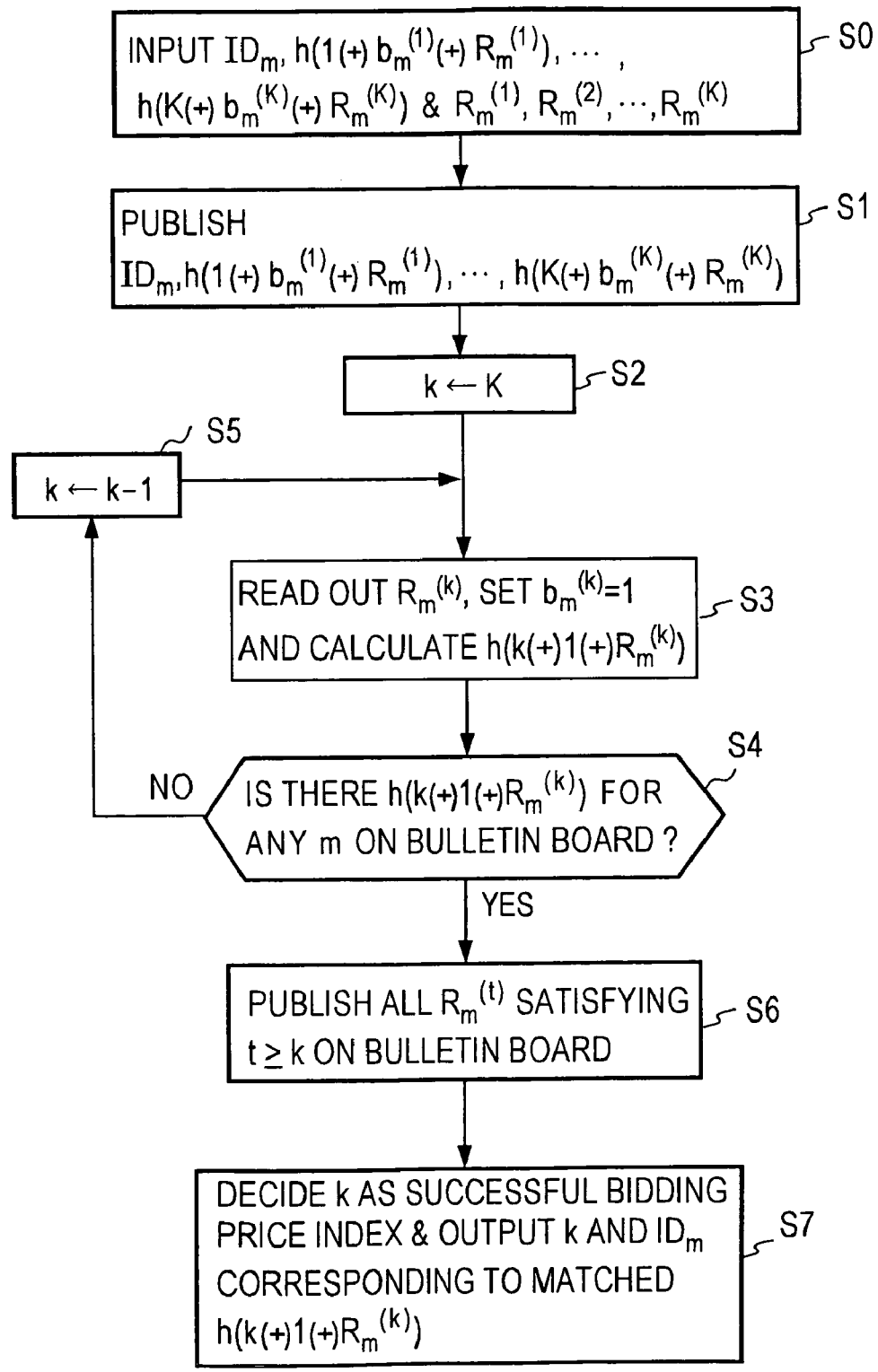
FIG. 19 is a flowchart showing the bid-opening procedure in a modified form of the fifth embodiment.

In this embodiment it is also possible for each bidding device $10_m$ to send the set of random numbers $\{R_m^{(k)}\}$ ($k=1, \ldots, K$) to the bid-opening device 20 in advance together with $ID_m$ and $h(k(+)b_m^{(k)}(+)R_m^{(k)})$. In this case, however, the random number $R_m^{(k)}$ is not written on the bulletin board 25 but is stored in the broken-lined information storage part 35. In FIG. 19 there is shown a flowchart for explaining the processing which the bid-opening device 20 performs in such an instance.

Step S0: Receive the bidding price information $\{ID_m, h(1(+)b_m^{(1)}(+)R_m^{(1)}), h(2(+)b_m^{(2)}(+)R_m^{(2)}), \ldots, h(K(+)b_m^{(K)}(+)R_m^{(K)})\}$ and random number information $\{R_m^{(1)}, R_m^{(2)}, \ldots, R_m^{(K)}\}$ from the bidding devices $10_m$ (where $m=1, 2, \ldots, M$).

Step S1: Write and hence publish only the bidding price information on the bulletin board 25 and store the random number information in the storage part 35 indicated by the broken line.

Step S2: Set the highest possible value K for the price index k.

Step S3: For all m's, generate $h(k(+)1(+)R_m^{(k)})$ read out of the storage part 35 with $b_b^{(k)}=1$.

Step S4: Verify whether a match is found between $h(k(+)1(+)R_m^{(k)})$ and the pieces of bidding rice information written on the bulletin board 25.

Step S5: If no match is found, decrement the price index k by one to $k \leftarrow k-1$ and return to step S3.

Step S6: For the index k for which the mach was found, write and publish all the random numbers $R_m^{(t)}$ ($k \leq t \leq K$) on the bulletin board 25.

Step S7: Determine k at this time as the winning price index, then output this index k and the identifier $ID_m$ of the bidding device $10_m$ having submitted the winning bid, and discontinue the current bid-opening session.

When the lowest bidding price bid is chosen as the successful bid in this case, the index k is set to the smallest possible value, 1 in this example, in step S2 in FIG. 19, then in step S4 the index k is incremented by one, and in step S5 all random numbers $R_m^{(t)}$ which are $1 \leq t \leq k$ are published on the bulletin board 25. The other operations are the same as those described above with reference to FIG. 19.

While in the above the select information $b_m^{(k)}$ has been described to be "0" or "1," they may be any values as long as they are two predetermined different integers.

Sixth Embodiment

In the second embodiment described previously, at the time of bidding each bidding device $10_m$ sends the bidding price information $\gamma_m=g(h^{km}(IV_m))$ and the verification information $C_m=h^{k+1}(IV_m)$ to the bid-opening device 20, and at the time of bid-opening the bid-opening device 20 requests the bidding device $10_m$ to send the information $D_m=h^k(IV_m)$, and verifies whether $h(D_m)$ and $C_m$ match for the information $D_m$ received from the bidding device $10_m$; if they match, then the bid-opening device 20 further verifies whether $g(D_m)$ matches the bidding price information $\gamma_m$. These verifications need to be made for all of $m=1, 2, \ldots, M$. Accordingly, the amount of data to be processed increases with an increase in the number M of bidding devices used. In addition, the larger the highest value K of the index k, the more the amount of multiple processing by the one-way function h; hence it is necessary to process an enormous amount of data.

To avoid this, the sixth embodiment utilizes one-way functions to transform the bidding price index $k_m$ to $gm = H_m^{(K)}=h^{K-km})g^{xm}(IV_m))$, which is sent to the bid-opening device 20. $x_m$ is an arbitrary integer equal to or greater than 1 which is determined by the bidding device $10_m$. When inquired about whether it has bid with the index k, the bidding device $10_m$ presents $H_m^{(k-1)}=h^{k-km-1}(g^{xm}(IV_m))$ if k is not its aimed bidding price index $k_m$, and if it is the aimed value, the bidding device $10_m$ presents $H_m^{(k-1)}=g^{xm-1}(IV_m)$. The bid-opening device 20 verifies the former with $h(H_m^{(k-1)})=H_m^{(K)}$ and the latter with $g(H_m^{(k-1)})=H_m^{(K)}$.

The M bidding devices $10_m$ indirectly bit the bidding price index values $k_m$ to the bid-opening device 20, which detects the largest one of the index values $k_m$ bit by the bidding devices $10_m$. Each bidding device $10_m$ and the bid-opening device 20 have a conversion table in which K bidding prices $PR_1, PR_2, \ldots, PR_K$ are held in a one-to-one correspondence with K kinds of index values $1, 2, \ldots, K$ in increasing order. In this embodiment, as the index value k (where $k=1, 2, \ldots, K$) increases, the value $PR_k$ becomes larger; for example, $PR_1=10, PR_2=15, PR_3=30, \ldots, PR_K=3000$.

Figure 20:
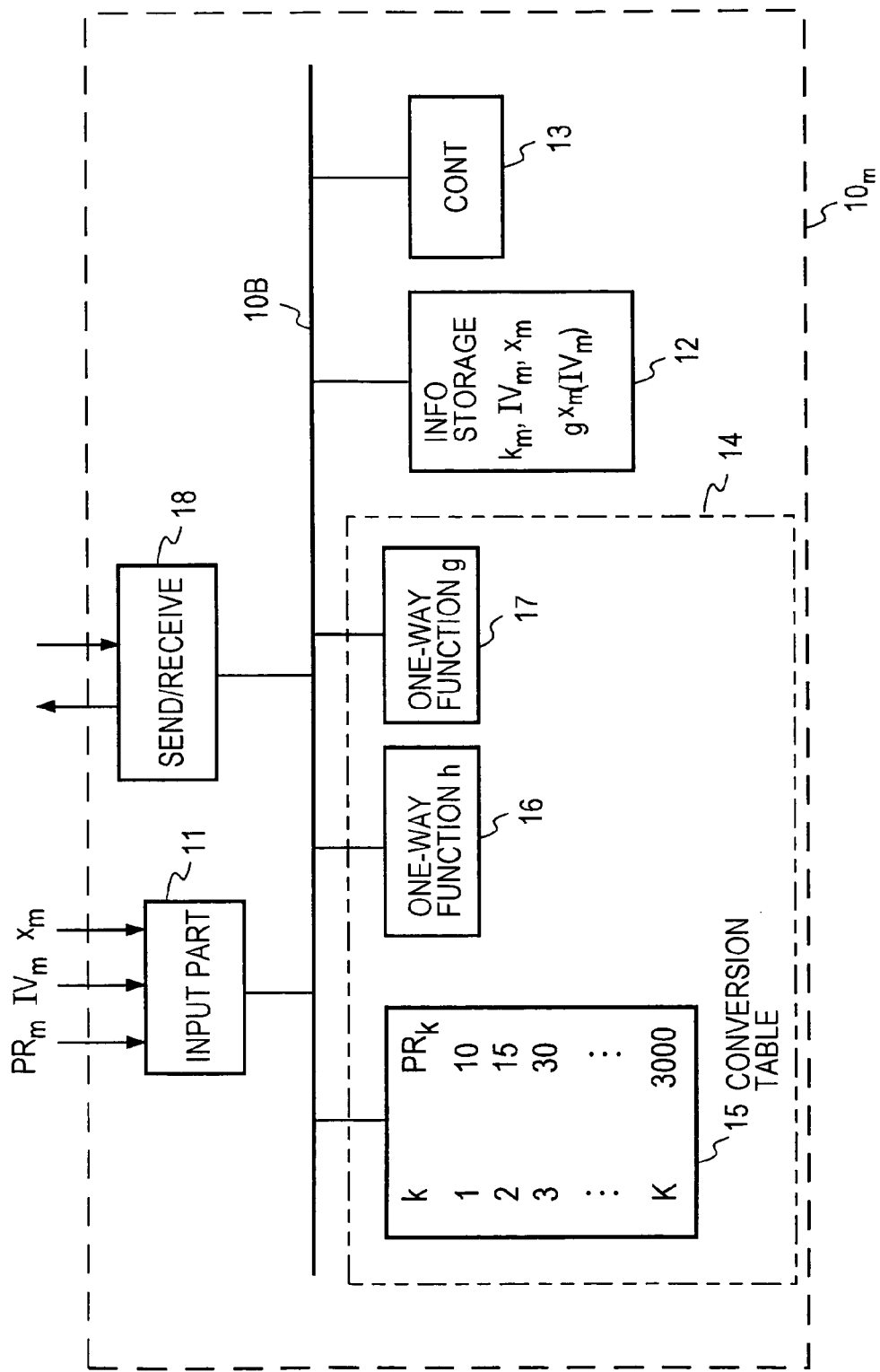
FIG. 20 is a block diagram illustrating the functional configuration of a bidding device in a sixth embodiment of the present invention.
Figure 21:
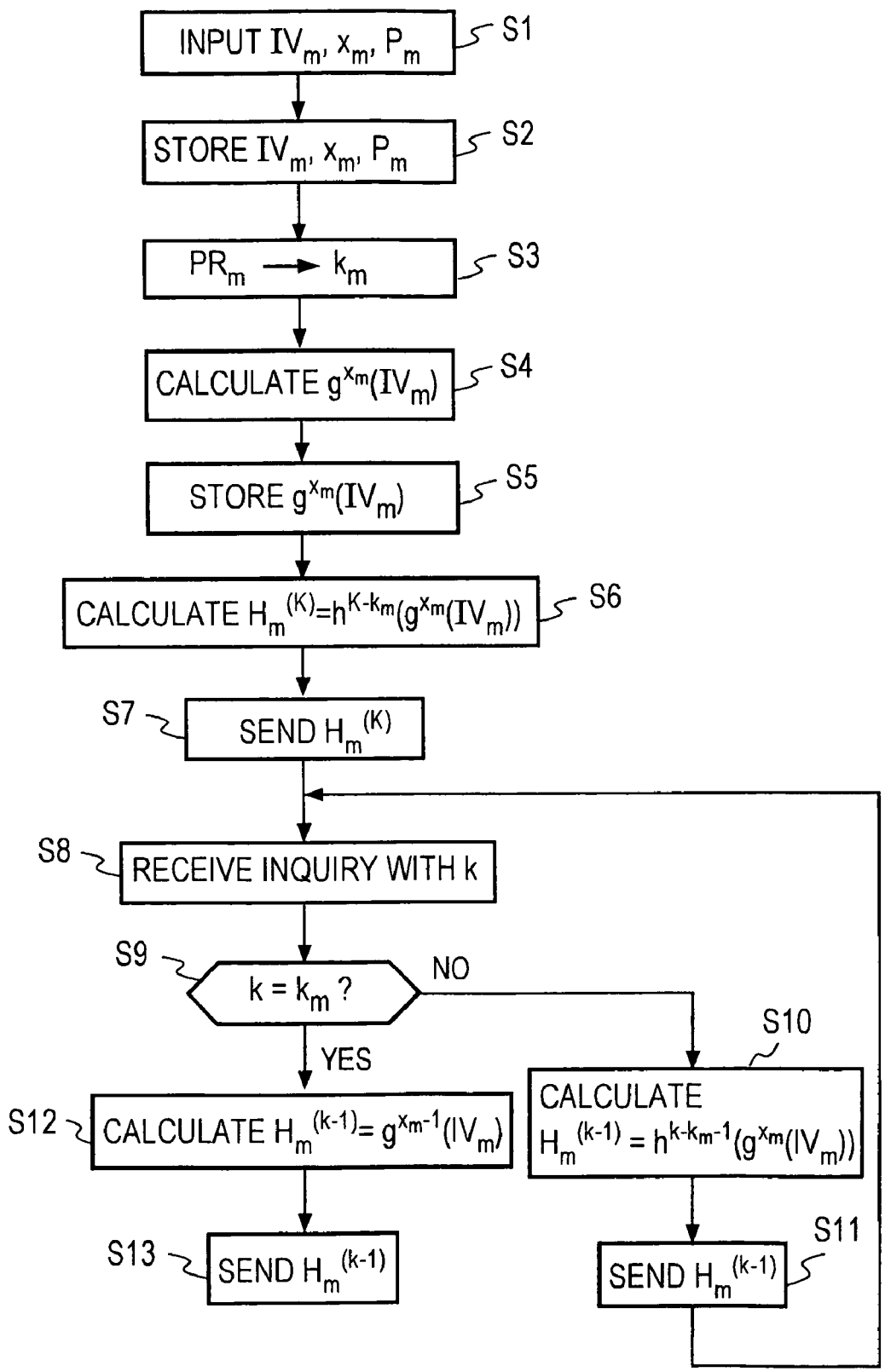
FIG. 21 is a flowchart showing the bidding procedure of the bidding device depicted in FIG. 20.

FIG. 20 illustrates in block form the functional configuration of the bidding device $10_m$ and FIG. 21 is a flowchart showing its bidding procedure. The bidding device $10_m$ comprises an input part 11, a control part 13, a bidding price transformer 14, a transceiver 18 and a storage part 12 all of which are interconnected via a common bus 10B. The bidding price transformer 14 is made up of a conversion table 15, a one-way function h processor 16 and a one-way function g processor 17. The control part 13 reads out a bidding procedure program stored in the storage part 12, and follows it to control the respective parts to perform bidding as described below.

Step S1: The bidding device $10_m$ receives via the input part 11 a value $PR_m$ selected from values $PR_1, PR_2, \ldots, PR_K$, an initial value (a positive integer) $IV_m$ and an arbitrary integer $x_m$ equal to or greater than 1.

Step S2: The control part 13 stores $IV_m$ and $x_m$ in the storage part 12.

Step S3: The control part 13 refers to the conversion table 15 with $PR_m$ to convert it to an index value $k_m$ and stores it in the storage part 12.

Step S4: The initial value $IV_m$ and the bidding price $x_m$ are read out from the storage part 12, then input to the one-way function g processor 17, wherein the initial value is processed $x_m$ times with the one-say function g to obtain $g^{xm}(IV_m)$.

Step S5: If necessary, $g^{xm}(IV_m)$ is stored in the storage part 12.

Step S6: $g^{xm}(IV_m)$, K and $k_m$ are input to the one-way function h processor 16, wherein $g^{xm}(IV_m)$ is processed $K-k_m$ times with the one-way function h to obtain $$H_m^{(K)} = h^{K-km}(g^{xm}(IV_m)).$$

Step S7: $H_m^{(K)}$ is sent as the bidding price information to the bid-opening device 20 via the transceiver 18.

In this way, the bidding device $10_m$ sends the aimed bidding price index value $k_m$ to the bid-opening device 20.

Step S8: Upon beginning the bid-opening procedure by the bid-opening device 20 after the bidding, each bidding device $10_m$ receives an inquiry with the price index k from the bit-opening device 20 by the transceiver 18 as depicted in FIG. 21.

Step S9: A check is made to see if the inquiry index value k is equal to the bidding price index $k_m$ stored in the storage part 12.

Step S10: If not equal, $g^{xm}(IV_m)$ is read out of the information storage part 12 and is input to the one-way function h processor 16 together with km and k, wherein $g^{xm}(IV_m)$ is processed $k-k_m-1$ times with the one-way function h to obtain response information $H_m^{(k-1)}$ by the following equation:

$$H_m^{(k-1)} = h^{k-km-1}(g^{xm}(IV_m))$$

Step S11: The bidding device $10_m$ sends the response information $H_m^{(k-1)}$ to the bid-opening device 20 via the transceiver 18 and waits for the next inquiry about k.

Step S12: If the inquiry about k corresponds to its aimed value, that is, if the index k is equal to $k_m$ in he storage part 12, the bidding device $10_m$ inputs the initial value $IV_m$ and $x_{m-1}$ to the one-way function g processor 17, wherein the initial value $IV_m$ is processed xm-1 times to obtain response information $H_m^{(k-1)} = g^{xm-1}(IV_m)$.

Step S13: The bidding device $10_m$ sends the response information $H_m^{(k-1)}$ to the bid-opening device 20.

Figure 22:
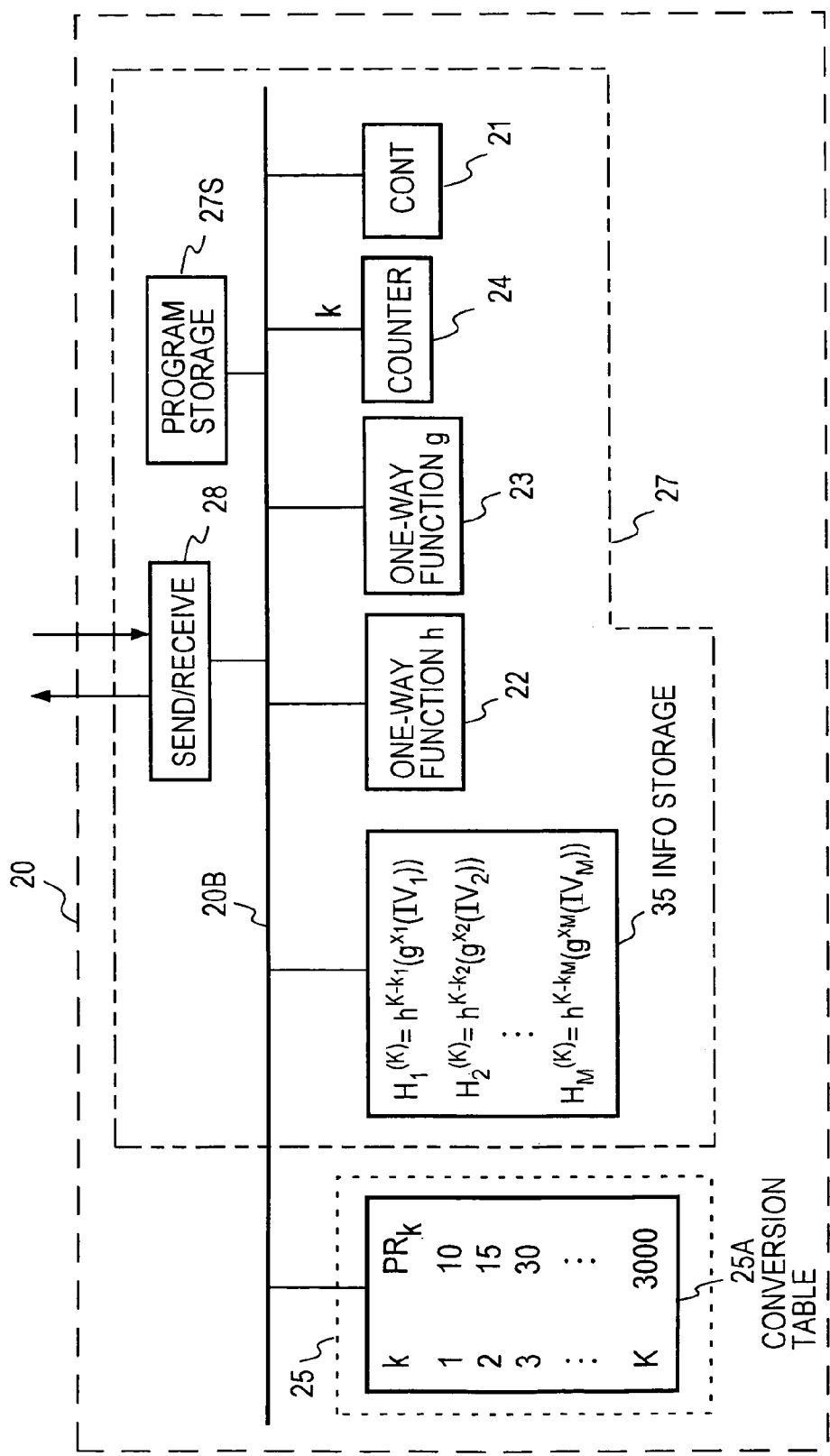
FIG. 22 is a block diagram illustrating the functional configuration of a bid-opening device in the sixth embodiment.
Figure 23:
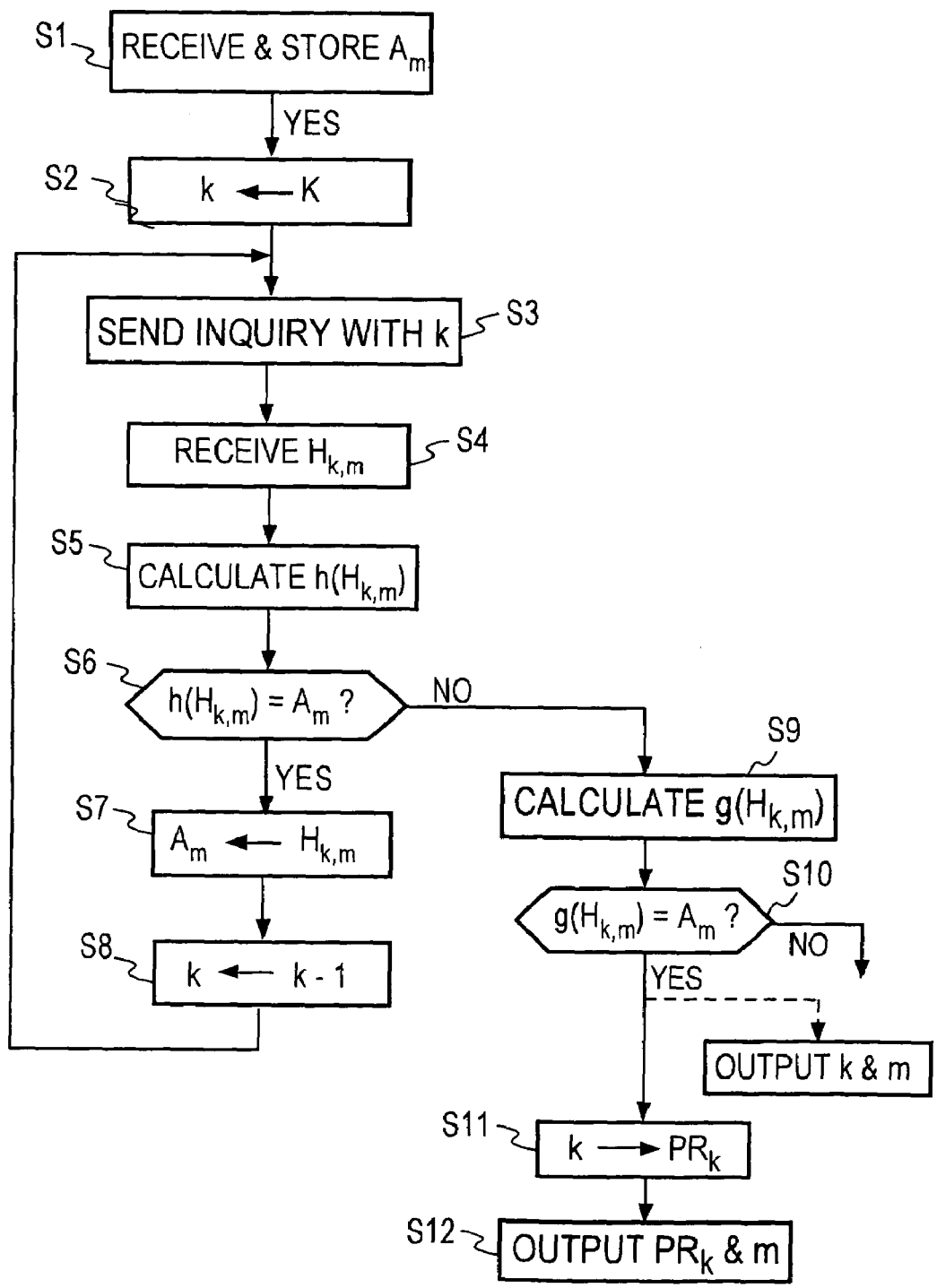
FIG. 23 is a flowchart showing the bid-opening procedure of the bid-opening device depicted in FIG. 22.

The functional configuration of the bid-opening device 20 is depicted in FIG. 22 and its bid-opening procedure in FIG. 23. The bid-opening device 20 comprises a control part 21, a program storage part 27S, a one-way function h processor 22, a one-way function g processor 23, a counter 24, a bulletin board 25, a conversion table 25A, a transceiver 28, and an information storage part 25, all of which are interconnected via a common bus 20B.

Step S1: Upon receiving the bidding information $\gamma_m = H_m^{(K)}$ from each bidding device $10_m$ by the transceiver 28, the control part 21 writes the bidding information $H_m^{(K)}$ on the bulletin board 25 to publish it.

Step S2: Set K as the initial value of k in the counter 24.

Step S3: Send the index value k on the counter 24 to each bidding device $10_m$, and send thereto an inquiry about bidding via the transceiver 28.

Step S4: Receive the response information $H_m^{(k-1)}$ by the transceiver 28 from all the bidding devices $10_m$.

Step S5: Input $H_m^{(k-1)}$ to the one-way function h processor 22 to process it with the one-way function h to obtain $h(H_m^{(k-1)})$.

Step S6: Check whether the result of operation $h(H_m^{(k-1)})$ is equal to the bidding information $A_m$ for m in the storage part 35.

Step S7: If $h(H_m^{(k-1)}) = H_m^{(K)}$, store the received information $H_m^{(k-1)}$ as updated bidding information $H_m^{(K)}$ in the storage part 35 to update $H_m^{(K)}$.

Step S8: Decrement the count value k of the counter 24 by one, then return to step S3, and inquire of each bidding device $10_m$ about whether it has made a registration for the value k.

Step S9: When it is found in step S6 that the response information $H_m^{(k-1)}$ from the bidding device $10_m$ is $g^{xm-1}(IV_m)$ which is equal to the aimed index value, $h(H_m^{(k-1)})$ does not become equal to $H_m^{(K)} = h^{ek+1-km-1}(g^{xm}(IV_m)) = g^{xm}(IV_m)$ in step S9. Then, input $H_m^{(k-1)}$ to the one-way function g processor 23 to process. $H_m^{(k-1)}$ with the one-way function g to obtain $g(H_m^{(k-1)})$.

Step S10: Make a check to see if $g(H_m^{(k-1)})$ is equal to $H_m^{(K)}$ corresponding to m stored in the storage part 35.

Step S11: When the bidding device 10, has performed correct processing, $h^{k+1-km-1}(g^{xm}(IV_m)) = g^{xm}(IV_m) = H_m^{(K)}$ by the process of step S7 at the time of previous inquiry for $k = k_{m+1}$; hence, $g(H_m^{(k-1)}) = H_m^{(K)}$ holds. In the inquiry processing for the index k which is decremented one by one, the index k for which $g(H_m^{(k-1)}) = H_m^{(K)}$ holds for the first time is the maximum value among the bidding price indexes of all the bidding devices, and this index k is converted to the value $PR_k$ by referring to the conversion table 25A.

Step S12: Output the value $PR_k$ as the highest one of the bid values, and if necessary, output the number m of the winning bidding device $10_m$ as well.

In the bidding procedure of FIG. 21, if $k = k_m$ in step S9 when inquired about whether it has bid k, the bidding device $10_m$ may send to the bid-opening device 29 in step S13 not only the response information $H_m^{(k-1)}$ but also information indicating $k = k_m$ (which information will hereinafter be referred to as identity information). In this instance, upon receiving the response information $H_m^{(k-1)}$ in step S4 in FIG. 23, the bid-opening device 20 makes a check for the identity information; if not having received it, the device 20 performs the operation $h(H_m^{(k-1)})$ and if having received the information, $g(H_m^{(k-1)})$. Incidentally, in the event that $g(H_m^{(k-1)}) \neq H_m^{(K)}$ in step S10 in FIG. 23, the bid-opening device 20 may discontinue the current bid-opening session for the reasons of dishonesty by the bidding device concerned and request all the bidding devices $10_m$ to rebid; alternatively, the bid-opening device 20 may abandon inquiring that bidding device but may continue inquiring the other bidding device.

In the case where the bidding prices $PR_k$ are arranged on each of the conversion tables 15 and 25A in such a decreasing order as 3000, 2950, 2900, . . . , 100 in correspondence with the K index values 1, 2, . . . , K, the price $PR_k$ corresponding to the index value k for which $g(H_m^{(k-1)}) H_m^{(K)}$ holds for the first time in the inquiry about bidding k represents the lowest one of the aimed bidding prices of all the bidding devices $10_m$.

The maximum value of the index may also be obtained without using the conversion table 15. In this instance, the bidding device $10_m$ sends the index value $k_m$, and after step S10 in FIG. 23 the bid-opening device 20 outputs the index value k as the highest value and, if necessary, together with the number m (or $ID_m$) of the bidding device $10_m$ having sent the index value $k_m$.

Figure 24:
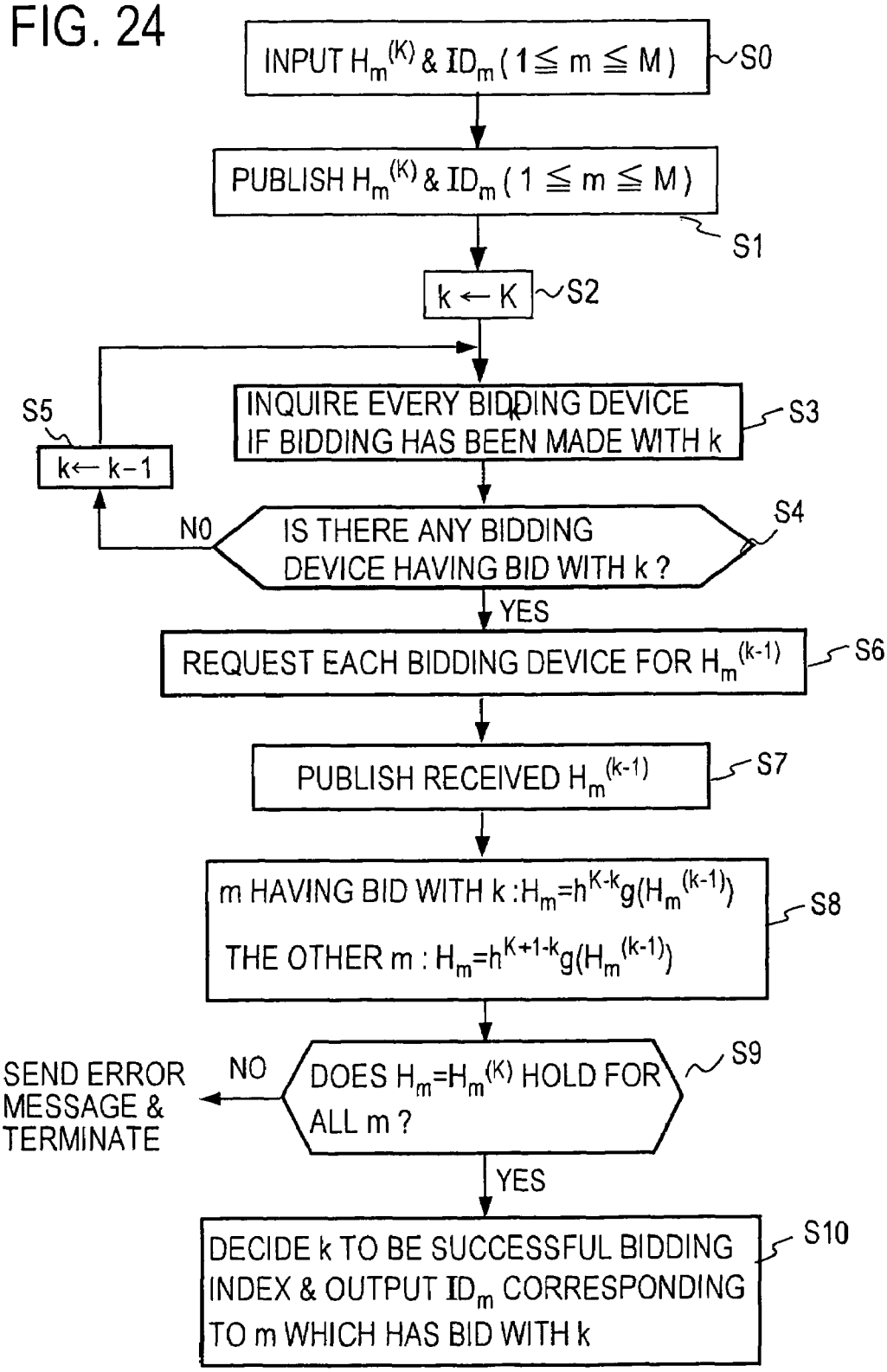
FIG. 24 is a flowchart showing a modified form of the bid-opening procedure depicted in FIG. 23.

In the bid-opening procedure depicted in FIG. 23, the bid-opening device 20 inquires every bidding device $10_m$ for each value of the index k=K, K−1, K−2, . . . , and receives $H_m^{(k-1)}$, and then processes it using the one-say function h in step S5; hence this procedure requires high communication cost and computational complexity. In FIG. 24 there is depicted a modified form of the above-mentioned bid-opening procedure whose communication cost and computational complexity are reduced using the scheme described previously with reference to FIG. 11. No description will be given of the bidding procedure since it is exactly the same as in the FIG. 11 embodiment.

Step S0: Receive bidding price information $H_m^{(K)} = h^{K-km}(g^{xm}(IV_m))$ and the identifier $ID_m$ from each bidding device.

Step S1: Publish the received $H_m^{(K)}$ and $ID_m$ on the bulletin board 25.

Step S2: Set the initial value of the index k at K.

Step S3: Inquire of all the bidding devices $10_m$ about whether they bid for the index k.

Step S4: Check the responses for YES (which means that the bidding device concerned has bid for the index k).

Step S5: If no YES is found, decrement k by one and returns to step S3 to repeat the same processing.

Step S6: If YES is found, request all the bidding devices $10_m$ to send their bidding price information $H_m^{(k-1)}$. The response of the bidding device to this request is the same as described previously in connection with FIG. 21.

Step S7: Publish the received information $H_m^{(k-1)}$ on the bulletin board 25.

Step S8: For the response $H_m^{(k-1)}$ of an m (representing the bidding device $10_m$) having bid for the index k, compute $$H_m = h^{K-k}(g(H_m^{(k-1)}))$$

and for the responses $H_m^{(k-1)}$ from the other m's (the other bidding devices), compute $$H_m = h^{K+1-k}(H_m^{(k-1)})$$

Step S9: Check whether $H_m = H_m^{(k)}$ holds for all the m's, and if a mismatch is detected for even one of them, send an error message to all the bidding devices and discontinue the current bid-opening session.

Step S10: If a match is detected for every one of them, determine that the bidding device $10_m$ of the number m having responded YES is the winning bidder, and output the index k at that time and its identifier $ID_m$ for publication.

The bidding device $10_m$ and the bid-opening device 20 can each be implemented by a computer.

Seventh Embodiment

In the fifth embodiment described previously, each bidding device $10_m$ generates the select information $b_m^{(k)}$ indicating whether to bid for every price index k=1, 2, . . . , K, and these pieces of select information are contained in K pieces of information $h(k(+)b_b^{(k)}(+)R_m^{(k)})$, where k=1, 2, . . . , K. In this embodiment, however, the plural pieces of select information are contained in a single piece of bidding price information through multiple processing with the one-way function h.

Figure 25:
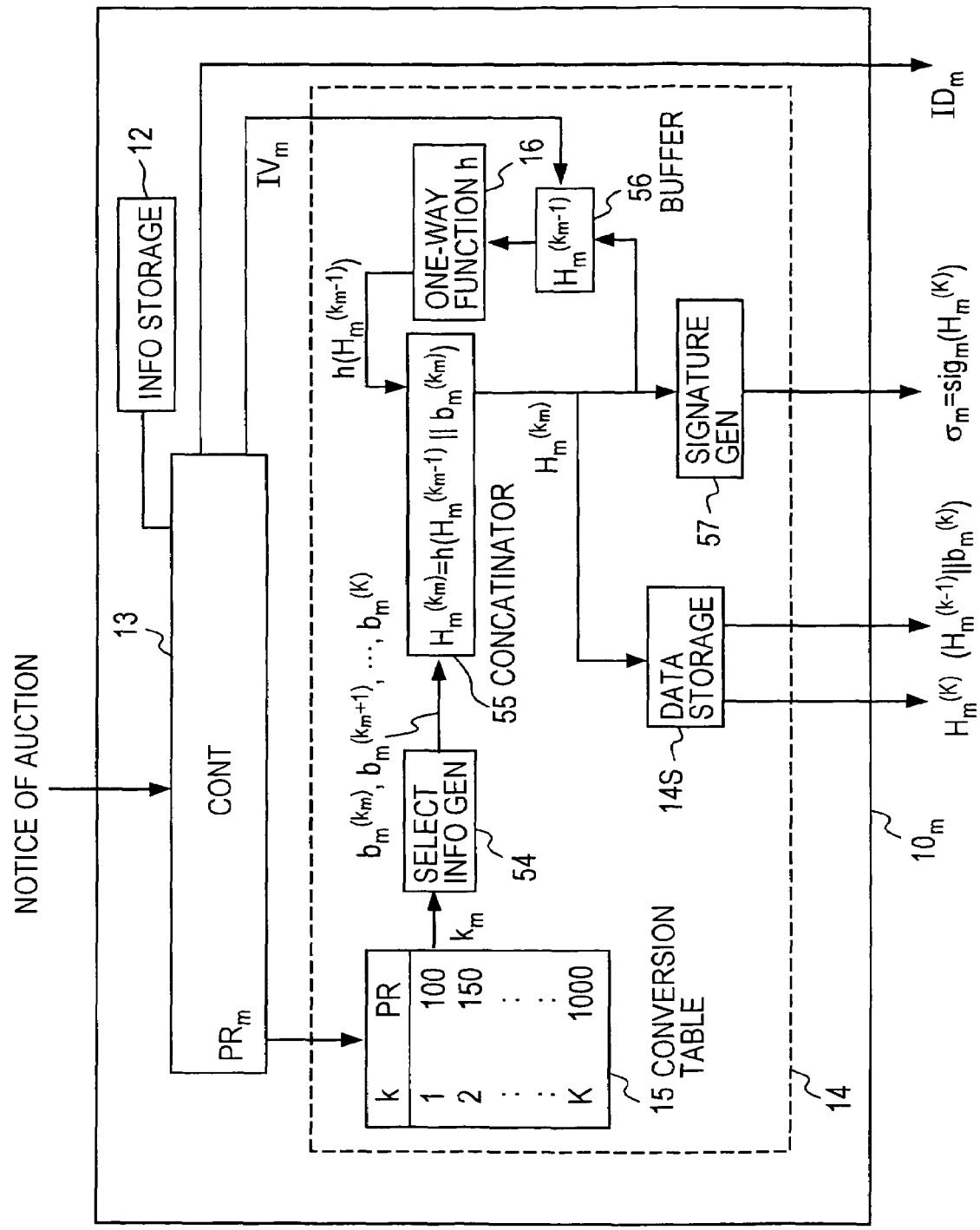
FIG. 25 is a block diagram illustrating the functional configuration of a bidding device in a seventh embodiment of the present invention.

FIG. 25 illustrates in block form the functional configuration of each bidding device $10_m$. Assume that K bidding prices PR and the k price indexes k=1, 2, . . . , K, which have a one-to-one correspondence with each other, are both arranged in monotone increasing order in the same direction. The bidding select information for each index k will be identified as $b^{(k)}$. In this embodiment a select information generating part 54 does not generate the select information $b_m^{(k)}$ for all the indexes k=1, 2, . . . , K but instead generates the select information $b_m^{(k)}$ only for indexes higher than the bidding price index $k_m$. $H_m^{(k)} = h(H_m^{(k-1)} \| b_m^{(k)})$ is calculated, with $H_m^{(km-1)} = IV_m$ as its initial value, for each value of the price index k ($=k_m, k_m+1, \ldots, K$) by a one-way function h processor 16, a concatenator 55 and a buffer 56, and the calculation result $H_m^{(k)}$ for each value of k is stored in a data storage part 14S. The final calculation result $H_m^{(K)}$ will hereinafter be called bidding price information. In this embodiment, a signature $Sig_m(H_m^{(K)})$ is generated by a signature generator 14S for the bidding price information 57.

Figure 26:
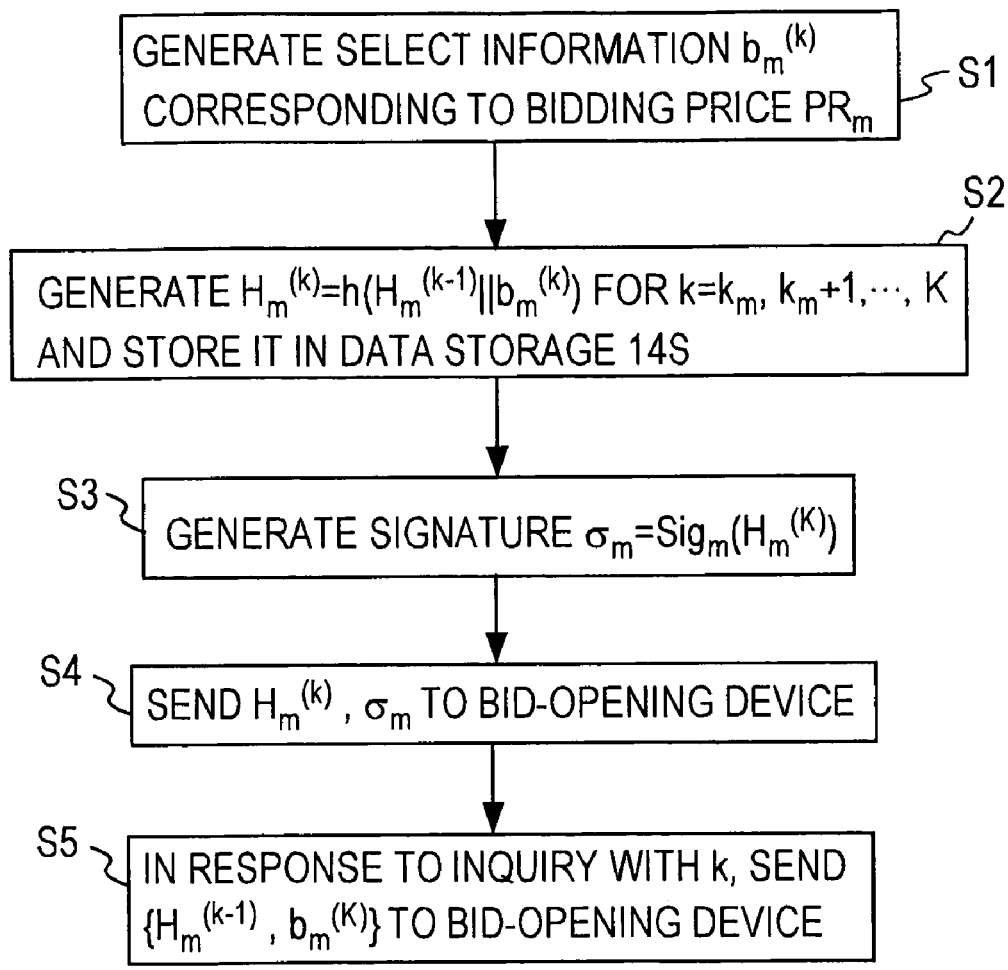
FIG. 26 is a flowchart showing the bidding procedure of the bidding device depicted in FIG. 25.

FIG. 26 is a flowchart showing the bidding procedure of the bidding device $10_m$ depicted in FIG. 25.

In this embodiment, letting $k_m$ be the index that the bidding device $10_m$ bids, a select information generating part 54 generates $K-k_m+1$ pieces of select information $b_m^{(km)}$, $b_m^{(km+1)}, \ldots, b_b^{(K)}$ corresponding to the indexes larger than the bidding price index $k_m$ (step S1). Then, $H_m^{(km-1)}$, $H_m^{(km)}$, $H_m^{(km+1)}, \ldots, H_m^{(K)}$ are successively generated by the following equations $$H_m^{(km-1)} = IV_m$$

$$H_m^{(km)} = h(H_m^{(km-1)} \| b_m^{(km)})$$

$$H_m^{(km+1)} = h(H_m^{(km)} \| b_m^{(km+1)})$$

$$\vdots$$

$$H_m^{(t)} = h(H_m^{(t-1)} \| b_m^{(t)})$$

$$\vdots$$

$$H_m^{(K)} = h(H_m^{(K-1)} \| b_m^{(K)})$$

and they are stored in the data storage part 14S (step S2). Further, a signature $\sigma m = Sig_m(H_m^{(K)})$ of the bidding device $10_m$ corresponding to the bidding price information $H_m^{(K)}$ is generated by the signature generator 14S (step S3). The bidding device $10_m$ sends $H_m^{(K)}$, $\sigma_m$ and $ID_m$ as bidding information to the bid-opening device 20 (step S4). After this, the bid-opening procedure is started, and upon receiving an inquiry for each value of the index k, the bidding device reads out $\{H_m^{(k-1)}, b_m^{(k)}\}$ from the data storage part 14S, and sends it to the bid-opening device (step S5).

Figure 27:
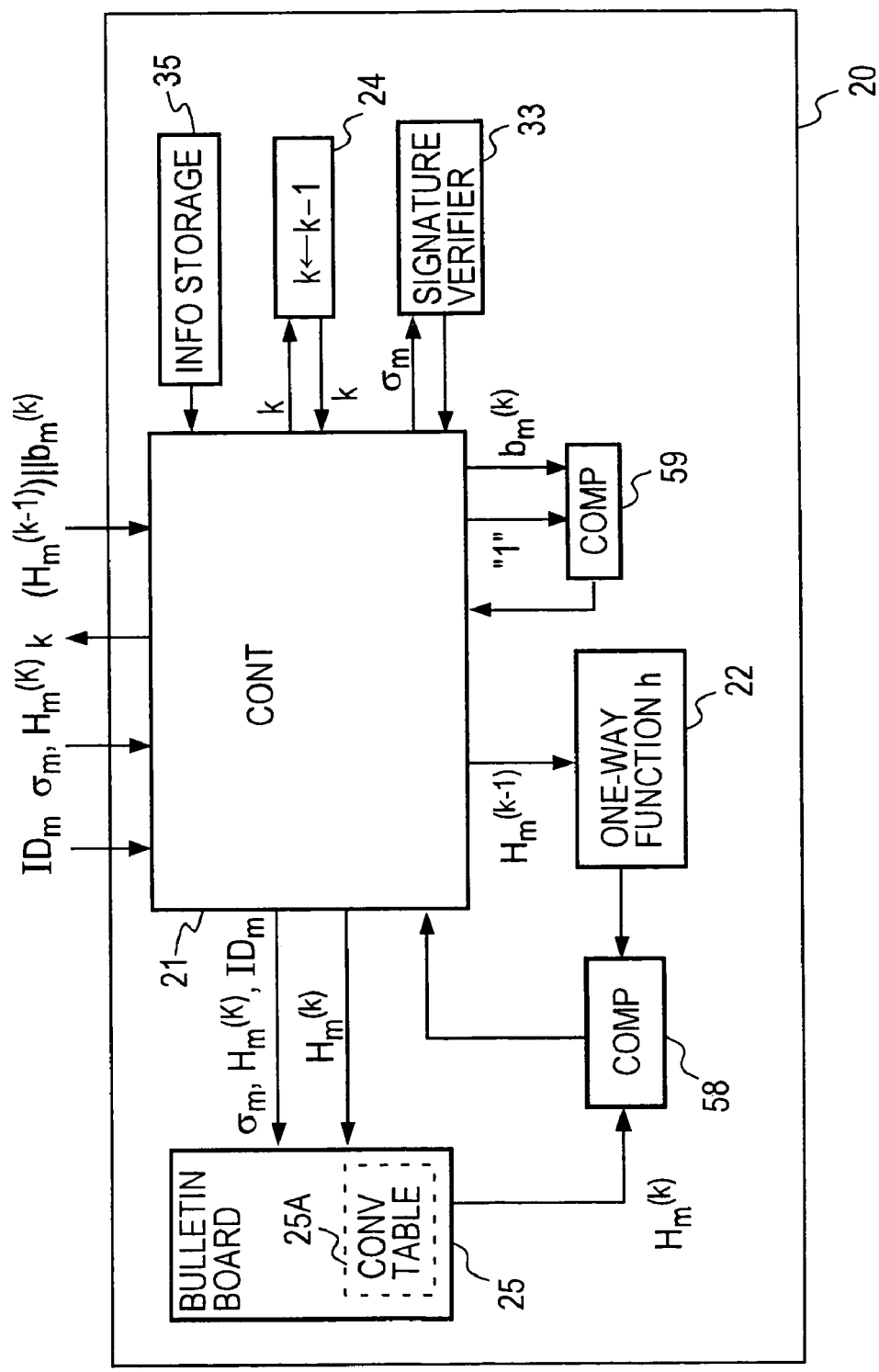
FIG. 27 is a block diagram illustrating the functional configuration of a bid-opening device in the seventh embodiment.

The bid-opening device 2—comprises, as depicted in FIG. 27, a control part 21, a one-way function h processor 22, a counter 24, a bulletin board 25, an information storage part 35, comparators 58 and 59 and a signature verifier 33. The pieces of bidding information $H_m^{(K)}$, $\sigma_m$ and $ID_m$ are written on the bulletin board 25. Then, the received information $H_m^{(k-1)}$ is processed by the one-way function h processor 22 to obtain $H_m^{(k)} = h(H_m^{(k-1)})$, which is compared by the comparator 58 with $H_m^{(k)}$ read out of the bulletin board 25 to thereby verify whether they match. Further, it is checked by the comparator 59 whether the received select information $b_m^{(k)}$ is 1, and if it is 1, then the bidding device $10_m$ corresponding to m at that time is determined as the winning bidder.

Figure 28:
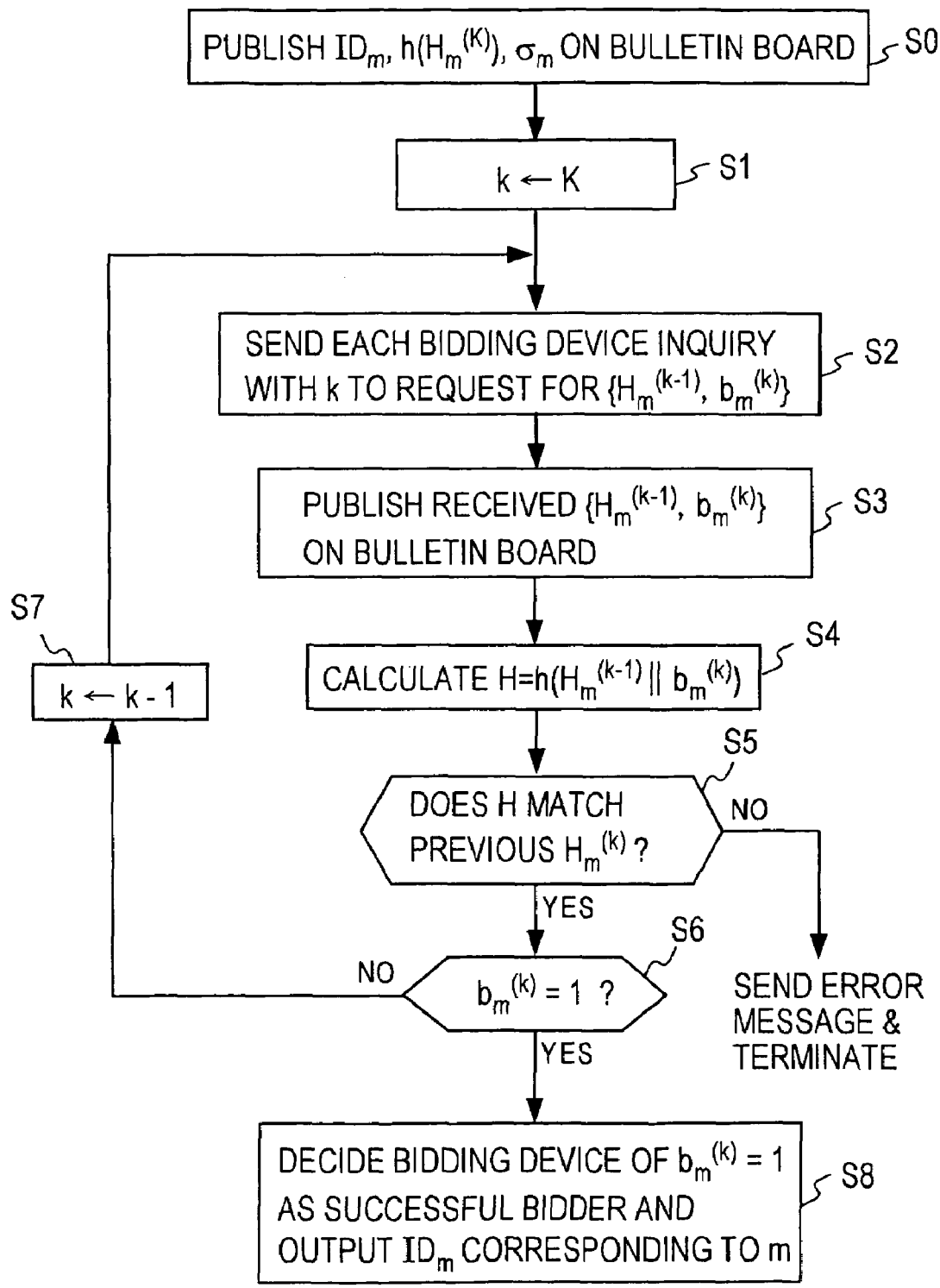
FIG. 28 is a flowchart showing the bid-opening procedure of the bid-opening device depicted in FIG. 27.
Figure 29:
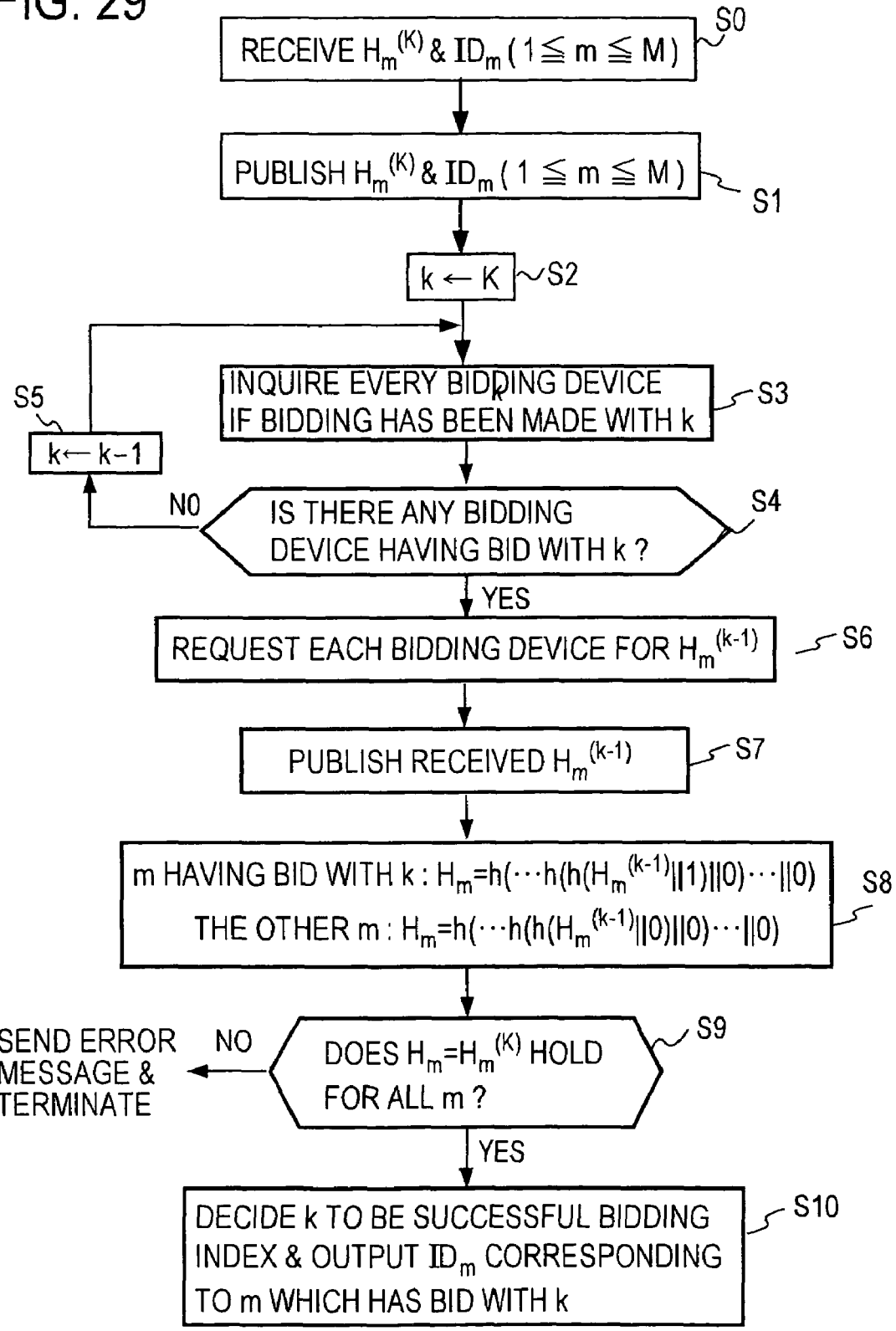
FIG. 29 is a flowchart showing a modified form of the bid-opening procedure depicted in FIG. 28.

FIG. 28 is flowchart showing the bid-opening procedure of the bid-opening device 20.

The bid-opening device 20 verifies respective signatures $\sigma_m$ (where m=1, 2, ..., M) and writes and publish the received pieces of information $H_m^{(K)}$, $\sigma_m$ and $ID_m$ on the bulletin board 25.

The bid-opening device 20 sends k to the bidding device in the order [k=K, K-1, K-2, ...] and asks for information $\{H_m^{(k-1)}, b_m^{(k)}\}$ corresponding to each index k. The information $\{H_m^{(k-1)}, b_m^{(k)}\}$ received from each bidding device $10_m$ is published on the bulletin board 25, then it is checked whether $H_m^{(k)} = h(H_m^{(k-1)}, b_m^{(k)})$ holds for the information $H_m^{(k)}$ received previously, and if it holds, it is checked whether the select information $b_m^{(k)}$ is 1. When $b_m^{(k)}$ is 0 for all of m=1, 2, ..., M, the bid-opening device 20 decrements k to k←k-1, then sends again k to the bidding device and asks for the information $\{H_m^{(k-1)}, b_m^{(k)}\}$, thereafter performing the same operation as described above. If the select information $b_m^{(k)}$ is 1 for any one of m=1, 2, ..., M, then the bidding device $10m$ corresponding to that m is determined as the winning bidder. The bid-opening device 20 publishes the successful bidding price index $k_m$ and the identifier $ID_m$ of the wining bidding device $10_m$ on the bulletin board 25.

According to this embodiment, since each bidding device does not perform the multiple processing with the one-way function for indexes smaller than the bidding price index $k_m$, the computational complexity is low accordingly.

The bid-opening device performs the bid-opening procedure as described below.

Step S0: Receive the pieces of bidding information $H_m^{(K)}$, $\sigma_m$ and $ID_m$ from each bidding device, then verifies respective signature $\sigma_m$ (where m=1, 2, ..., M), and writes and publishes the pieces of information $H_m^{(K)}$, $\sigma_m$ and $ID_m$ on the bulletin board 25.

Step S1: Set the initial value of the index k to K.

Step S2: Send k to each bidding device $10_m$ and ask for $\{H_m^{(k-1)}, b_m^{(k)}\}$.

Step S3: Write and publish on the bulletin board 25 the information $\{H_m^{(k-1)}, b_m^{(k)}\}$ received from each bidding device $10_m$.

Step S4: Process the received information $\{H_m^{(k-1)}, b_m^{(k)}\}$ by the one-way function h processor 22, thereby generating $H = h(H_m^{(k-1)} \| b_m^{(k)})$.

Step S5: Verify by the comparator 58 whether H generated in step S4 matches the previously received $H_m^{(k)}$. If a mismatch is detected, then send an error message to the bidding device and discontinue the current bid-opening session.

Step S6: If no mismatch is found in step S5, then decides that the response from every bidding device is valid, and make a check by the comparator 59 to see if the received select information $b_m^{(k)}$ is 1.

Step S7: When the select information $b_m^{(k)}$ from all bidding devices $10_m$ is 0, update k with k-1 and return to step S2.

Step S8: When any one of M pieces of select information $b_m^{(k)}$ is 1 in step S6, determine that the bidding device $10_m$ corresponding to m, which provides that information $b_m^{(k)}$, is the winning bidder, and write and publish its identifier $ID_m$ and the index $k_k$ of the winning bid on the bulletin board 25, and end the bid-opening procedure.

In this embodiment the prices bid by the unsuccessful bidders are each kept secret from the other participants. The lowest price bid can be made a successful bid by using a conversion table wherein the price PR monotonously increases in the direction opposite to that in which the index k monotonously increases.

Incidentally, it is also possible to set $H_m^{(0)} = IV_m$, $H_m^{(1)} = h(H_m^{(0)} \| b_m^{(1)})$, ..., $H_m^{(K)} = h(H_m^{(K-1)} \| b_m^{(K)})$, where $b_m^{(1)} = b_m^{(2)} = \ldots = b_m^{(km-1)} = 0$.

The communication cost and computational complexity involved in the bid-opening procedure of FIG. 27 can also be reduced, as depicted in FIG. 27', by the application of the scheme described previously with reference to FIG. 11. The bidding procedure is exactly the same as in FIG. 25, and hence it will not be described.

Step S0: Receive the bidding price information $H_m^{(K)} = h(\ldots h(h(H_m^{(km-1)} \| b_m^{(km)} \| b_m^{(km+1)}) \ldots \| b_m^{(K)})$ and the identifier $ID_m$ from each bidding device.

Step S1: Publish the received $H_m^{(K)}$ and $ID_m$.

Step S2: Set the initial value of the index k at K.

Step S3: Inquire of all the bidding devices $10_m$ about whether they bid for the index k.

Step S4: Check the responses for YES (which means that the bidding device concerned has bid for the index k).

Step S5: If no YES is found, decrement k by one and returns to step S3 to repeat the same processing.

Step S6: If YES is found, request all the bidding devices $10_m$ to send their bidding price information $H_m^{(k-1)} = h(\ldots h(h(H_m^{(km-1)} \| b_m^{(k-1)}) \| b_m^{(km+1)}) \ldots \| b_m^{(K)})$. The response of the bidding device to this request is the same as described previously in connection with FIG. 21. For the bidding device having bid for the current index k, k=$k_m$; therefore, $H_m^{(k-1)} = H_m^{(km-1)} = IV_m$.

Step S7: Publish the received information $H_m^{(k-1)}$ on the bulletin board 25.

Step S8: For the response $H_m^{(k-1)}$ of an m (representing the bidding device $10_m$) having bid for the index k, compute $H_m = h(\ldots h(h(H_m^{(k-1)} \| 1) \| 0) \| \ldots 0)$ and for the responses $H_m^{(k-1)}$ from the other m's (the other bidding devices), compute $H_m = h(\ldots h(h(H_m^{(k-1)}) \| 0) \| 0) \ldots \| 0)$.

Step S9: Check whether $H_m = H_m^{(k)}$ holds for all the m's, and if a mismatch is detected for even one of them, send an error message to all the bidding devices and discontinue the current bid-opening session.

Step S10: If a match is detected for every one of them, determine that the bidding device $10_m$ of the number m having responded YES is the winning bidder, and output the index k at that time and its identifier $ID_m$ for publication.

Eighth Embodiment

In each of the embodiments described above, the bidding prices for the bidding price indexes k=1, 2, ..., K in the conversion table are discrete values such as 1000, 2000, 3000, ..., 10000, and each bidding device bids any one of the K prices but cannot bid a value intermediate between such discrete prices unless K prices are set in "1" increments. This embodiment is intended to permit bidding an arbitrary price intermediate between the discrete values. In this embodiment, an arbitrary bidding price PR within the range defined by the highest and lowest bidding prices is expressed by the following equation.

$PR = F(k) + Q$ where: $0 \leq Q < F(k+1) - F(k)$

F(k) represents the price corresponding to the index k specified on the conversion table, and Q will hereinafter be referred to as a fraction.

This embodiment is one that the bidding price PR defined above is applied to the first embodiment described previously. Bidding price information $g(h^k(IV_m))$ and $Q_m$ are sent to the bid-opening device 20. Further, $h^{K+1}(IV_m)$ is sent as verification information to the bid-opening device 20 together with the bidding price information. These pieces of information are published on the bulletin board as is the case with the first embodiment.

Figure 30:
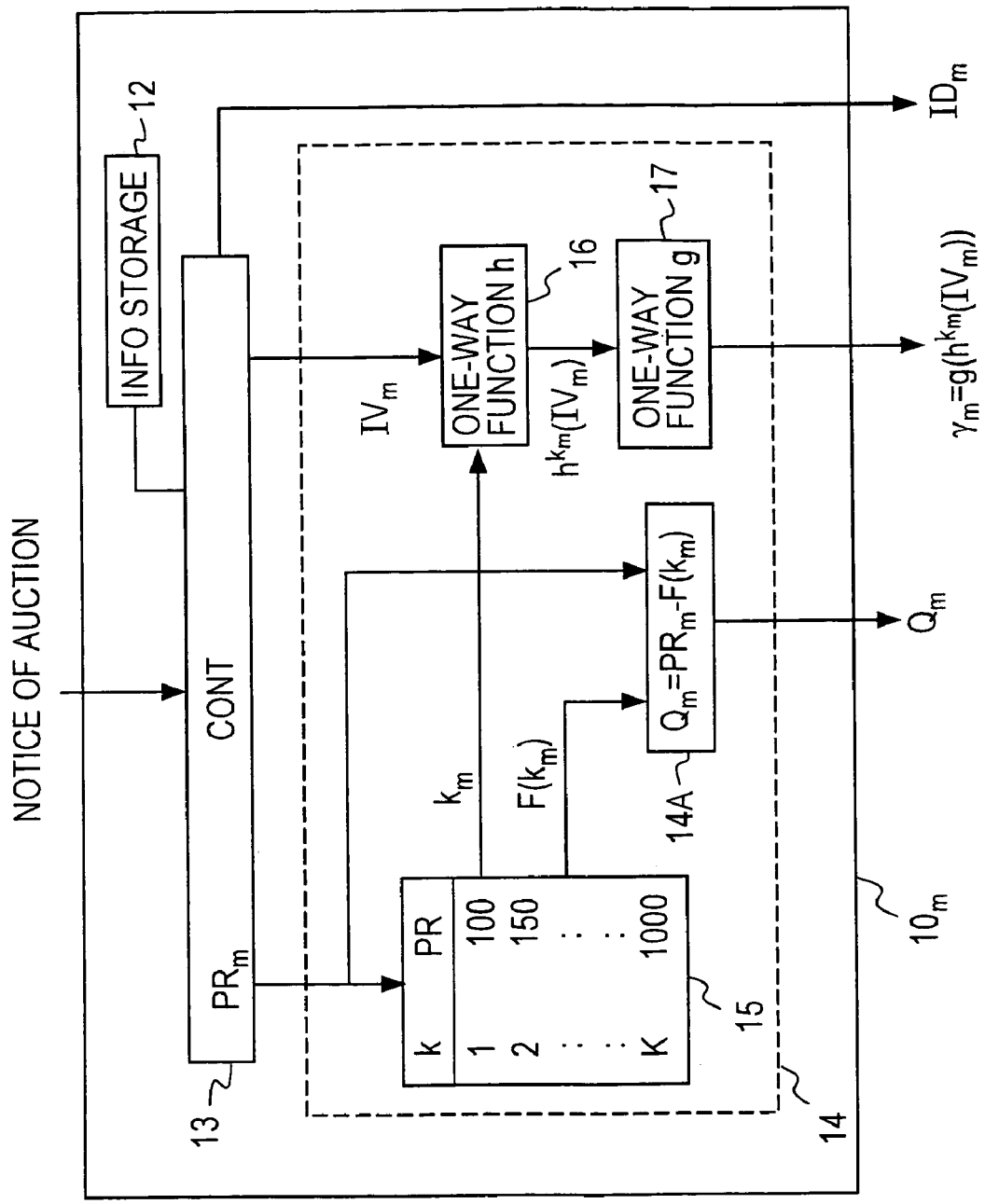
FIG. 30 is a block diagram illustrating the functional configuration of a bidding device in an eighth embodiment of the present invention.

FIG. 30 is a block diagram illustrating the configuration of each bidding device $10_m$, which is identical with the bidding device of the first embodiment except that the bidding price transformer 14 is provided with a fraction calculating part 14a. The fraction calculating part 14A calculates, for a desired bidding price $PR_m$, $Q_m=PR_m-F(k_m)$ from the index $k_m$ read out of the conversion table 15. As is the case with the first embodiment, the one-way function h processor 16 and the one-way function g processor 17 are used to compute $\gamma_m=g(h^{km}(IV_m))$ from the index $k_m$ which satisfies $F(k_m+1)>PR_m\geq F(k_m)$ and the initial value $IV_m$. In this embodiment, $\gamma_m$, $Q_m$ and $ID_m$ are sent as bidding information to the bid-opening device 20.

Figure 31:
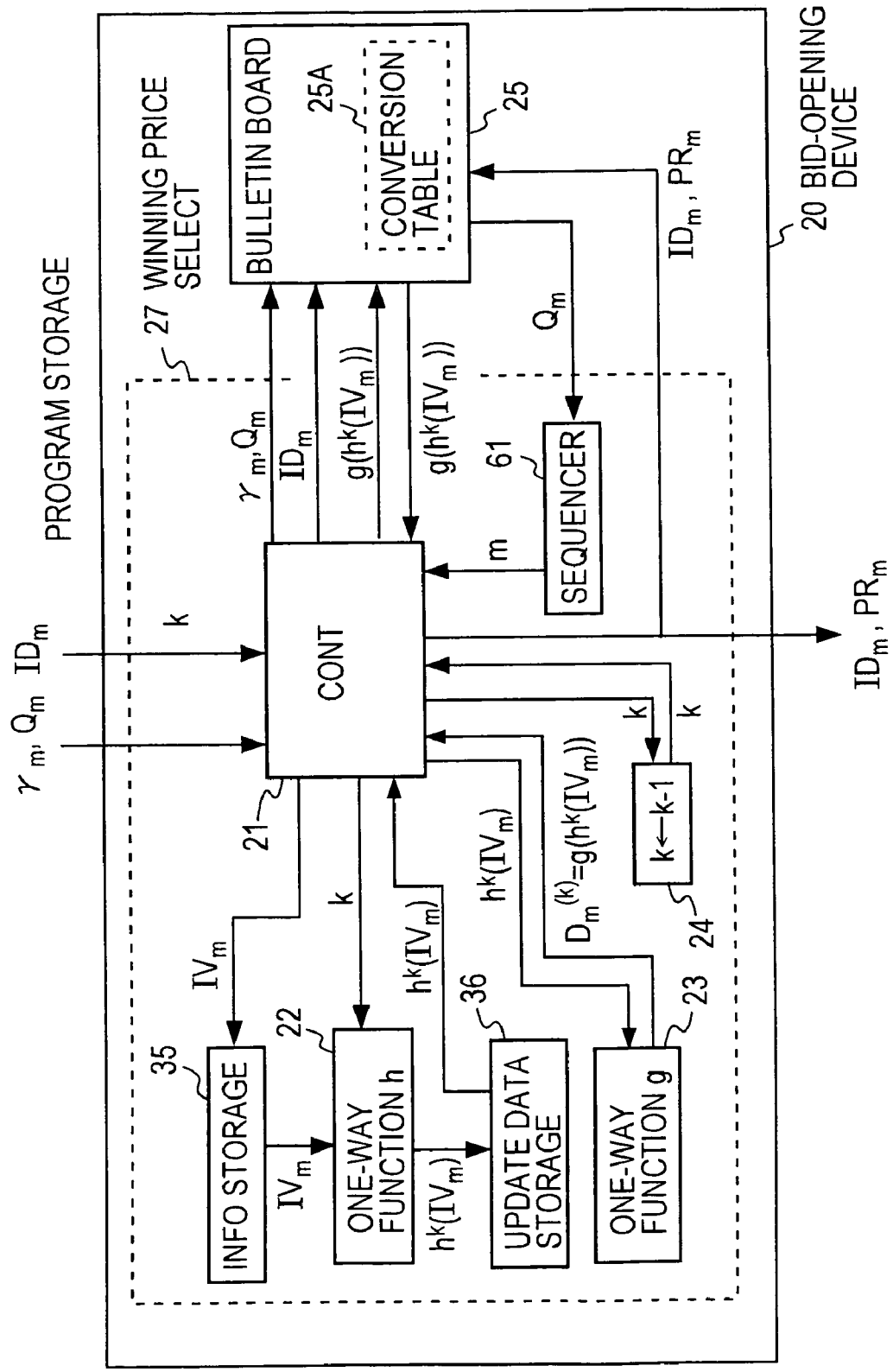
FIG. 31 is a block diagram illustrating the functional configuration of a bid-opening device in the eighth embodiment.

The bid-opening device 20 has, as depicted in FIG. 31, a sequencer 61 added to the bid-opening device 20 in FIG. 6 embodiment. The pieces of bidding information $\gamma_m$, $Q_m$ and $ID_m$ are written and published on the bulletin board 25. The sequencer 61 reads out $Q_1, Q_2, \ldots, Q_M$ from the bulletin board 25, then sequences them in descending order, and sequences m=1, 2, ..., M corresponding to the sequenced $Q_m$, thereafter outputting them in the sequential order. The control part 21 checks, for each index k, whether $ID_m$ and $\gamma_m$ match each other in the sequence of m defined by the sequencer 61. The bidding device $10_m$, which corresponds to m for which the match was detected for the first time, is determined as the winning bidder.

Figure 32:
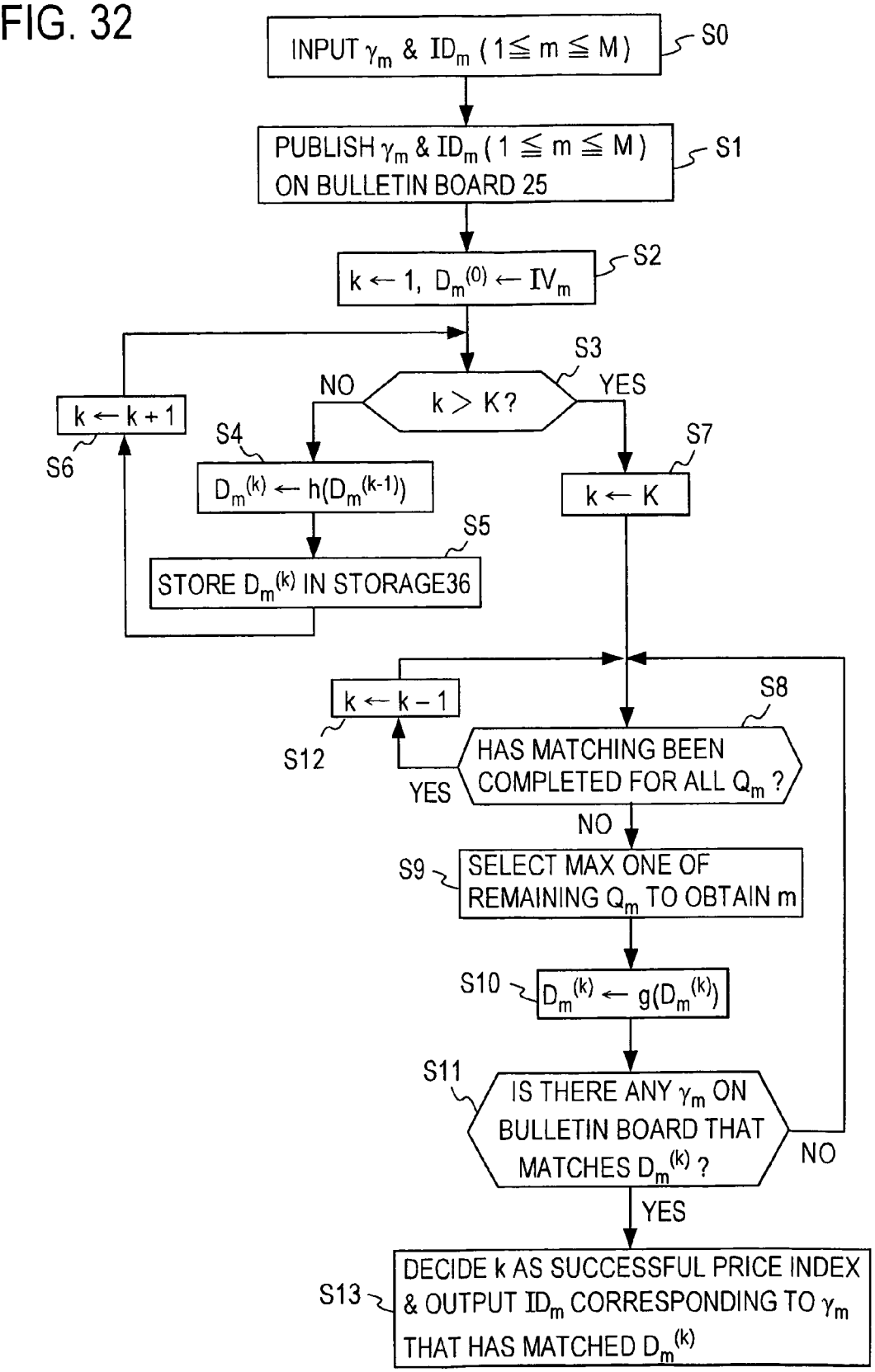
FIG. 32 is a flowchart showing the bid-opening procedure of the bid-opening device depicted in FIG. 31.

FIG. 32 is a flowchart depicting the bid-opening procedure of the bid-opening device 20 shown in FIG. 31, which steps S0 to S7 are identical with steps S0 to S7 in FIG. 7 but differ in step 8 and the subsequent steps. Roughly speaking, steps S8 and S9 are new steps added between steps S7 and S8 in FIG. 7. Step S8 and the subsequent steps will be described below.

In step S8 the bid-opening device 20 makes a check to determine whether the matching in steps S6 to S11 has been completed for all fractions $Q_m$ for the current value of k. If not completed, the procedure goes to step S9. In step S9, the bid-opening device 20 selects the largest one of the remaining fractions $Q_m$ to determine the corresponding m. In step S10, the device 20 reads out of the data storage part 36 updated data $D_m^{(k)}=h^k(IV_m)$ corresponding to that m, and processes the read-out data by the one-way function g processor 23, thereby updating it such that $D_m^{(k)} \leftarrow g(D_m^{(k)})$. In step S11, the control device 21 makes a check to see if the updated data $D_m^{(k)}$ corresponding to m matches the bidding price information $\gamma_m$ corresponding to m on the bulletin board 25, and if not, then the procedure returns to step S8.

When it is decided in step S8 that the matching for all the fractions $Q_m$ for the current k has been completed, the bid-opening device 20 decrements k by one in step S12, and returns to step S8, repeating the same procedure as mentioned above. When it is decided in step S11 that the updated data $D_m^{(k)}$ and the bidding price information $\gamma_m$ match, the bid-opening device 20 determines in step S13 that the index k at that time is the successful index, and outputs the identifier $ID_m$ corresponding to that information $\gamma_m$ and the successful bidding price $F(k)+Q_m$ (or merely the index k).

Since $D_m^{(k)}$ and gm are matched for the current value of the index k in the descending order of the fractions $Q_m$ as described above, the highest bidding price can be determined at the first detection of matching between $D_m^{(k)}$ and $\gamma_m$. The value m selected in step S9 is determined by the sequencer 61 which sequences in descending order the fractions $Q_1$, $Q_2, \ldots, Q_M$ read out of the bulletin board 25, and sequences m correspondingly, as explained before.

In the case where the lowest bidding price bid is a successful bid, the bidding prices are arranged in monotonous increasing order in the direction opposite to that in which the values of the index k are arranged in monotonous decreasing order, and the sequencer 61 sequences the fractions $Q_1$, $Q_2, \ldots, Q_M$ in ascending order, and sequences m correspondingly. In step S9 the smallest one of the unprocessed fractions $Q_m$ is chosen, and the corresponding m is determined. The sequencer 61 determines the order of m.

The technique that uses may fractions $Q_m$ as described above can be applied not only to the first embodiment but also to the other embodiments explained heretofore.

Electronic Competitive Auction System with Provisional Identifier Device

Figure 33:
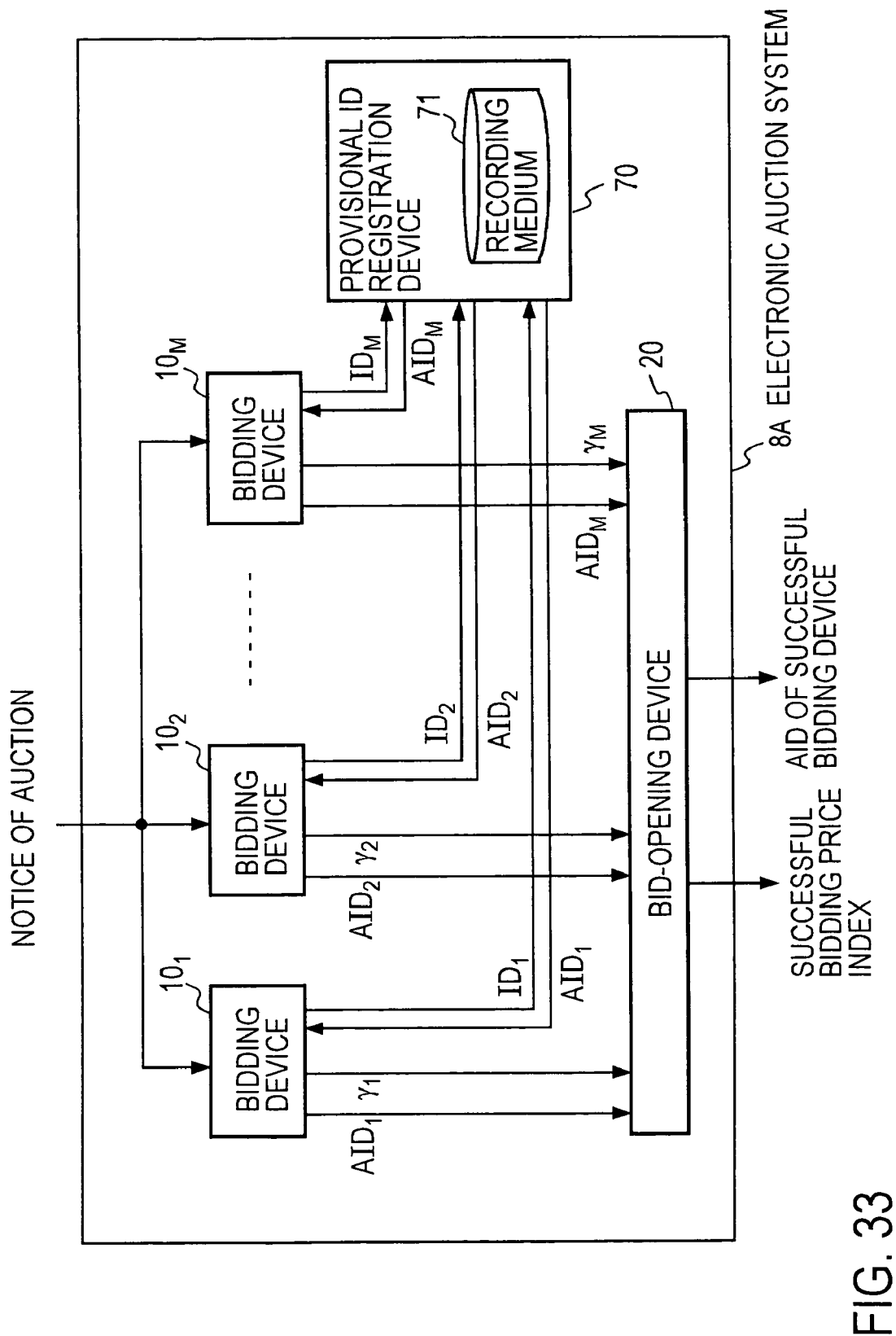
FIG. 33 is a block diagram illustrating an electronic sealed-bit auction system which utilizes a provisional identifier.

In the embodiments described above, since the bidding device identifier $ID_m$ is contained in the bidding information and sent to the bid-opening device 20, it can be said that these embodiments employ what is called a sealed-bit auction system. FIG. 33 illustrates in block form an electronic competitive auction system which uses a provisional identifier registration device to implement a secret-bit auction.

Figure 34:
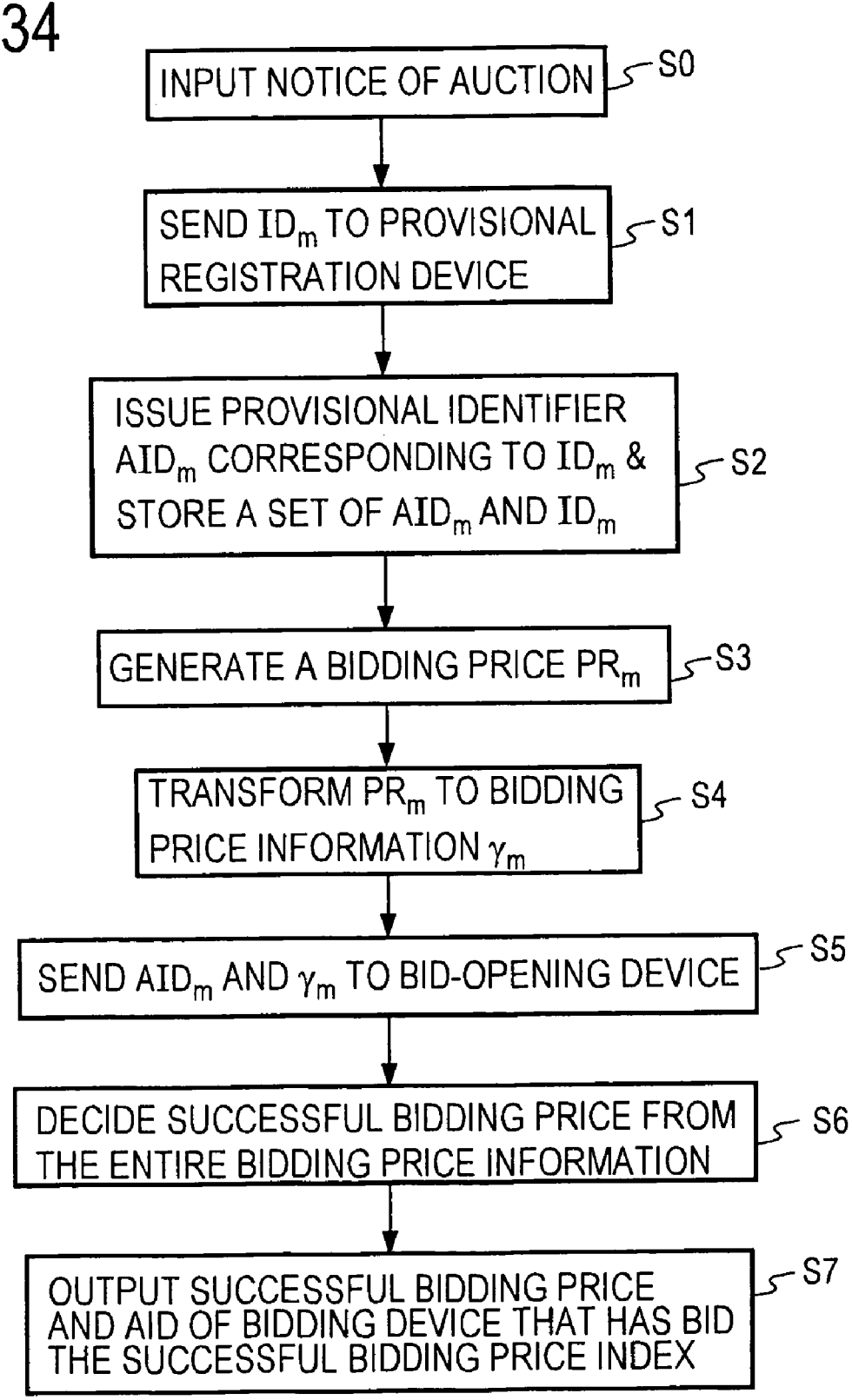
FIG. 34 is a flowchart showing the bidding procedure in the system depicted in FIG. 33.

Each bidding device $10_m$ is adapted to communicate with a provisional identifier registration device 70. Referring to FIG. 34, the operation of this electronic competitive auction system will be described below.

Step S0: Notice of auction is input to each bidding device $10_m$.

Step S1: Upon receiving the notice of auction, the bidding device $10_i$ outputs the identifier $ID_m$ to the provisional identifier registration device 70.

Step S2: For the identifier $ID_m$ provided thereto, the provisional identifier registration device 70 issues a provisional identifier $AID_m$, then stores $ID_m$ and $AID_m$ in pair form on a recording medium 71, and sends the provisional identifier $AID_m$ to the bidding device $10_i$.

Step S3: The bidding device $10_m$: generates the bidding price $PR_m$;

Step S4: Transforms the bidding price $PR_m$ to the bidding price information $\gamma_m$; and Step S5: Sends the bidding price information $\gamma_m$ and the provisional identifier $AID_m$ to the bid-opening device 20.

Step S6: The bid-opening device 20: calculates a successful bid from the bidding price indexes received from all the bidding deices; and Step S7: Outputs the successful bid and the provisional identifier of the bidding device having offered the successful bid.

Thus, it is possible to keep the auction participants secret. Incidentally, when inquiring the provisional identifier registration device 70, the bid-opening device 20 can learn the identifier $ID_m$ corresponding to the successful bid from the provisional identifier $AID_m$. This method can be applied to all of the embodiments explained hereinbefore.

The bidding device $10_m$ and the bid-opening device 20 can be implemented by interpreting and executing programs with a computer.

EFFECT OF THE INVENTION

As described above, according to the present invention, since the bidding price is transformed to a bidding price information through utilization of a one-way function and is then sent to the bid-opening device, it is possible to keep the bidding price of each bidding device secret from the other bidding devices prior to bidding, ensuring fairness of auction.

By publishing $h^{K+1}(IV_m)$ and $h^{k_{mx}}(IV_m)$ corresponding to a winning bidding price on the bulletin board, it is possible for all bidding devices to verify whether the winning bidding price was correctly bid without being altered.

Furthermore, the present invention permits determination of the winning bid while hiding the other bidding prices.

According to the second embodiment, the bids of losing bidders, except the winning bid, are kept secret even from the bid-opening device.

According to the third embodiment, the bids of losing bidders, except the winning bid, are kept secret even from the bid-opening device, and in addition, the amount of data for communication with the bidding device can be reduced.

According to the fourth embodiment, there is no fear of the bidding price of each bidding device being revealed to the other devices, and at the bid-opening time the successful bid can easily be specified directly from the bidding price; furthermore, the validity of the winning bid can be verified.

According to the fifth embodiment, bidding price information including each bidding price index is generated using a one-way function, and the bidding price information for all bidding price indexes is sent to the bid-opening device; hence, the aimed bidding price can be kept secret.

According to the sixth embodiment, either $h(H_m^{(k-1)})=H_m^{(K)}$ or $g(H_m^{(k-1)})=H_m^{(K)}$ needs only to be verified for each index value and for each bidding device.

According to the seventh embodiment, each bidding device generates the bidding price information including select information for only indexes larger than the bidding price index $k_m$ in the fifth embodiment, the computational complexity can be reduced.

According to the eighth embodiment, since a desired bidding price is expressed by the sum of fractions Q of a price F(k) corresponding to the index k, an arbitrary price can be bid with a small number of indexes.

What is claimed is:

1. A quantitative competition method for a system in which a plurality of participant devices send their secret aimed values to a server device and said server device determines which of said plurality of participant devices has offered the maximum or minimum one of said aimed values received, said method comprising the steps wherein:
   (a) each of said participant devices processes an initial value peculiar to said participant device with a predetermined one-way function by the number of times corresponding to said aimed value to generate a value of aimed value information and sends the value of aimed value information to said server device;
   (b) either one of said each participant device and said server device processes said initial value with said one-way function to generate an updated initial value;
   (c) said server device makes a check for matching between each of said updated initial values and corresponding one of said values of aimed value information of said participant devices; and
   (d) said server device repeats a sequence of the step (b) and (c) until first detection of matching in said step (c), and decides that said aimed value of that one of said participant devices which corresponds to said updated initial value having matched said value of aimed value information is maximum or minimum.

2. The method of claim 1, wherein in said step (b) said updated initial value is generated by said server device.

3. The method of claim 2, wherein: there is provided a conversion table showing the relationships between a sequence of values selectable as said aimed values and a sequence of indexes k of integral values corresponding thereto;
   said step (a) includes a step wherein, letting M be the number of participant devices, an m-th participant device m computes said value of aimed value information by $$\gamma_m = g(h^{k_m}(IV_m))$$

where g is a one-way function, $IV_m$ is said initial value, $k_m$ is an index corresponding to said aimed value of said participant device m, and $h^{k_m}(IV_m)$ indicates that said initial value $IV_m$ is processed with said one-way function h by $k_m$ times;
   said step (b) includes a step wherein said server device generates said updated initial value by $$D_m = g(h^k(IV_m)); \text{ and}$$

said step (c) includes a step of making a check for said value of aimed value information $\gamma_m = D_m$.

4. The method of claim 1, wherein said step (b) includes a step wherein said each participant device generates said updated initial value by the number of times requested by said server device and sends said updated initial value to said server device.

5. The method of claim 4, wherein: there is provided a conversion table showing the relationships between a sequence of values selectable as said aimed values and a sequence of indexes k of integral values corresponding thereto; and
   said step (a) includes the steps wherein:
   (a-1) letting M be the number of participant devices, an m-th participant device m computes said value of aimed value information by $$\gamma_m = g(h^{k_m}(IV_m))$$

where g is a one-way function, $IV_m$ is said initial value, $k_m$ is an index corresponding to said aimed value of said participant device m, and $h^{k_m}(IV_m)$ indicates that said initial value $IV_m$ is processed with said one-way function h by $k_m$ times;
   (a-2) said each participant device generates verification information $C_m = h^{K+1}(IV_m)$ and sends it to said server device together with said value of aimed value information $\gamma_m$; and
   (a-3) said server device publishes said value of aimed value information $\gamma_m$ and said verification information $C_m = h^{K+1}(IV_m)$ received from said each participant device on a bulleting board accessible from all of said participant devices.

6. The method of claim 5, wherein: said step (b) includes the steps wherein:
   (b-1) said server device requests said each participant device to send $D_m = h^k(IV_m)$ corresponding to said index k; and
   (b-2) said each participant device responds to the request of said server device to generate $D_m = h^k(IV_m)$ corresponding to said index k as said updated initial value and sends it to said server; and
   said step (c) includes a step of generating $g(D_m)$ and making a check for said value of aimed value information $\gamma_m = g(D_m)$.

7. The method of claim 6, wherein: said step (b) includes a step (b-0) wherein said server device sets said index k to an upper limit value K; and
   said step (c) includes the steps wherein said server device:
   (c-1) publishes said $D_m = h^k(IV_m)$ received from said each participant device on said bulletin board;

(c-2) computes said $g(D_m)$ for said each participant device m;

(c-3) makes a check to see if said $g(D_m)$ matches said value of aimed value information;

(c-4) if no match is detect for any of said m in said step (c-3), replaces said $D_m$ with said $C_m$, decrementing said index k by one and returns to said step (b-1); and (c-5) if a match is detected in said step (c-3), determines that the value corresponding to said index k at that time is said maximum or minimum aimed value.

8. The method of claim 7, wherein said step (c-1) includes a step wherein said server device generates $h(D_m)$ and makes a check to see if $h(D_m)=C_m$ holds.

9. The method of claim 7, wherein said step (c-5) includes a step wherein said server device publishes said determined maximum or minimum aimed value and said $h^{km}(IV_m)$ on said bulletin board.

10. The method of claim 4, wherein: there is provided a conversion table showing the relationships between a sequence of values selectable as said aimed values and a sequence of indexes k of integral values corresponding thereto; and said step (a) includes the steps wherein:

(a-1) letting M be the number of participant devices, an m-th participant device m computes said value of aimed value information by $$\gamma_m = g(h^{km}(IV_m))$$

where g is a one-way function, $IV_m$ is said initial value, $k_m$ is an index corresponding to said aimed value of said participant device m, and $h^{km}(IV_m)$ indicates that said initial value $IV_m$ is processed with said one-way function h by $k_m$ times;

(a-2) said each participant device generates verification information $C_m = h^{K+1}(IV_m)$ and sends it to said server device together with said value of aimed value information $\gamma_m$; and (a-3) said server device publishes said value of aimed value information $\gamma_m$ and said verification information $C_m = h^{K+1}(IV_m)$ received from said each participant device on a bulleting board accessible from all of said participant devices;

said step (b) includes the steps wherein: said server device:

(b-0) said server device sets said index k to an upper limit value K;

(b-1) said server device inquires said each participant device m about whether said value of aimed value information corresponds to said index;

(b-2) said server device checks whether an answer from said each participant device acknowledges said correspondence;

(b-3) if said answer from said each participant device denies said correspondence, said server device decrements said k by one and returns to said step (b-1);

(b-4) if said answer from said each participant device acknowledges said correspondence, said server device requests said each participant device to present an updated initial value $h^k(IV_m)$;

(b-5) said each participant device generates $D_m = h^k(IV_m)$ using said initial value $IV_m$ of its own and sends said $D_m$ to said server device; and (b-6) said server device publishes said $D_m$ from said each participant device on said bulletin board; and said step (c) includes the steps wherein said server device:

(c-1) generates $h(D_m)$'s for all of said $D_m$'s received from all of said participant devices;

(c-2) checks whether said $h(D_m)$'s match said verification information $C_m$'s on said bulletin board, respectively;

(c-3) if no mismatch is detected in said step (c-1), generates $g(D_j)$ for $D_j$ presented by a participant device j having bid;

(c-4) checks whether said $g(D_j)$ matches said value of aimed value information $\gamma_j$ of said participant device j on said bulletin board; and (c-5) if said $g(D_j)$ matches said $\gamma_j$ in said step (c-4), decides that said participant device j sent to said server device said value of aimed value information corresponding to said aimed value k.

11. The method of claim 1, wherein: there is provided a conversion table showing the relationships between a sequence of values selectable as said aimed values and a sequence of indexes k of integral values corresponding thereto; and said step (a) includes the steps wherein:

(a-1) letting M be the number of participant devices, an m-th participant device m computes said value of aimed value information by $$\gamma_m = g(h^{km}(IV_m))$$

where g is a one-way function, $IV_m$ is said initial value, $k_m$ is an index corresponding to said aimed value of said participant device m, and $h^{km}(IV_m)$ indicates that said initial value $IV_m$ is processed with said one-way function h by $k_m$ times;

(a-2) said each participant device generates verification information $C_m = h^{K+1}(IV_m)$;

(a-3) said each participant device m generates $h(PR_m(+)R_m)$ from a random number $R_m$ and said aimed value $PR_m$ and sends said $h(PR_m(+)R_m)$ to said server device together with said $\gamma_m$ and said $C_m$, said (+) represents a predetermined arbitrary operation;

said step (b) includes the steps wherein:

(b-1) said server device publishes its received $\gamma_m$, $h(PR_m(+)R_m)$ and $ID_m$ on said bulletin board;

(b-2) said server device requests said each participant device to present said aimed value $PR_m$ and said random number $R_m$;

(b-3) said each participant device sends said aimed value $PR_m$ and said random number $R_m$ to said server device;

(b-4) said server device determines from its received $PR_m$ and $R_m$ an index k corresponding to the maximum one of said aimed values and a participant device j having sent said value of aimed value information corresponding to said index k;

(b-5) said server device request all of said participant devices to present $h^k(IV_m)$; and (b-6) said each participant device generates $D_m = h^k(IV_m)$ as said updated initial value using the initial value $IV_m$ of its own, and sends said $D_m = h^k(IV_m)$ to said server device;

said step (c) includes the steps wherein said server device:

(c-1) publishes all of its received $D_m$'s on said bulletin board;

(c-2) generating $h(D_m)$'s for all of said $D_m$'s;

(c-3) checks whether said $h(D_m)$'s match said verification information $C_m$'s on said bulletin board, respectively;

(c-4) if no mismatch is detected in said step (c-3), generates $g(D_j)$ for $D_j$ presented by said participant device j having sent said maximum aimed value determined in said step (b-4); and (c-5) checks whether said $g(D_j)$ matches said value of aimed value information $\gamma_j$ of said participant device j on said bulletin board; and said step (d) includes a step wherein if a match is detected in said step (c-5), said server device decides that said participant device j sent said value of aimed value information for said aimed value k.

12. The method of claim 11, wherein said step (d) includes the steps of:
- (d-1) generating $E_m = g(h^{t-k}(h^k(IV_m)))$ for t such that $k \leq t \leq K$ and for all of said m's except said j;
- (d-2) checking whether these $E_m$'s match said value of aimed value information $\gamma_m$ on said bulletin board; and
- (d-3) if no match is detected in said step (d-2), deciding that said k is an index corresponding to the maximum or minimum aimed value, and outputting said k and said identifier $ID_m$ of said participant device j having presented said aimed value.

13. The method of claim 11 or 12, wherein: said each participant device m adds to the computation using said aimed value $PR_m$ and said random number $R_m$ in said step (a-3) additional information $I_m$ about said value of aimed value information by said each participant device m, and outputs $h(PR_m(+)I_m(+)R_m)$; and
in said step (b-2) said server device requests all of said participant devices to present said additional information $I_m$ as well as said aimed value $PR_m$ and said random number $R_m$.

14. The method of claim 1, wherein: there is provided a conversion table showing the relationships between a sequence of values selectable as said aimed values and a sequence of indexes k of integral values respectively corresponding thereto;
said step (a) includes the steps wherein:
- (a-1) each said bidding device generates $h(H_m^{(K)})$ as value of aimed value information of said each participant device by repeating, for each of a sequence of index values k from at least $k_m$ corresponding to an aimed value of said each participant device to an upper limit index value K, processing of:
  combining an initial value of said each participant device with select information to provide combined information and
  operating a one-way function h on said combined information to generate an updated value, said select information indicating whether said each index value k is an aimed value or not; and
sends said value of aimed value information $H_m^{(K)}$ to said server device;
- (a-2) said server device publishes said received value of aimed value information $H_m^{(K)}$ on a bulletin board accessible from all of said participant devices;
said step (b) includes the steps wherein:
- (b-1) said server device requests said each participant device to send an updated initial value $\{H_m^{(k-1)}, b_m^{(k)}\}$ corresponding to each value of said index k in the descending order from K; and
- (b-2) said each participant device generates and sends $\{H_m^{(k-1)}, b_m^{(k)}\}$ as said updated initial value to said server device;
said step (c) includes the steps wherein said server device:
- (c-1) publishes on said bulletin board said updated initial value $\{H_m^{(k-1)}, b_m^{(k)}\}$ received from said each participant device;
- (c-2) processes said updated initial value $H_m^{(k)}$ with a one-way function h to generate $H_m^{(k)} = h(H_m^{(k-1)} \| b_m^{(k)})$;
- (c-3) checks whether said updated initial value $H_m^{(k)}$ matches $H_m^{(k)}$ received previously; and
- (c-4) if a match is detected in said step (c-3), decides whether said select information $b_m^{(k)}$ represents that the corresponding index k is the index $k_m$ of said aimed value; and
said step (d) is a step wherein if the result of decision in said step (c-4) is true, said server device outputs said index concerned and the corresponding participant device number m, and if the result of decision is false, said server device returns to said step (b) and repeats processing for the next index value k.

15. The method of claim 1, wherein: there is provided a conversion table showing the relationships between a sequence of values selectable as said aimed values and a sequence of indexes k of integral values respectively corresponding thereto;
said step (a) includes the steps wherein:
- (a-1) upon each processing of said initial value with said one-way function h, said each participant device generates an updated initial value by adding said processed initial value with select information $b_m^{(k)}$ indicating whether said processed initial value is an aimed value for one value of said index k, and generates $H_m^{(k)}$ by repeatedly performing this processing from at least that index $k_m$ of a sequence of indexes which corresponds to said aimed value to the upper limit value K, and sends said $H_m^{(k)}$ as said value of aimed value information to said server device;
- (a-2) said server device publishes its received value of aimed value information $H_m^{(K)}$ on a bulletin board accessible from all of said participant devices;
said step (b) includes the steps wherein:
- (b-1) for each value of said index k in descending order from K, said server device inquires said each participant device about whether it has bid for said index k, and said each participant device responds YES or NO to said inquiry;
- (b-2) upon first detection of the response YES, said server device requests said each participant device to send its updated initial value $H_m^{(k-1)}$; and
- (b-3) said each participant device generates and sends $(H_m^{(k-1)} = h(H_m^{(k-2)} \| b_m^{(k-1)}))$ as said updated initial value to said server device;
said step (c) includes the steps wherein said server device:
- (c-1) publishes on said bulletin board said updated initial value $(H_m^{(k-1)})$ received from said each participant device;
- (c-2) letting a and a represent predetermined values of said select information $b_m^{(k)}$ indicating bidding and not bidding, respectively, generate, for said participant device m having bid for the current index k, $$H_m = h(\ldots h(h(H_m^{(k-1)} \| a) \| a) \ldots \| a)$$

through the use of said updated initial value $H_m^{(k-1)}$, and for every one of the other participant devices m, generate $$H_m = h(\ldots h(h(H_m^{(k-1)} \| a) \| a) \ldots \| a)$$

through the use of said updated initial values $H_m^{(k-1)}$;
- (c-3) checks whether said $H_m$ for said each participant device matches said $H_m^{(k)}$ published on said bulletin board; and
- (c-4) if a match is detected in said step (c-3), determines that said participant device having responded YES is the winning bidding device, and publishes the current value of said index k as the index $K_m$ of the aimed value of said winning bidding device.

16. The method of claim 1, wherein: there is provided a conversion table showing the relationships between a sequence of values selectable as said aimed values and a sequence of indexes k of integral values respectively corresponding thereto, and let the initial value of said each participant device be represented by $IV_m$, where $m = 1, 2, \ldots, M$, M being an integer equal to or greater than 2;

said step (a) is a step wherein said each participant device generates $H_m^{(K)}=h^{K-km}(g^{xm}(IV_m))$ using a predetermined positive integer $x_m$, said initial value $IV_m$ and one-way functions h and g, and sends said $H_m^{(K)}$ as said value of aimed value information to said server device;

said step (b) includes the steps wherein:

(b-1) said server device publishes said value of aimed value information $A_m$ on a bulletin board accessible from all of said participant devices;

(b-2) said server device sends said index k to said each participant device to ask for its updated initial value;

(b-3) said each participant device decides whether its received index k is the index $k_m$ corresponding to said aimed value;

(b-4) if the result of decision in step (b-3) is $k=k_m$, said each participant device generates and sends $H_m^{(k-1)}=g^{xm-1}(IV_m)$ as said updated initial value to said server device; and (b-5) if the result of decision in said step (b-3) is not $k=k_m$, said each participant device generates and sends $H_m^{(k-1)}=h^{k-km-1}(g^{xm}(IV_m))$ as said updated initial value to said server device;

said step (c) includes the steps wherein said server device:

(c-1) processes said updated initial value $H_m^{(k-1)}$ with said one-way function h to generate $h(H_m^{(k-1)})$;

(c-2) decides whether said $h(H_m^{(k-1)})$ is equal to said value of aimed value information $H_m^{(K)}$;

(c-3) if it is decided in said step (c-2) that they are equal, updates said value of aimed value information $H_m^{(K)}$ with said updated initial value $H_m^{(k-1)}$, then decrements said index k by one and return to said step (b-2);

(c-4) if it is decided in said step (c-2) that they are not equal, processes said updated initial value $H_m^{(k-1)}$ with said one-way function g to generate $g(H_m^{(k-1)})$; and (c-5) decides whether said $g(H_m^{(k-1)})$ matches said value of aimed value information $H_m^{(K)}$; and said step (d) is a step wherein if a match is detected in said step (c-5), decides that the aimed value of said participant device corresponding to m and k having provided said match is the maximum or minimum.

17. The method of claim 1, wherein: there is provided a conversion table showing the relationships between a sequence of values selectable as said aimed values and a sequence of indexes k of integral values respectively corresponding thereto;

said step (a) includes the steps wherein:

(a-1), letting the initial value of said each participant device be represented by $IV_m$, where m=1, 2, ..., M, M being an integer equal to or greater than 2, said each participant device generates $H_m^{(K)}=h^{K-km}(g^{xm}(IV_m))$ using a predetermined positive integer xm, said initial value $IV_m$ and one-way functions h and g, and sends said $H_m$ as said value of aimed value information to said server device; and (a-2) said server device publishes its received value of aimed value information $H_m^{(K)}$ on a bulletin board accessible from all of said participant devices;

said step (b) includes the steps wherein:

(b-1) for each value of said index k in descending order from K, said server device inquires said each participant device about whether it has bid for said index k, and said each participant device responds YES or NO to said inquiry;

(b-2) upon first detection of the response YES, said server device requests said each participant device to send its updated initial value $H_m^{(k-1)}$;

(b-3) said each participant device decides whether its received k is the index k corresponding to said aimed value;

(b-4) if the result of decision in said step (b-3) is $k=k_m$, said each participant generates and sends $H_m^{(k-1)}=g^{xm-1}(IV_m)$ as said updated initial value to said server device; and (b-5) if the result of decision in said step (b-3) is not $k=k_m$, said each participant device generates and sends $H_m^{(k-1)}=g^{xm-1}(IV_m)$ as said updated initial value to said server device; and said step (c) includes the steps wherein said server device:

(c-1) for said updated initial value $H_m^{(k-1)}$ received from said participant device having responded YES, generates $$H_m = h^{K-km} g(H_m^{(k-1)})$$

and for said updated initial value received from said each participant device having responded NO, generates $$H_m = h^{K+1-k} g(H_m^{(k-1)})$$

(c-2) checks whether all of said $H_m$ are equal to said value of aimed value information $H_m^{(K)}$ published on said bulletin board; and (c-3) if it is decided in said step (c-2) that they are equal, determines that said participant device having responded YES is the winning bidding device, and publishes the current value of said index k as the index k of the aimed value of said winning bidding device.

18. The method of claim 1, wherein: there is provided a conversion table showing the relationships between a sequence of values selectable as said aimed values and a sequence of indexes k of integral values respectively corresponding thereto, and let the initial value of said each participant device be represented by $IV_m$, where m=1, 2, ..., M, M being an integer equal to or greater than 2;

said step (a) is a step wherein said each participant device generates $H_m^{(K)}=h^{K-km}(g^{xm}(IV_m))$ using a predetermined positive integer $x_m$, said initial value $IV_m$ and one-way functions h and g, and sends said $H_m^{(K)}$ as said value of aimed value information to said server device;

said step (b) includes the steps wherein:

(b-1) said server device publishes said value of aimed value information $H_m^{(K)}$ on a bulletin board accessible from all of said participant devices;

(b-2) said server device sends said index k to said each participant device to ask for its updated initial value;

(b-3) said each participant device decides whether its received index k is the index $k_m$ corresponding to said aimed value;

(b-4) if the result of decision in step (b-3) is $k=k_m$, said each participant device generates and $H_m^{(k-1)}=g^{xm-1}(IV_m)$ as said updated initial value and sends it to said server device together with a flag indicating that said k and $k_m$ are equal; and (b-5) if the result of decision in said step (b-3) is not $k=k_m$, said each participant device generates and sends $H_m^{(k-1)}=h^{k-km-1}(g^{xm}(IV_m))$ as said updated initial value to said server device;

said step (c) includes the steps wherein said server device:

(c-1) checks whether its received updated initial value $H_m^{(k-1)}$ is added with said flag;

(c-2) if it is decided in said step (c-1) that said flag is added, processes said updated initial value $H_m^{(k-1)}$ with said one-way function g to generate $g(H_m^{(k-1)})$;

(c-3) decides whether said $g(H_m^{(k-1)})$ matches said value of aimed value information $H_m^{(K)}$;

(c-4) if it is decided in said step (c-1) that no flag is added, processes said updated initial value $H_m^{(k-1)}$ with said one-way function h to generate $h(H_m^{(k-1)})$;

(c-5) decides whether said $h(H_m^{(k-1)})$ matches said value of aimed value information $H_m^{(K)}$;

(c-6) if it is decided in said step that they are equal, updates said value of aimed value information $H_m^{(K)}$ with said initial value $H_m^{(k-1)}$, then decrements said index k by one and return to said step (b-2); and (c-7) if it is decided in said step (c-5), processes said initial value $H_m^{(k-1)}$ with said one-way function g to generate $g(H_m^{(k-1)})$ and returns to said step (c-3); and said step (d) is a step wherein if a match is detected in said step (c-3), decides that the aimed value of said participant device corresponding to m and k having provided said match is the maximum or minimum.

19. A recording medium on which there is recorded as a program the procedure which is followed by a server device in a quantitative competition method for a system in which a plurality of participant devices send their aimed values to said server device and said server device determines which of said participant devices has offered the maximum or minimum one of said aimed values received, and there is provided a conversion table showing the relationships between a sequence of values selectable as said aimed values and a sequence of indexes k of integral values respectively corresponding thereto, said procedure comprising the steps of:

(a) publishing a value of aimed value information $\gamma_m = g(h^{km}(IV_m))$ received from said each participant device on a bulletin board accessible from all of said participant device, g being a one-way function, $IV_m$ being said initial value, $k_m$ being an index corresponding to the aimed value of said each participant device m and $h^{km}(IV_m)$ indicating processing of said initial value $IV_m$ with a one-way function h by $k_m$ times;

(b) generating an updated initial value by $D_m = g(h^k(IV_m))$;

(c) checking whether there is any value of aimed value information $\gamma_m$ which is equal to corresponding one of said updated initial value $D_m$; and (d) repeating a sequence of the steps (b) and (c) until first detection of a match in said step (c), deciding that the aimed value of the participant device corresponding to said updated initial value $D_m$ which matches said value of aimed value information $\gamma_m$.

20. The recording medium of claim 19, wherein said step (a) includes a step of publishing verification information $C_m = h^{K+1}(IV_m)$ received from said each participant device on said bulletin board together with said value of aimed value information $\gamma_m$.

21. The recording medium of claim 20, wherein: said step (b) includes the steps of:

(b-1) requesting said each participant device to send $D_m = h^k(IV_m)$ corresponding to said index k; and (b-2) receiving from said each participant device $D_m = h^k(IV_m)$ as said updated initial value corresponding to said index k; and said step (c) includes a step of generating $g(D_m)$ and making a check for said value of aimed value information $\gamma_m = g(D_m)$.

22. The recording medium of claim 21, wherein:

said step (b) includes a step (b-0) of setting said index k to an upper limit value K; and said step (c) includes the steps of:

(c-1) publishing said $D_m = h^k(IV_m)$ received from said each participant device on said bulletin board;

(c-2) computing said $g(D_m)$ for said each participant device m;

(c-3) making a check to see if said $g(D_m)$ matches said value of aimed value information;

(c-4) if no match is detect for any of said m in said step (c-3), replacing said $D_m$ with said $C_m$, decrementing said index k by one and returning to said step (b-1); and (c-5) if a match is detected in said step (c-3), determining that the value corresponding to said index k at that time is said maximum or minimum aimed value.

23. The recording medium of claim 22, wherein said step (c-1) includes a step of generating $h(D_m)$ and making a check to see if $h(D_m)=C_m$ holds.

24. The recording medium of claim 19 or 20, wherein said sequences of indexes k and values selectable as said aimed values are both monotonous increasing values in the same direction, and in said step (c) said server device determines the maximum aimed value.

25. The recording medium of claim 19 or 20, wherein said sequences of indexes k and values selectable as said aimed values are both monotonous increasing values in opposite directions, and in said step (c) said server device determines the minimum aimed value.

26. The recording medium of claim 19 or 20, wherein let an arbitrary aimed value be represented by $PR=F(k)+Q$, where $F(k)$ is a value in said conversion table corresponding to said index k and Q is a fraction which is a positive integer which satisfies $F(k+1)-F(k)>Q\geq 0$;

said step (a) includes a step wherein, letting said aimed value $PR_m$ of said each participant device m be represented by $PR_m=F(k_m)+Q_m$, said server device receives from each participant device m said value of aimed value information generated by processing said initial value with said one-way function h by the number of times corresponding to $k_m$, together with said fraction $Q_m$, where m=1, 2, . . . , M, said M being an integer equal to or greater than 2, and said server device publishes said value of aimed value information and said fraction $Q_m$ on a bulletin board accessible from all of said participant devices;

said step (c) includes a step where said server device makes a check for matching between said updated initial value and said value of aimed value information for each index value in an ascending or descending order of said fraction $Q_m$ where m=1, 2, . . . , M; and said step (d) includes a step wherein, upon first detection of a match in said step (c), said server device finishes said check and determines, from $k_m$ and m at the time of detecting the match, that $PR_m=F(k_m)+Q_m$ is said maximum or minimum aimed value.

* * * * *